United States Patent
Wilson et al.

(10) Patent No.: US 10,551,930 B2
(45) Date of Patent: Feb. 4, 2020

(54) SYSTEM AND METHOD FOR EXECUTING A PROCESS USING ACCELEROMETER SIGNALS

(71) Applicant: Microsoft Technology Licensing, LLC, Redmond, WA (US)

(72) Inventors: Andrew Wilson, Seattle, WA (US); Nuria Oliver, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/803,949

(22) Filed: Jul. 20, 2015

(65) Prior Publication Data

US 2016/0116995 A1  Apr. 28, 2016

Related U.S. Application Data

(60) Continuation of application No. 13/919,995, filed on Jun. 17, 2013, now abandoned, which is a
(Continued)

(51) Int. Cl.
*A63F 13/42* (2014.01)
*G06F 3/01* (2006.01)
(Continued)

(52) U.S. Cl.
CPC ............ *G06F 3/017* (2013.01); *A63F 13/211* (2014.09); *A63F 13/213* (2014.09); *A63F 13/42* (2014.09); *A63F 13/428* (2014.09); *G06F 3/011* (2013.01); *G06F 3/012* (2013.01); *G06F 3/013* (2013.01); *G06F 3/038* (2013.01); *G06F 3/0346* (2013.01); *G06K 9/00355* (2013.01); *G06T 7/20* (2013.01);
(Continued)

(58) Field of Classification Search
CPC ...... A63F 13/211; A63F 13/213; A63F 13/42; A63F 13/428; A63F 13/285; G06F 3/011; G06F 3/012; G06F 3/013; G06F 3/0346; G06F 3/038
USPC .................. 463/36–38, 47; 345/156–184
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |

(Continued)

FOREIGN PATENT DOCUMENTS

| | | |
|---|---|---|
| CN | 101141136 A | 3/2008 |
| CN | 101254344 A | 9/2008 |

(Continued)

OTHER PUBLICATIONS

"Non-Final Office Action Issued in U.S. Appl. No. 12/494,303", dated May 3, 2016, 12 Pages.
(Continued)

*Primary Examiner* — Omkar A Deodhar
*Assistant Examiner* — Shauna-Kay Hall
(74) *Attorney, Agent, or Firm* — Drinker Biddle & Reath LLP

(57) ABSTRACT

Apparatus and process for controlling a computer process with gestures and a handheld pointing device. The computer system employing the pointing device to determine what component a user wants to control and what control action is desired.

18 Claims, 31 Drawing Sheets

Related U.S. Application Data continuation of application No. 12/457,656, filed on Jun. 17, 2009, now abandoned, which is a continuation of application No. 12/289,099, filed on Oct. 20, 2008, now abandoned, which is a division of application No. 10/724,950, filed on Dec. 1, 2003, now Pat. No. 8,745,541, which is a continuation-in-part of application No. 10/396,653, filed on Mar. 25, 2003, now Pat. No. 7,665,041.

(51) Int. Cl.

| | |
|---|---|
| *A63F 13/213* | (2014.01) |
| *G06K 9/00* | (2006.01) |
| *A63F 13/211* | (2014.01) |
| *A63F 13/428* | (2014.01) |
| *G06F 3/0346* | (2013.01) |
| *G06F 3/038* | (2013.01) |
| *G06T 7/20* | (2017.01) |
| *G06T 7/593* | (2017.01) |
| *G06T 7/285* | (2017.01) |
| *H04N 13/366* | (2018.01) |
| *H04N 13/239* | (2018.01) |
| *H04N 13/128* | (2018.01) |
| *H04N 13/00* | (2018.01) |

(52) U.S. Cl.
CPC ............ *G06T 7/285* (2017.01); *G06T 7/593* (2017.01); *H04N 13/128* (2018.05); *H04N 13/239* (2018.05); *H04N 13/366* (2018.05); *A63F 2300/1093* (2013.01); *G06K 9/00335* (2013.01); *H04N 2013/0081* (2013.01)

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,109,537 A | 4/1992 | Toki | |
| 5,139,261 A | 8/1992 | Openiano | |
| 5,148,154 A | 9/1992 | MacKay et al. | |
| 5,156,243 A | 10/1992 | Aoki et al. | |
| 5,157,384 A * | 10/1992 | Greanias | G06F 3/023 345/156 |
| 5,181,181 A * | 1/1993 | Glynn | G06F 3/0346 345/163 |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,252,951 A * | 10/1993 | Tannenbaum | G06F 3/023 345/156 |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,414,643 A | 5/1995 | Blackman et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,525,901 A | 6/1996 | Clymer et al. | |
| 5,528,263 A | 6/1996 | Platzker et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,611,731 A | 3/1997 | Bouton et al. | |
| 5,615,132 A * | 3/1997 | Horton | G06F 3/011 340/988 |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein, Jr. | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,732,227 A | 3/1998 | Kuzunuki et al. | |
| 5,757,360 A | 5/1998 | Nitta et al. | |
| 5,801,704 A * | 9/1998 | Oohara | G06F 3/011 345/157 |
| 5,801,943 A | 9/1998 | Nasburg | |
| 5,828,779 A | 10/1998 | Maggioni | |
| 5,864,808 A | 1/1999 | Ando et al. | |
| 5,875,108 A | 2/1999 | Hoffberg et al. | |
| 5,877,803 A | 3/1999 | Wee et al. | |
| 5,909,189 A | 6/1999 | Blackman et al. | |
| 5,913,727 A | 6/1999 | Ahdoot | |
| 5,933,125 A | 8/1999 | Fernie et al. | |
| 5,959,574 A | 9/1999 | Poore, Jr. | |
| 5,980,256 A | 11/1999 | Carmein | |
| 5,989,157 A | 11/1999 | Walton | |
| 5,995,649 A | 11/1999 | Marugame | |
| 6,002,808 A | 12/1999 | Freeman et al. | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,067,077 A | 5/2000 | Martin et al. | |
| 6,072,467 A | 6/2000 | Walker | |
| 6,072,494 A | 6/2000 | Nguyen | |
| 6,073,489 A | 6/2000 | French et al. | |
| 6,077,201 A | 6/2000 | Cheng | |
| 6,098,458 A | 8/2000 | French et al. | |
| 6,100,896 A | 8/2000 | Strohecker et al. | |
| 6,101,289 A | 8/2000 | Kellner | |
| 6,111,580 A | 8/2000 | Kazama et al. | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,191,773 B1 | 2/2001 | Maruno et al. | |
| 6,195,104 B1 | 2/2001 | Lyons | |
| 6,215,890 B1 | 4/2001 | Matsuo et al. | |
| 6,215,898 B1 | 4/2001 | Woodfill et al. | |
| 6,222,465 B1 | 4/2001 | Kumar et al. | |
| 6,226,388 B1 | 5/2001 | Qian et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,263,088 B1 | 7/2001 | Crabtree et al. | |
| 6,269,172 B1 | 7/2001 | Rehg et al. | |
| 6,283,860 B1 | 9/2001 | Lyons et al. | |
| 6,289,112 B1 | 9/2001 | Jain et al. | |

(56) References Cited

U.S. PATENT DOCUMENTS

| | | |
|---|---|---|
| 6,295,367 B1 | 9/2001 | Crabtree et al. |
| 6,299,308 B1 | 10/2001 | Voronka et al. |
| 6,301,370 B1 | 10/2001 | Steffens et al. |
| 6,308,565 B1 | 10/2001 | French et al. |
| 6,311,159 B1 | 10/2001 | Van Tichelen et al. |
| 6,316,934 B1 | 11/2001 | Amorai-Moriya et al. |
| 6,347,998 B1 | 2/2002 | Yoshitomi et al. |
| 6,363,160 B1 | 3/2002 | Bradski et al. |
| 6,375,572 B1 | 4/2002 | Masuyama et al. |
| 6,377,296 B1 | 4/2002 | Zlatsin et al. |
| 6,377,396 B1 | 4/2002 | Sun et al. |
| 6,384,819 B1 | 5/2002 | Hunter |
| 6,411,744 B1 | 6/2002 | Edwards |
| 6,421,453 B1 * | 7/2002 | Kanevsky ............ G06F 21/316 340/5.2 |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,509,889 B2 * | 1/2003 | Kamper ................ G06F 3/038 345/157 |
| 6,539,931 B2 | 4/2003 | Trajkovic et al. |
| 6,542,621 B1 | 4/2003 | Brill et al. |
| 6,545,661 B1 * | 4/2003 | Goschy ................. A63F 13/04 345/158 |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,600,475 B2 | 7/2003 | Gutta et al. |
| 6,603,488 B2 | 8/2003 | Humpleman et al. |
| 6,633,294 B1 | 10/2003 | Rosenthal et al. |
| 6,640,202 B1 | 10/2003 | Dietz et al. |
| 6,642,955 B1 | 11/2003 | Midgley et al. |
| 6,661,918 B1 | 12/2003 | Gordon et al. |
| 6,672,467 B2 | 1/2004 | Merkel et al. |
| 6,681,031 B2 | 1/2004 | Cohen et al. |
| 6,714,665 B1 | 3/2004 | Hanna et al. |
| 6,720,949 B1 | 4/2004 | Pryor et al. |
| 6,731,799 B1 | 5/2004 | Sun et al. |
| 6,738,066 B1 | 5/2004 | Nguyen |
| 6,744,420 B2 | 6/2004 | Mohri |
| 6,750,848 B1 | 6/2004 | Pryor |
| 6,753,879 B1 | 6/2004 | Deleeuw et al. |
| 6,765,726 B2 | 7/2004 | French et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,888,960 B2 | 5/2005 | Penev et al. |
| 6,928,344 B2 | 8/2005 | McWalter et al. |
| 6,937,742 B2 | 8/2005 | Roberts et al. |
| 6,950,534 B2 | 9/2005 | Cohen et al. |
| 6,963,937 B1 * | 11/2005 | Kamper ................ G06F 3/038 345/156 |
| 6,980,312 B1 | 12/2005 | Czyszczewski et al. |
| 6,982,697 B2 | 1/2006 | Wilson et al. |
| 6,990,639 B2 | 1/2006 | Wilson |
| 7,003,134 B1 | 2/2006 | Covell et al. |
| 7,007,236 B2 | 2/2006 | Dempski et al. |
| 7,036,094 B1 | 4/2006 | Cohen et al. |
| 7,038,661 B2 | 5/2006 | Wilson et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,070,500 B1 | 7/2006 | Nomi et al. |
| 7,094,147 B2 | 8/2006 | Nakata et al. |
| 7,095,401 B2 | 8/2006 | Liu et al. |
| 7,113,918 B1 | 9/2006 | Ahmad et al. |
| 7,121,946 B2 | 10/2006 | Paul et al. |
| 7,148,913 B2 | 12/2006 | Keaton et al. |
| 7,170,492 B2 | 1/2007 | Bell |
| 7,184,048 B2 | 2/2007 | Hunter |
| 7,202,898 B1 | 4/2007 | Braun et al. |
| 7,206,435 B2 | 4/2007 | Fujimura et al. |
| 7,222,078 B2 | 5/2007 | Abelow |
| 7,225,414 B1 | 5/2007 | Sharma et al. |
| 7,227,526 B2 | 6/2007 | Hildreth et al. |
| 7,259,747 B2 | 8/2007 | Bell |
| 7,274,800 B2 | 9/2007 | Nefian et al. |
| 7,308,112 B2 | 12/2007 | Fujimura et al. |
| 7,317,836 B2 | 1/2008 | Fujimura et al. |
| 7,321,854 B2 | 1/2008 | Sharma et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,394,346 B2 | 7/2008 | Bodin |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,492,367 B2 | 2/2009 | Mahajan et al. |
| 7,519,223 B2 | 4/2009 | Dehlin et al. |
| 7,536,032 B2 | 5/2009 | Bell |
| 7,552,403 B2 | 6/2009 | Wilson |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,593,593 B2 | 9/2009 | Wilson |
| 7,596,767 B2 | 9/2009 | Wilson |
| 7,598,942 B2 | 10/2009 | Underkoffler et al. |
| 7,607,509 B2 | 10/2009 | Schmiz et al. |
| 7,613,358 B2 | 11/2009 | Wilson |
| 7,620,202 B2 | 11/2009 | Fujimura et al. |
| 7,639,148 B2 | 12/2009 | Victor |
| 7,668,340 B2 | 2/2010 | Cohen et al. |
| 7,680,298 B2 | 3/2010 | Roberts et al. |
| 7,683,883 B2 | 3/2010 | Touma et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,721,231 B2 | 5/2010 | Wilson |
| 7,725,129 B2 | 5/2010 | Grunhold |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,823,089 B2 | 10/2010 | Wilson |
| 7,834,846 B1 | 11/2010 | Bell |
| 7,852,262 B2 | 12/2010 | Namineni et al. |
| 7,890,199 B2 | 2/2011 | Inagaki |
| RE42,256 E | 3/2011 | Edwards |
| 7,898,522 B2 | 3/2011 | Hildreth et al. |
| 7,907,117 B2 | 3/2011 | Wilson et al. |
| 7,927,216 B2 | 4/2011 | Ikeda et al. |
| 7,988,558 B2 | 8/2011 | Sato |
| 8,035,612 B2 | 10/2011 | Bell et al. |
| 8,035,614 B2 | 10/2011 | Bell et al. |
| 8,035,624 B2 | 10/2011 | Bell et al. |
| 8,049,719 B2 | 11/2011 | Wilson et al. |
| 8,072,470 B2 | 12/2011 | Marks |
| 8,115,732 B2 | 2/2012 | Wilson et al. |
| 8,132,126 B2 | 3/2012 | Wilson |

(56) References Cited

U.S. PATENT DOCUMENTS

| | | | |
|---|---|---|---|
| 8,165,422 B2 | 4/2012 | Wilson | |
| 8,187,096 B2 | 5/2012 | Ohta et al. | |
| 8,213,962 B2 | 7/2012 | Carr | |
| 8,246,458 B2 | 8/2012 | Nakajima et al. | |
| 8,246,460 B2 | 8/2012 | Kitahara | |
| 8,251,820 B2 | 8/2012 | Marks et al. | |
| 8,282,487 B2 | 10/2012 | Wilson et al. | |
| 8,287,373 B2 | 10/2012 | Marks et al. | |
| 8,295,546 B2 | 10/2012 | Craig et al. | |
| 8,303,411 B2 | 11/2012 | Marks et al. | |
| 8,308,563 B2 | 11/2012 | Ikeda et al. | |
| 8,308,564 B2 | 11/2012 | Yoshida et al. | |
| 8,428,340 B2 | 4/2013 | Marais et al. | |
| 8,456,419 B2 | 6/2013 | Wilson | |
| 8,552,976 B2 | 10/2013 | Wilson et al. | |
| 8,553,094 B2 | 10/2013 | Lin | |
| 8,560,972 B2 | 10/2013 | Wilson | |
| 8,599,173 B2 | 12/2013 | Soo et al. | |
| 8,612,884 B2 | 12/2013 | Capela et al. | |
| 8,670,632 B2 | 3/2014 | Wilson | |
| 8,707,216 B2 | 4/2014 | Wilson | |
| 8,745,541 B2 | 6/2014 | Wilson et al. | |
| 8,747,224 B2 | 6/2014 | Miyazaki et al. | |
| 8,811,938 B2 | 8/2014 | Paek et al. | |
| 8,814,688 B2 | 8/2014 | Barney et al. | |
| 8,834,271 B2 | 9/2014 | Ikeda | |
| 8,858,336 B2 | 10/2014 | Sawano et al. | |
| 9,171,454 B2 | 10/2015 | Wilson et al. | |
| 9,596,643 B2 | 3/2017 | Paek et al. | |
| 2001/0013890 A1 | 8/2001 | Narayanaswami | |
| 2002/0004422 A1 | 1/2002 | Tosaki et al. | |
| 2002/0019258 A1 | 2/2002 | Kim et al. | |
| 2002/0036617 A1* | 3/2002 | Pryor | G06F 3/042 345/156 |
| 2002/0041327 A1 | 4/2002 | Hildreth et al. | |
| 2002/0055383 A1 | 5/2002 | Onda et al. | |
| 2002/0072418 A1 | 6/2002 | Masuyama et al. | |
| 2002/0178344 A1 | 11/2002 | Bourguet et al. | |
| 2003/0040350 A1 | 2/2003 | Nakata et al. | |
| 2003/0046401 A1* | 3/2003 | Abbott | G06F 9/451 709/228 |
| 2003/0069077 A1* | 4/2003 | Korienek | A63J 21/00 472/57 |
| 2003/0095140 A1 | 5/2003 | Keaton et al. | |
| 2003/0156756 A1 | 8/2003 | Gokturk et al. | |
| 2003/0193572 A1* | 10/2003 | Wilson | G08C 17/00 348/207.99 |
| 2003/0216176 A1 | 11/2003 | Shimizu et al. | |
| 2003/0216179 A1 | 11/2003 | Suzuki et al. | |
| 2004/0001113 A1 | 1/2004 | Zipperer et al. | |
| 2004/0005083 A1 | 1/2004 | Fujimura et al. | |
| 2004/0056907 A1 | 3/2004 | Sharma et al. | |
| 2004/0070564 A1* | 4/2004 | Dawson | G06F 3/0325 345/156 |
| 2004/0095317 A1* | 5/2004 | Zhang | G06F 3/0346 345/158 |
| 2004/0113933 A1 | 6/2004 | Guler | |
| 2004/0155902 A1 | 8/2004 | Dempski et al. | |
| 2004/0155962 A1 | 8/2004 | Marks | |
| 2004/0193413 A1 | 9/2004 | Wilson et al. | |
| 2004/0194129 A1 | 9/2004 | Carlbom et al. | |
| 2004/0204240 A1* | 10/2004 | Barney | A63H 30/04 463/36 |
| 2004/0252027 A1 | 12/2004 | Torkkola et al. | |
| 2005/0030184 A1 | 2/2005 | Victor | |
| 2005/0037730 A1 | 2/2005 | Montague | |
| 2005/0076161 A1 | 4/2005 | Albanna et al. | |
| 2005/0085298 A1 | 4/2005 | Woolston | |
| 2005/0151850 A1 | 7/2005 | Ahn et al. | |
| 2005/0212753 A1 | 9/2005 | Marvit et al. | |
| 2005/0238201 A1 | 10/2005 | Shamaie | |
| 2005/0239548 A1 | 10/2005 | Ueshima et al. | |
| 2005/0255434 A1 | 11/2005 | Lok et al. | |
| 2005/0266893 A1 | 12/2005 | Lejman et al. | |
| 2006/0007142 A1 | 1/2006 | Wilson et al. |
| 2006/0033713 A1 | 2/2006 | Pryor |
| 2006/0036944 A1 | 2/2006 | Wilson |
| 2006/0092267 A1 | 5/2006 | Dempski et al. |
| 2006/0098873 A1 | 5/2006 | Hildreth et al. |
| 2006/0109245 A1 | 5/2006 | Wilson et al. |
| 2006/0178212 A1 | 8/2006 | Penzias |
| 2006/0205394 A1 | 9/2006 | Vesterinen |
| 2006/0250226 A1 | 11/2006 | Vogel et al. |
| 2007/0060383 A1 | 3/2007 | Dohta |
| 2007/0143333 A1 | 6/2007 | Laird-mcconnell |
| 2007/0192038 A1 | 8/2007 | Kameyama |
| 2007/0195997 A1 | 8/2007 | Paul et al. |
| 2007/0243931 A1 | 10/2007 | Ohta et al. |
| 2007/0252898 A1 | 11/2007 | Delean |
| 2007/0254738 A1 | 11/2007 | Sato |
| 2008/0026838 A1 | 1/2008 | Dunstan et al. |
| 2008/0036732 A1 | 2/2008 | Wilson et al. |
| 2008/0094351 A1 | 4/2008 | Nogami et al. |
| 2008/0108329 A1 | 5/2008 | Cho et al. |
| 2008/0122786 A1 | 5/2008 | Pryor et al. |
| 2008/0193043 A1 | 8/2008 | Wilson |
| 2008/0204410 A1 | 8/2008 | Wilson |
| 2008/0204411 A1 | 8/2008 | Wilson |
| 2008/0259055 A1 | 10/2008 | Wilson |
| 2009/0121894 A1 | 5/2009 | Wilson et al. |
| 2009/0172606 A1 | 7/2009 | Dunn et al. |
| 2009/0207136 A1 | 8/2009 | Farag et al. |
| 2009/0215534 A1 | 8/2009 | Wilson et al. |
| 2009/0221368 A1 | 9/2009 | Yen et al. |
| 2009/0252423 A1 | 10/2009 | Zhu et al. |
| 2010/0004838 A1 | 1/2010 | Georgis et al. |
| 2010/0027843 A1 | 2/2010 | Wilson |
| 2010/0063813 A1 | 3/2010 | Richter et al. |
| 2010/0113153 A1 | 5/2010 | Yen et al. |
| 2010/0121526 A1 | 5/2010 | Pham |
| 2010/0151946 A1 | 6/2010 | Wilson et al. |
| 2010/0197390 A1 | 8/2010 | Craig et al. |
| 2010/0253624 A1 | 10/2010 | Wilson |
| 2011/0001696 A1 | 1/2011 | Wilson |
| 2011/0004329 A1 | 1/2011 | Wilson |
| 2011/0041100 A1 | 2/2011 | Boillot |
| 2011/0081044 A1 | 4/2011 | Peeper et al. |
| 2011/0081969 A1 | 4/2011 | Ikeda et al. |
| 2011/0105097 A1 | 5/2011 | Tadayon et al. |
| 2011/0124410 A1 | 5/2011 | Mao et al. |
| 2011/0172015 A1 | 7/2011 | Ikeda et al. |
| 2011/0195699 A1 | 8/2011 | Tadayon et al. |
| 2011/0211073 A1 | 9/2011 | Foster |
| 2011/0275321 A1 | 11/2011 | Zhou et al. |
| 2011/0286676 A1 | 11/2011 | El Dokor |
| 2011/0291926 A1 | 12/2011 | Gokturk et al. |
| 2012/0157207 A1 | 6/2012 | Craig et al. |
| 2012/0214472 A1 | 8/2012 | Tadayon et al. |
| 2012/0265716 A1 | 10/2012 | Hunzinger et al. |
| 2012/0302349 A1 | 11/2012 | Marks et al. |
| 2013/0028476 A1 | 1/2013 | Craig et al. |
| 2013/0069931 A1 | 3/2013 | Wilson et al. |
| 2013/0134730 A1 | 5/2013 | Ricci |
| 2013/0155237 A1 | 6/2013 | Paek et al. |
| 2013/0157607 A1 | 6/2013 | Paek et al. |
| 2013/0294016 A1 | 11/2013 | Wilson et al. |
| 2013/0297246 A1 | 11/2013 | Wilson et al. |
| 2014/0142729 A1 | 5/2014 | Lobb et al. |
| 2014/0292654 A1 | 10/2014 | Wilson |
| 2014/0329487 A1 | 11/2014 | Paek et al. |

FOREIGN PATENT DOCUMENTS

| | | |
|---|---|---|
| CN | 201166702 Y | 12/2008 |
| CN | 101364814 A | 2/2009 |
| CN | 101254344 B | 6/2010 |
| CN | 101795504 A | 8/2010 |
| CN | 201548210 U | 8/2010 |
| CN | 102204350 A | 9/2011 |
| CN | 102204650 A | 10/2011 |
| EP | 0583061 A2 | 2/1994 |
| EP | 739491 B1 | 4/2006 |
| EP | 2113431 A1 | 11/2009 |

(56) References Cited

FOREIGN PATENT DOCUMENTS

| | | | |
|---|---|---|---|
| JP | H0844490 A | 2/1996 | |
| JP | 1084405 A | 3/1998 | |
| JP | 10308802 A | 11/1998 | |
| JP | H10304464 A | 11/1998 | |
| JP | 2001239897 A | 9/2001 | |
| JP | 2004045413 A | 2/2004 | |
| JP | 2004312752 A | 11/2004 | |
| JP | 2005173702 A | 6/2005 | |
| JP | 2009244959 A | 10/2009 | |
| JP | 2009257832 A | 11/2009 | |
| JP | 2010072833 A | 4/2010 | |
| JP | 2010081565 A | 4/2010 | |
| JP | 2010195156 A | 9/2010 | |
| JP | 2010262400 A | 11/2010 | |
| KR | 1020100116387 A | 11/2010 | |
| WO | 9310708 A1 | 6/1993 | |
| WO | 9717598 A1 | 5/1997 | |
| WO | 9944698 A2 | 9/1999 | |
| WO | 0100463 A2 | 1/2001 | |
| WO | 2009059065 A1 | 5/2009 | |
| WO | 2010051455 A2 | 5/2010 | |
| WO | 2011149709 A1 | 12/2011 | |

OTHER PUBLICATIONS

"Non-Final Office Action Issued in U.S. Appl. No. 12/705,014", dated Mar. 28, 2016, 11 Pages.
"Final Office Action Issued in U.S. Appl. No. 12/705,113", dated Apr. 25, 2016, 11 Pages.
"Final Office Action Issued in U.S. Appl. No. 12/705,014", dated Jul. 29, 2015, 12 Pages.
"Final Office Action Issued in U.S. Appl. No. 12/494,303", dated Sep. 21, 2015, 11 Pages.
"Non-Office Action Issued in U.S. Appl. No. 12/494,303", dated Apr. 9, 2015, 11 Pages.
"Non-Office Action Issued in U.S. Appl. No. 12/705,014", dated Apr. 10, 2015, 10 Pages.
"Final Office Action Issued in U.S. Appl. No. 12/495,105", dated Oct. 28, 2014, 15 Pages.
"Final Office Action Issued in U.S. Appl. No. 12/494,303", dated Sep. 26, 2016, 13 Pages.
"Final Office Action Issued in U.S. Appl. No. 12/705,014", dated Aug. 26, 2016, 12 Pages.
"Non Final Office Action Issued in U.S. Appl. No. 12/494,303", dated Apr. 9, 2015, 11 Pages.
"Non Final Office Action Issued in U.S. Appl. No. 12/705,014", dated Apr. 10, 2015, 10 Pages.
"Non Final Office Action Issued in U.S. Appl. No. 12/705,113", dated Nov. 12, 2015, 11 Pages.
Guler, Sadiye Z., "U.S. Appl. No. 60/416,553", filed Oct. 8, 2002, 21 Pages.
"Non-Final Office Action Issued in U.S. Appl. No. 12/494,303", dated Aug. 1, 2017, 17 Pages.
"Final Office Action Issued in U.S. Appl. No. 12/705,014", dated May 3, 2017, 16 Pages.
"Non Final Office Action Issued in U.S. Appl. No. 12/705,014", dated Jun. 20, 2012, 16 Pages.
"Response Filed in U.S. Appl. No. 12/705,014", filed Dec. 9, 2013, 10 Pages.
"Response to Final Office Action Filed in U.S. Appl. No. 12/705,014", filed Oct. 26, 2016, 10 Pages.
"Response to Non Final Office Action Filed in U.S. Appl. No. 12/705,014", filed Jun. 28, 2016, 8 Pages.
"Final Office Action Issued in U.S. Appl. No. 12/705,113", dated Dec. 13, 2013, 18 Pages.
"Final Office Action Issued in U.S. Appl. No. 12/705,113", dated Mar. 7, 2013, 13 Pages.
"Non Final Office Action Issued in U.S. Appl. No. 12/705,113", dated Sep. 27, 2012, 14 Pages.
"Non Final Office Action Issued in U.S. Appl. No. 12/705,113", dated Jul. 19, 2013, 13 Pages.
"Notice of Allowance Issued in U.S. Appl. No. 12/705,113", dated Jan. 23, 2017, 5 Pages.
"Response to Final Office Action Filed in U.S. Appl. No. 12/705,113", filed Jul. 25, 2016, 7 Pages.
"Decision to Refuse Issued in European Patent Application No. 12857653.5", dated Mar. 16, 2017, 17 Pages.
"Examination Report Issued in European Patent Application No. 12857653.5", dated Aug. 14, 2015, 6 Pages.
"Office Action Issued in European Patent Application No. 12857653.5", dated Apr. 7, 2016, 5 Pages.
"Partial Search Report Issued in European Patent Application No. 12857653.5", dated Apr. 17, 2015, 6 Pages.
"Response Filed in European Patent Application No. 12857653.5", Filed Date: Dec. 9, 2015, 19 Pages.
"Response Filed in European Patent Application No. 12857653.5", Filed Date: May 17, 2016, 13 Pages.
"Summons to Attend Oral Proceedings Pursuant to Rule 115(1) Issued in European Patent Application No. 12857653.5", Mailed Date: Sep. 16, 2016, 5 Pages.
"Supplementary Search Report Issued in European Patent Application No. 12857653.5", dated Aug. 4, 2015, 5 Pages.
"Non Final Office Action Issued in U.S. Appl. No. 13/327,786", dated Dec. 19, 2012, 27 Pages.
"Notice of Allowance Issued in U.S. Appl. No. 13/327,786", dated May 24, 2013, 12 Pages.
"Notice of Allowance Issued in U.S. Appl. No. 13/327,786", dated Apr. 14, 2014, 8 Pages.
"Response to Non Final Office Action Filed in U.S. Appl. No. 13/327,786", filed Apr. 29, 2013, 12 Pages.
"Applicant Initialed Interview Summary Issued in U.S. Appl. No. 13/327,787", dated Jan. 26, 2017, 3 Pages.
"Final Office Action Issued in U.S. Appl. No. 13/327,787", dated Nov. 16, 2015, 16 Pages.
"Non Final Office Action Issued in U.S. Appl. No. 13/327,787", dated Sep. 19, 2014, 15 Pages.
"Non Final Office Action Issued in U.S. Appl. No. 13/327,787", dated May 26, 2015, 13 Pages.
"Non Final Office Action Issued in U.S. Appl. No. 13/327,787", dated Jan. 7, 2014, 11 Pages.
"Non Final Office Action Issued in U.S. Appl. No. 13/327,787", dated Dec. 7, 2016, 12 Pages.
"Response Filed in U.S. Appl. No. 13/327,787", filed Aug. 12, 2015, 13 Pages.
"Response Filed in U.S. Appl. No. 13/327,787", filed Jun. 6, 2014, 12 Pages.
"Response Filed in U.S. Appl. No. 13/327,787", filed Mar. 28, 2016, 14 Pages.
"Response Filed in U.S. Appl. No. 13/327,787", filed Jan. 20, 2015, 13 Pages.
"Third Party Submission Under 37 C.F.R. 1.290 in U.S. Appl. No. 13/327,787", Mailed Date: Sep. 20, 2013, 2 Pages.
"Non Final Office Action Issued in U.S. Appl. No. 13/919,995", dated Jan. 20, 2015, 13 Pages.
"Corrected Notice of Allowance Issued in U.S. Appl. No. 14/332,235", dated Mar. 11, 2016, 2 Pages.
"Corrected Notice of Allowance Issued in U.S. Appl. No. 14/332,235", dated Apr. 14, 2016, 2 Pages.
"Corrected Notice of Allowance Issued in U.S. Appl. No. 14/332,235", dated May 26, 2016, 3 Pages.
"Corrected Notice of Allowance Issued in U.S. Appl. No. 14/332,235", dated Dec. 14, 2016, 3 Pages.
"Corrected Notice of Allowance Issued in U.S. Appl. No. 14/332,235", dated Feb. 10, 2017, 2 Pages.
"Corrected Notice of Allowance Issued in U.S. Appl. No. 14/332,235", dated Nov. 4, 2016, 3 Pages.
"Non Final Office Action Issued in U.S. Appl. No. 14/332,235", dated Jun. 5, 2015, 17 Pages.
"Notice of Allowance Issued in U.S. Appl. No. 14/332,235", dated Jan. 20, 2016, 9 Pages.
"Notice of Allowance Issued in U.S. Appl. No. 14/332,235", dated Jan. 13, 2017, 8 Pages.

(56) References Cited

OTHER PUBLICATIONS

"Notice of Allowance Issued in U.S. Appl. No. 14/332,235", dated Oct. 5, 2015, 20 Pages.
"Notice of Allowance Issued in U.S. Appl. No. 14/332,235", dated May 17, 2016, 8 Pages.
"Notice of Allowance Issued in U.S. Appl. No. 14/332,235", dated Sep. 13, 2016, 8 Pages.
"Applicant Response to Pre-Exam Formalities Notice Filed in U.S. Appl. No. 14/803,949", filed Jan. 5, 2016, 140 Pages.
"Notice to File Corrected Application Papers Issued in U.S. Appl. No. 14/803,949", dated Aug. 5, 2015, 2 Pages.
"Preliminary Amendment Issued in U.S. Appl. No. 14/803,949", dated Jul. 20, 2015, 48 Pages.
"Requirement for Restriction/Election issued in U.S. Appl. No. 14/803,949", dated Sep. 26, 2016, 11 Pages.
Kanade, et al., "A Stereo Machine for Video-rate Dense Depth Mapping and Its New Applications", In Proceedings of IEEE Computer Society Conference on Computer Vision and Pattern Recognition, Jun. 18, 1996, 7 Pages.
Kanade, Takeo, "Development of Video-Rate Stereo Machine", In Proceedings of 94 ARPA Image Understanding Workshop, Nov. 14, 1994, 4 Pages.
Kern, et al., "Design Space for Driver-Based Automotive User Interfaces", In Proceedings of the 1st International Conference on Automotive User Interfaces and Interactive Vehicular Applications, Sep. 21, 2009, pp. 3-10.
Kettebekov, et al., "Toward Natural Gesture/Speech Control of a Large Display", In Proceedings of the 8th IFIP International Conference on Engineering for Human-Computer Interaction, May 11, 2001, 13 Pages.
Kjeldsen, Frederik C. M., "Visual Interpretation of Hand Gestures as a Practical Interface Modality", Thesis Submitted in Partial Fulfillment of the Requirements for the Degree of Doctor of Philosophy in the Graduate School of Arts and Sciences, Columbia University, 1997, 178 Pages.
Kohler, Markus, "Special Topics of Gesture Recognition Applied in Intelligent Home Environments", In Proceedings of the International Gesture Workshop on Gesture and Sign Language in Human-Computer Interaction, Sep. 17, 1997, 12 Pages.
Kohler, Markus, "Technical Details and Ergonomical Aspects of Gesture Recognition Applied in Intelligent Home Environments", Retrieved from https://pdfs.semanticscholar.org/0210/daa859d8574b1e1f98f809814e83022c75e4.pdf, Jan. 1997, 35 Pages.
Kohler, Markus, "Vision Based Remote Control in Intelligent Home Environments", In 3D Image Analysis and Synthesis, vol. 96, Nov. 1996, 8 Pages.
Krahnstoever, et al., "Mutimodal Human-Computer Interaction for Crisis Management Systems", In Proceedings of the Sixth IEEE Workshop on Applications of Computer Vision, Dec. 4, 2002, 5 Pages.
Krum, et al., "Speech and Gesture Multimodal Control of a Whole Earth 3D Visualization Environment", In GVU Center Technical Reports, May 27, 2002, 8 Pages.
Lee, et al., "Body Part Detection for Human Pose Estimation and Tracking", In Proceedings of the IEEE Workshop on Motion and Video Computing, Feb. 23, 2007, 8 Pages.
Lindqvist, et al., "Undistracted Driving: A Mobile Phone that Doesn't Distract", In Proceedings of the 12th Workshop on Mobile Computing Systems and Applications, Mar. 1, 2011, 6 Pages.
Livingston, Mark Alan., "Vision-based Tracking with Dynamic Structured Light for Video See-through Augmented Reality", A Dissertation Submitted to the Faculty of the University of North Carolina at Chapel Hill in Partial Fulfillment of the Requirements for the Degree of Doctor of Philosophy in the Department of Computer Science, Jan. 1998, 145 Pages.
Long, et al., "Implications for a Gesture Design Tool", In Proceedings of the ACM SIGCHI Conference on Human Factors in Computing Systems, May 1, 1999, pp. 40-47.
Maes, et al., "The ALIVE System: Wireless, Full-body Interaction with Autonomous Agents", In Journal Multimedia Systems—Special Issue on Multimedia and Multisensory Virtual Worlds, vol. 5, Issue 2, Mar. 1, 1997, 17 pages.
Mignot, et al., "An Experimental Study of Future 'Natural' Multimodal Human-Computer Interaction", In Proceedings of the ACM Conference Companion on Human Factors in Computing Systems on INTERACT'93 and CHI'93, Apr. 1, 1993, pp. 67-68.
Miyagawa, et al., "CCD-Based Range-Finding Sensor", In Proceedings of the IEEE Transactions on Electron Devices, vol. 44, Issue 4, Oct. 1997, pp. 1648-1652.
Moeslund, et al., "A Survey of Computer Vision-Based Human Motion Capture", In Proceedings of the Computer Vision and Image Understanding, vol. 81, Issue 3, Mar. 1, 2001, pp. 231-268.
Moyle, et al., "Gesture Navigation: An Alternative 'Back' for the Future", In Proceedings of the CHI'02 ACM Extended Abstracts on Human Factors in Computing Systems, Apr. 20, 2002, 2 Pages.
Muller, et al., "MultiModal Input in the Car, Today and Tomorrow", In Proceedings of IEEE MultiMedia, vol. 18, Issue 1, Jan. 2011, pp. 98-103.
Navaratnam, et al., "Hierarchical Part-Based Human Body Pose Estimation", In Proceedings of British Machine Vision Association, Sep. 5, 2005, 10 Pages.
Nielsen, et al., "A Procedure for Developing Intuitive and Erogonomic Gesture Interfaces for Man-Machine Interaction", In Proceedings of the 5th International Gesture Workshop, Mar. 2003, 12 Pages.
Oh, et al., "Evaluating Look-to-talk: A Gaze-Aware Interface in a Collaborative Environment", In Proceedings of the CHI'02 ACM Extended Abstracts on Human Factors in Computing Systems, Apr. 20, 2002, 2 Pages.
Oviatt, Sharon, "Ten Myths of Multimodal Interaction", In Proceedings of the Communications of the ACM, vol. 42, Issue 11, Nov. 1, 1999, pp. 74-81.
Pavlovic, et al., "Visual Interpretation of Hand Gestures for Human-Computer Interaction: A Review", In IEEE Transactions on Pattern Analysis and Machine Intelligence, vol. 19, Issue 7, Jul. 1, 1997, pp. 677-695.
"International Preliminary Report on Patentability Issued in PCT Patent Application No. PCT/US2012/068325", dated Jun. 17, 2014, 5 Pages.
"International Search Report and Written Opinion Issued in PCT Application No. PCT/US2012/068325", dated Mar. 20, 2013, 7 Pages.
"International Preliminary Report on Patentability Issued in PCT Patent Application No. PCT/US2012/069968", dated Jun. 17, 2014, 6 Pages.
Pekelny, et al., "Articulated Object Reconstruction and Markerless Motion Capture from Depth Video.", In Proceedings of Computer Graphics Forum, vol. 27, Issue 2, Apr. 1, 2008, 10 Pages.
Qian, et al., "A Gesture-Driven Multimodal Interactive Dance System", In Proceedings of the IEEE International Conference on Multimedia and Expo, vol. 3, Jun. 2004, pp. 1579-1582.
Reissner, Uli, "Gestures and Speech in Cars", In Electronic Proceedings of Joint Advanced Student School, Mar. 28, 2007, 12 Pages.
Riener, et al., "Natural DVI Based on Intuitive Hand Gestures", In Proceedings of Interact Workshop UX in Cars, Sep. 5, 2011, 5 Pages.
Rigoll, et al., "High Performance Real-Time Gesture Recognition Using Hidden Markov Models", In Proceedings of the Springer International Gesture Workshop, Sep. 17, 1997, 12 Pages.
Rosenhahn, et al., "Automatic Human Model Generation", In Proceedings of the International Conference of Computer Analysis of Images and Patterns, Sep. 5, 2005, 8 Pages.
Schmidt, et al., "Towards Model-Based Gesture Recognition", In Proceedings of the Fourth IEEE International Conference on Automatic Face and Gesture Recognition, Mar. 28, 2000, 6 Pages.
Shao, et al., "An Open System Architecture for a Multimedia and Multimodal User Interface", In Proceedings of 3rd TIDE Congress, Aug. 24, 1998, 8 Pages.
Provisional Application Filed under U.S. Appl. No. 60/413,998, filed Sep. 19, 2002, 17 Pages.
Sharma, et al., "Speech-Gesture Driven Multimodal Interfaces for Crisis Management", In Proceedings of the IEEE, vol. 91, Issue 9, Sep. 8, 2003, pp. 1327-1354.

(56) References Cited

OTHER PUBLICATIONS

Sheridan, et al., "Virtual Reality Check", In Proceedings of the Technology Review, vol. 96, Issue 7, Oct. 1993, 9 Pages.
Stevens, Jane E., "Flights into Virtual Reality Treating Real World Disorders", In The Washington Post on Science Psychology, Mar. 27, 1995, 2 Pages.
Tashev, et al., "Managing Audio in Wheel Time-TechFest Live!", Retrieved from https://web.archive.org/web/20090301134500/http://community.research.microsoft.com/blogs/techfestlive/archive/2009/02/25/managing-audio-in-wheel-time.aspx, Feb. 25, 2009, 2 Pages.
Walker, et al., "Age Related Differences in Movement Control: Adjusting Submovement Structure to Optimize Performance", In the Journals of Gerontology Series B: Psychological Sciences and Social Sciences, vol. 52, Issue 1, Jan. 1, 1997, 14 Pages.
Welford, Alan T., "Signal, Noise, Performance, and Age", In the Journal of the Human Factors and Ergonomics Society, vol. 23, Issue 1, Feb. 23, 1981, pp. 97-109.
Whitfield, Kermit, "Gesture Interfaces for Automotive Control: (Beyond Digital Expletives)", In 7th Journal for Automotive Design and Production, vol. 115, Issue 7, Jul. 15, 2003, 5 Pages.
Wilson, et al., "GWindows: Towards Robust Perception-Based UI", In Proceedings of the IEEE Conference on Computer Vision and Pattern Recognition Workshop, vol. 5, Jun. 16, 2003, 8 Pages.
Wilson, et al., "Hidden Markov Models for Modeling and Recognizing Gesture Under Variation", In International Journal of Pattern Recognition and Artificial Intelligence, vol. 15, Issue 1, Feb. 2001, 36 Pages.
Wobbrock, et al., "User-Defined Gestures for Surface Computing", In Proceedings of the SIGCHI Conference on Human Factors in Computing Systems, Apr. 4, 2009, 10 Pages.
Worden, et al., "Making Computers Easier for Older Adults to Use: Area Cursors and Sticky Icons", In Proceedings of the ACM SIGCHI Conference on Human Factors in Computing Systems, Mar. 22, 1997, 6 Pages.
Woyke, Elizabeth, "Texas Instruments Sees Big Market for Smartphone Gesture Recognition", Retrieved from https://www.forbes.com/sites/elizabethwoyke/2011/10/31/texas-instruments-sees-big-market-for-smartphone-gesture-recognition/#2305207c72dd, Oct. 31, 2011, 4 Pages.
Wren, et al., "Pfinder: Real-Time Tracking of the Human Body", In IEEE Transactions on Pattern Analysis and Machine Intelligence, vol. 19, Issue 7, Jul. 1997, pp. 780-785.
"Response to Requirement for Restriction/Election Filed in U.S. Appl. No. 14/803,949", filed Jan. 26, 2017, 3 Pages.
"First Office Action and Search Report Issued in Chinese Patent Application No. 201210545421.3", dated Mar. 31, 2015, 14 Pages.
"Notice of Allowance Issued in Chinese Patent Application No. 201210545421.3", dated Nov. 2, 2016, 3 Pages.
"Response Filed in Chinese Patent Application No. 201210545421. 3", Filed Date: Feb. 4, 2016, 11 Pages.
"Response Filed in Chinese Patent Application No. 201210545421. 3", Filed Date: Aug. 5, 2015, 8 Pages.
"Response to Third Office Action Filed in Chinese Patent Application No. 201210545421.3", Filed Date: Aug. 4, 2016, 55 Pages.
"Second Office Action and Search Report Issued in Chinese Patent Application No. 201210545421.3", dated Nov. 30, 2015, 15 Pages.
"Third Office Action Issued in Chinese Patent Application No. 201210545421.3", dated Jun. 3, 2016, 6 Pages.
"First Office Action and Search Report Issued in Chinese Patent Application No. 201210548467.0", dated Feb. 28, 2015, 12 Pages.
"Notice of Allowance Issued in Chinese Patent Application No. 201210548467.0", dated May 4, 2016, 4 Pages.
"Response Filed in Chinese Patent Application No. 201210548467. 0", Filed Date: Jun. 18, 2015, 4 Pages. (w/o English Translation).
"Response Filed in Chinese Patent Application No. 201210548467. 0", Filed Date: Dec. 25, 2015, 11 Pages.
"Second Office Action Issued in Chinese Patent Application No. 201210548467.0", dated Oct. 10, 2015, 8 Pages.
"Office Action Issued in Japanese Patent Application No. 2014-547303", dated Aug. 29, 2017, 7 Pages.
"Office Action Issued in Japanese Patent Application No. 2014-547303", dated Nov. 1, 2016, 8 Pages.
"Request for Examination and Amendment Filed in Japanese Patent Application No. 2014-547303", Filed Date: Nov. 24, 2015, 7 Pages.
"Provisional Application Filed in U.S. Appl. No. 60/367,878", filed Mar. 26, 2002, 6 Pages.
"Provisional Application Filed in U.S. Appl. No. 60/409,435", filed Sep. 10, 2002, 54 Pages.
"Provisional Application Filed in U.S. Appl. No. 61/148,892", filed Jan. 30, 2009, 103 Pages.
Aggarwal, et al., "Human Motion Analysis: A Review", In Proceedings of the IEEE Workshop on Motion of Non-Rigid and Articulated Objects, Jun. 16, 1997, pp. 90-102.
Akyol, et al., "Gesture Control for use in Automobiles", In Proceedings of IAPR Workshop on Machine Vision Applications, Nov. 28, 2000, pp. 349-352.
Alt, et al., "Enabling Micro-Entertainment in Vehicles Based on Context Information", In Proceedings of the 2nd International Conference on Automotive User Interfaces and Interactive Vehicular Applications, Nov. 11, 2010, pp. 117-124.
Althoff, et al., "Robust Multimodal Hand and Head Gesture Recognition for Controlling Automotive Infotainment Systems", In Proceedings of VDI Berichte, vol. 1919, Nov. 22, 2005, 10 Pages.
Aviles-Arriaga, et al., "Dynamic Bayesian Networks for Visual Recognition of Dynamic Gestures", In Journal of Intelligent & Fuzzy Systems, vol. 12, Issue 3, Jan. 1, 2002, pp. 243-250.
Azarbayejani, et al., "Real-Time Self-Calibrating Stereo Person Tracking Using 3-D Shape Estimation from Blob Features", In Proceedings of the IEEE 13th International Conference on Pattern Recognition, vol. 3, Aug. 25, 1996, pp. 627-632.
Azarbayejani, et al., "Visually Controlled Graphics", In Proceedings of the IEEE Transactions on Pattern Analysis and Machine Intelligence, vol. 15, Issue 6, Jun. 1, 1993, pp. 602-605.
Azoz, et al., "Reliable Tracking of Human Arm Dynamics by Multiple Cue Integration and Constraint Fusion", In Proceedings of the IEEE Computer Society Conference on Computer Vision and Pattern Recognition, Jun. 23, 1998, 6 Pages.
Baudel, et al., "CHARADE: Remote Control of Objects using Free-Hand Gestures", In Proceedings of the Communications of the ACM—Special Issue on Computer Augmented Environments: Back to the Real World, vol. 36, Issue 7, Jul. 1, 1993, 10 Pages.
Berard, Francois, "The Perceptual Window: Head Motion as a New Input Stream", In Proceedings of Seventh IFIP Conference on Human-Computer Interaction, Aug. 30, 1999, pp. 238-244.
Breen, et al., "Interactive Occlusion and Collision of Real and Virtual Objects in Augmented Reality", In Technical Report of European Computer Industry Research Center, Feb. 1995, 22 Pages.
Brogan, et al., "Dynamically Simulated Characters in Virtual Environments", In Proceedings of IEEE Computer Graphics and Applications, vol. 18, Issue 5, Sep. 1998, 2 Pages.
Buxton, et al., "A Study of Two-Handed Input", In ACM SIGCHI Bulletin, vol. 17, No. 4, Apr. 1986, pp. 321-326.
Cedras, et al., "Motion-based Recognition: A Survey", In Proceedings of the Image and Vision Computing, vol. 13, No. 2, Mar. 31, 1995, pp. 129-155.
Darrell, et al., "Integrated person tracking using stereo, color, and Pattern detection", In Proceedings of IEEE Computer Society Conference on Computer Vision and Pattern Recognition, Jun. 25, 1998, 10 Pages.
Davies, Chris, "Qualcomm Buys GestureTek Gesture-Recognition Tech for Snapdragon", Retrieved from https://www.slashgear.com/qualcomm-buys-gesturetek-gesture-recognition-tech-for-snapdragon-25167335/, Jul. 25, 2011, 6 Pages.
Diewald, et al., "Mobile Device Integration and Interaction in the Automotive Domain", In Proceedings of the 3rd International Conference on Automotive User Interfaces and Interactive Vehicular Applications, Nov. 2011, 4 Pages.
Fisher, et al., "Virtual Environment Display System", In Proceedings of the ACM Workshop on Interactive 3D graphics, Oct. 23, 1986, 12 Pages.
Fitzgerald, et al., "Multimodal Event Parsing for Intelligent User Interfaces", In Proceedings of the ACM 8th International Conference on Intelligent user interfaces, Jan. 12, 2003, 8 Pages.

(56) References Cited

OTHER PUBLICATIONS

Freeman, et al., "Television Control by Hand Gestures", In Proceedings of the IEEE International Workshop on Automatic Face and Gesture Recognition, Jun. 26, 1995, 5 Pages.
Graf, et al., "In-car Interaction using Search-Based User Interfaces", In Proceedings of the SIGCHI Conference on Human Factors in Computing Systems, Apr. 6, 2008, pp. 1685-1688.
Granieri, et al., "Simulating Humans in VR", Published in the British Computer Society, Academic Press, Oct. 12, 1994, 15 Pages.
Guiard, Yves, "Asymmetric Division of Labor in Human Skilled Bimanual Action: The Kinematic Chain as a Model", In Journal of Motor Behavior, vol. 19, Issue 4, Dec. 1, 1987, 26 Pages.
Hasegawa, et al., "Human-Scale Haptic Interaction with a Reactive Virtual Human in a Real-Time Physics Simulator", In Magazine Computers in Entertainment (CIE)—Theoretical and Practical Computer Applications in Entertainment, vol. 4 Issue 3,, Jul. 1, 2006, 12 Pages.
He, Lei, "Generation of Human Body Models", In Thesis Submitted in Partial Fulfillment of the Requirements for the Degree of Master of Science in Computer Science, Apr. 2005, 111 Pages.
Hongo, et al., "Focus of Attention for Face and Hand Gesture Recognition Using Multiple Cameras", In Proceedings of the Fourth IEEE International Conference on Automatic Face and Gesture Recognition, Mar. 28, 2000, 6 Pages.
Horvitz, et al., "A Computational Architecture for Conversation", In Proceedings of the 7th International Conference on User Modeling, Jun. 1, 1999, 10 Pages.
Horvitz, Eric, "Principles of Mixed-Initiative User Interfaces", In Proceedings of the ACM SIGCHI Conference on Human Factors in Computing Systems, May 1, 1999, 16 Pages.
Isard, et al., "CONDENSATION—Conditional Density Propagation for Visual Tracking", In Proceedings of the International Journal of Computer Vision, vol. 29, Issue 01, Aug. 1998, 24 Pages.
Jojic, et al., "Dectection and Estimation of Pointing Gestures in Dense Disparity Maps", in Proceedings of Fourth IEEE International Conference on Automatic Face and Gesture Recognition, Mar. 28, 2000, pp. 1000-1007.
"Non Final Office Action Issued in U.S. Appl. No. 12/705,014", dated Aug. 8, 2013, 13 Pages.
"BMW Innovation Days Highlight Future BMW Technologies", Retrieved from http://f30.bimmerpost.com/forums/showthread.php?t=594473, Oct. 5, 2011, 48 Pages.
"EyeSight's Hand Gesture Recognition Technology Allows People to Interact with Devices using Simple Hand Gestures", Retrieved from https://web.archive.org/web/20110920203137/http://www.eyesight-tech.com/technology/, Retrieved date: Dec. 14, 2011, 2 Pages.
"GWindows: Light-Weight Stereo Vision for Interaction", Retrieved from: http://www.nuriaoliver.com/gwindows/, Jul. 7, 2005, 2 Pages.
"Simulation and Training", In Virtual Reality-Division Incorporated, Dec. 1994, 6 Pages.
"Virtual High Anxiety", In Technology Review, vol. 96, Issue 7, Aug. 1995, 2 Pages.
"Final Office Action Issued in U.S. Appl. No. 10/396,653", dated Feb. 20, 2009, 12 Pages.
"Final Office Action Issued in U.S. Appl. No. 10/396,653", dated Feb. 25, 2008, 20 Pages.
"Final Office Action Issued in U.S. Appl. No. 10/396,653", dated Feb. 26, 2007, 19 Pages.
"Non Final Office Action Issued in U.S. Appl. No. 10/396,653", dated Sep. 6, 2007, 17 Pages.
"Non Final Office Action Issued in U.S. Appl. No. 10/396,653", dated Sep. 8, 2008, 14 Pages.
"Non Final Office Action Issued in U.S. Appl. No. 10/396,653", dated Sep. 19, 2006, 25 Pages.
"Notice of Allowance Issued in U.S. Appl. No. 10/396,653", dated Nov. 19, 2009, 7 Pages.
"Final Office Action Issued in U.S. Appl. No. 10/724,950", dated Apr. 16, 2009, 21 Pages.

"Final Office Action Issued in U.S. Appl. No. 10/724,950", dated Jun. 9, 2010, 21 Pages.
"Final Office Action Issued in U.S. Appl. No. 10/724,950", dated May 16, 2008, 18 Pages.
"Final Office Action Issued in U.S. Appl. No. 10/724,950", dated Feb. 1, 2011, 25 Pages.
"Final Office Action Issued in U.S. Appl. No. 10/724,950", dated Apr. 5, 2012, 31 Pages.
"Non Final Office Action Issued in U.S. Appl. No. 10/724,950", dated May 20, 2011, 29 Pages.
"Non Final Office Action Issued in U.S. Appl. No. 10/724,950", dated Oct. 13, 2011, 29 Pages.
"Non Final Office Action Issued in U.S. Appl. No. 10/724,950", dated Nov. 14, 2008, 24 Pages.
"Non Final Office Action Issued in U.S. Appl. No. 10/724,950", dated Nov. 29, 2007, 17 Pages.
"Non Final Office Action Issued in U.S. Appl. No. 10/724,950", dated Dec. 28, 2009, 19 Pages.
"Non Final Office Action Issued in U.S. Appl. No. 10/724,950", dated Jun. 20, 2007, 9 Pages.
"Non Final Office Action Issued in U.S. Appl. No. 10/724,950", dated Oct. 5, 2010, 23 Pages.
"Notice of Allowance Issued in U.S. Appl. No. 10/724,950", dated Oct. 7, 2013, 10 Pages.
"Notice of Allowance Issued in U.S. Appl. No. 10/724,950", dated Jan. 31, 2014, 6 Pages.
"Application as Filed in U.S. Appl. No. 12/076,224", filed Mar. 14, 2008, 93 Pages.
"Application as Filed in U.S. Appl. No. 12/230,440", filed Aug. 28, 2008, 101 Pages.
"Non Final Office Action Issued in U.S. Appl. No. 12/289,099", dated May 14, 2013, 23 Pages.
"Non Final Office Action Issued in U.S. Appl. No. 12/457,656", dated Sep. 7, 2011, 14 Pages.
"Non Final Office Action Issued in U.S. Appl. No. 12/457,656", dated Jul. 13, 2012, 17 Pages.
"Applicant Initialed Interview Summary and After Final Consideration Pilot Program Decision Issued in U.S. Appl. No. 12/494,303", dated Dec. 22, 2016, 6 Pages.
Zhu, et al., "Controlled Human Pose Estimation From Depth Image Streams", In Proceeding of IEEE Computer Society Conference on Computer Vision and Pattern Recognition Workshops, Jun. 23, 2008, 8 Pages.
"Final Office Action Issued in U.S. Appl. No. 12/494,303", dated Jan. 29, 2014, 12 Pages.
"Final Office Action Issued in U.S. Appl. No. 12/494,303", dated Oct. 9, 2013, 10 Pages.
"Final Office Action Issued in U.S. Appl. No. 12/494,303", dated Mar. 15, 2018, 20 Pages.
"Non Final Office Action Issued in U.S. Appl. No. 12/494,303", dated May 15, 2013, 15 Pages.
"Preliminary Amendment Issued in U.S. Appl. No. 12/494,303", dated Sep. 9, 2010, 13 Pages.
"Response to Final Office Action Filed in U.S. Appl. No. 12/494,303", filed Jan. 9, 2014, 9 Pages.
"Response to Final Office Action Filed in U.S. Appl. No. 12/494,303", filed May 29, 2014, 10 Pages.
"Response to Final Office Action Filed in U.S. Appl. No. 12/494,303", filed Dec. 23, 2016, 9 Pages.
"Response to Non Final Office Action Filed in U.S. Appl. No. 12/494,303", filed Aug. 3, 2016, 11 Pages.
"Final Office Action Issued in U.S. Appl. No. 12/495,105", dated Aug. 29, 2012, 16 Pages.
"Non Final Office Action Issued in U.S. Appl. No. 12/495,105", dated Nov. 1, 2011, 18 Pages.
"Non Final Office Action Issued in U.S. Appl. No. 12/495,105", dated Jan. 24, 2014, 23 Pages.
"Advisory Action Issued in U.S. Appl. No. 12/705,014", dated Nov. 4, 2016, 3 Pages.
"Applicant Initialed Interview Summary Issued in U.S. Appl. No. 12/705,014", dated Dec. 7, 2016, 3 Pages.
"Final Office Action Issued in U.S. Appl. No. 12/705,014", dated Mar. 6, 2013, 11 Pages.

(56) References Cited

OTHER PUBLICATIONS

"Final Office Action Issued in U.S. Appl. No. 12/705,014", dated Jan. 6, 2014, 10 Pages.
Kabbash, et al., "The "Prince" Technique: Fitts' Law and Selection Using Area Cursors", In Proceedings of the SIGCHI Conference on Human Factors in Computing Systems, May 7, 1995, 11 Pages.
"Non Final Office Action Issued in U.S. Appl. No. 12/705,014", dated Aug. 1, 2018, 14 Pages.
"Office Action Issued in Japanese Patent Application No. 2017-070380", dated Jun. 5, 2018, 7 Pages.
Yang, et al., "Reconstruction of 3D Human Body Pose From Stereo Image Sequences Based on Top Down Learning", In Proceedings of 18th International Conference on Pattern Recognition, vol. 40, Issue 11, Nov. 1, 2007, pp. 3121-3131.
Yoda, et al., "Utilization of Stereo Disparity and Optical Flow Information for Human Interaction", In Proceedings of the IEEE Sixth International Conference on Computer Vision, Jan. 4, 1998, 6 Pages.
Zhai, et al., "The "Silk Cursor": Investigating Transparency for 3D Target Acquisition", In Proceedings of the ACM SIGCHI Conference on Human Factors in Computing Systems, Apr. 24, 1994, 7 Pages.
Zhang, Zhengyou, "A Flexible New Technique for Camera Calibration", In IEEE Transactions on Pattern Analysis and Machine Intelligence, vol. 22, Issue 11, Nov. 2000, pp. 1330-1334.
Zhang, Zhengyou, "Flexible Camera Calibration by Viewing a Plane from Unknown Orientations", In Proceedings of the Seventh IEEE International Conference on Computer Vision, vol. 1, Sep. 20, 1999, 8 Pages.
Zhao, Liang, "Dressed Human Modeling, Detection, and Parts Localization", A Dissertation Submitted in Partial Fulfillment of the Requirements for the Degree of Doctor of Philosophy at The Robotics Institute Carnegie Mellon University Pittsburgh., Jul. 26, 2001, 121 Pages.
"Final Office Action Issued in U.S. Appl. No. 12/494,303", dated Mar. 28, 2019, 15 Pages.
"Non Final Office Action Issued in U.S. Appl. No. 12/494,303", dated Nov. 27, 2018, 13 Pages.
"Final Office Action Issued in U.S. Appl. No. 12/705,014", dated Nov. 16, 2018, 15 Pages.
Sharma, et al., "Method of Visual and Acoustic Signal Co-Analysis for Co-Verbal Gesture Recognition", In Technical Report submitted to Department of Computer Science and Eng, Pennsylvania State University, 2010, 17 Pages.
"Office Action Issued in Japanese Patent Application No. 2017-070380", dated Mar. 5, 2019, 6 Pages.
"Notice of Allowance Issued in U.S. Appl. No. 12/494,303", dated Oct. 17, 2019, 6 Pages.

* cited by examiner

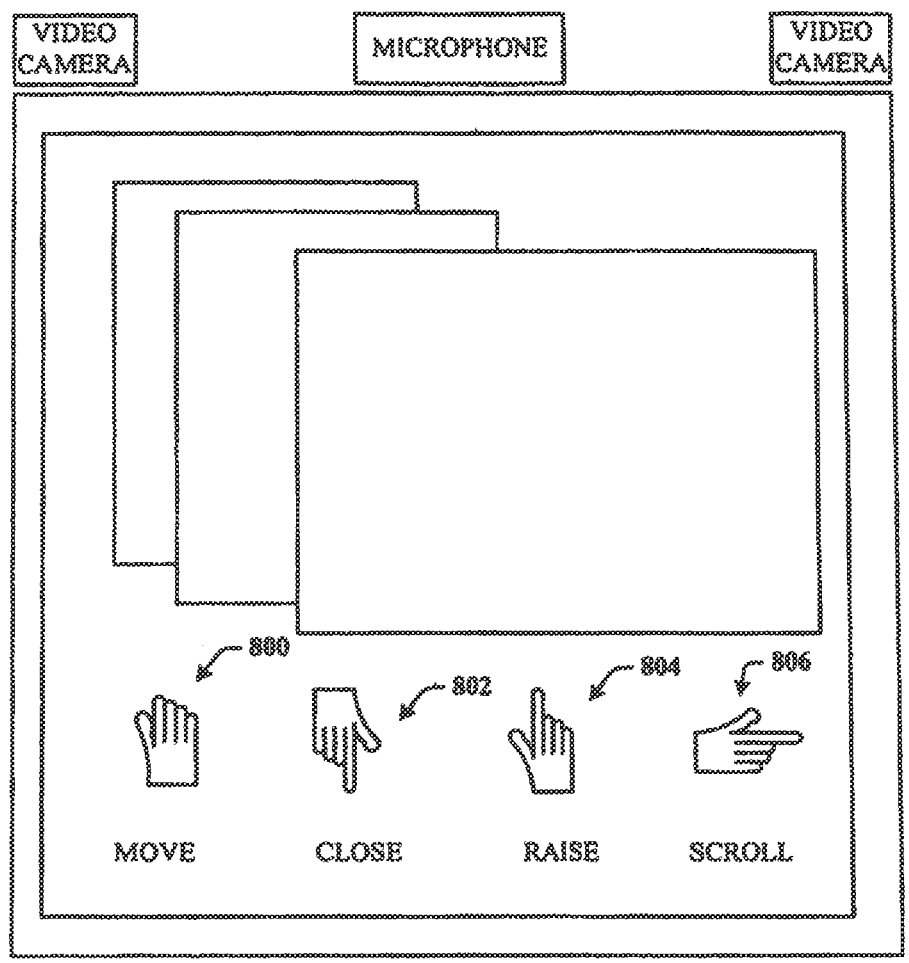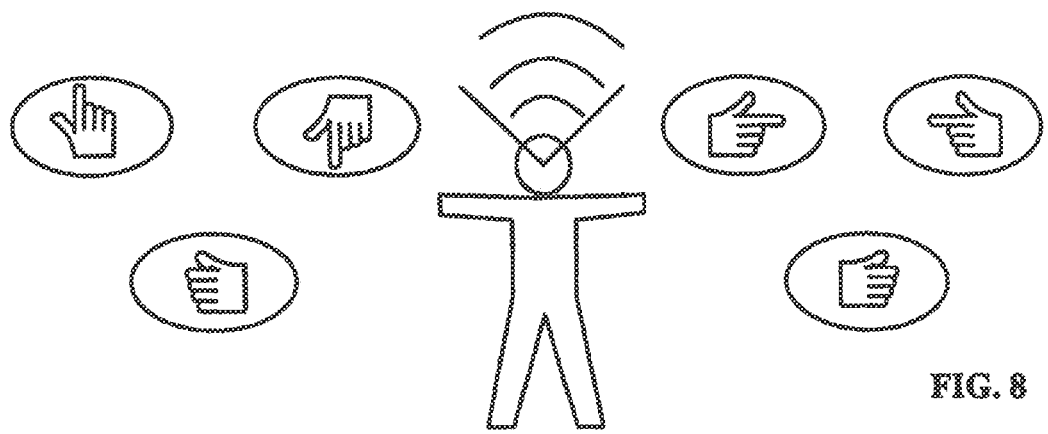
FIG. 8

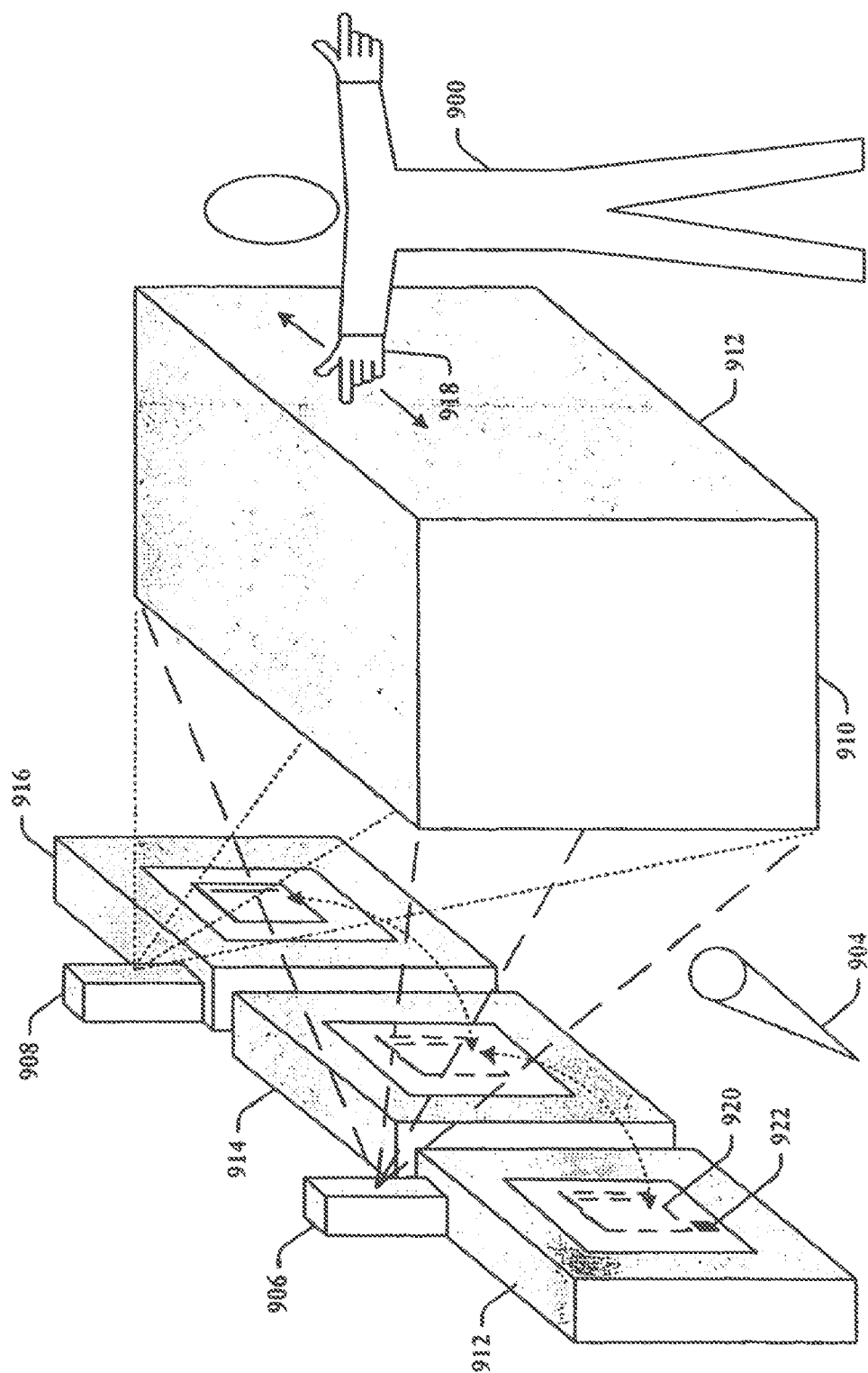

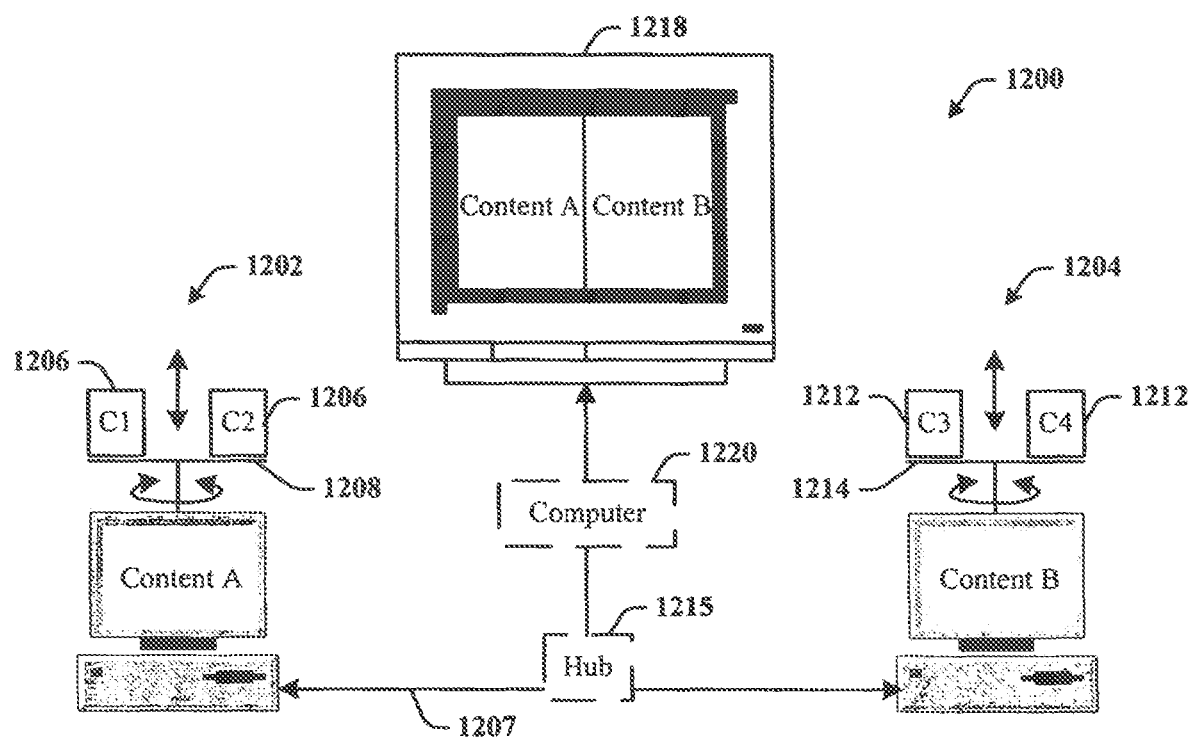
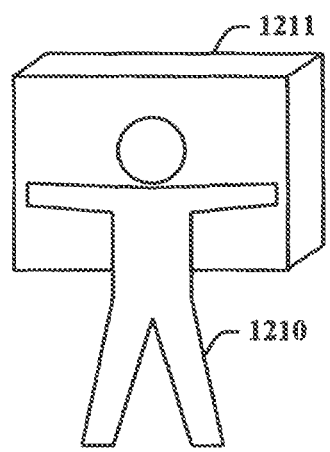
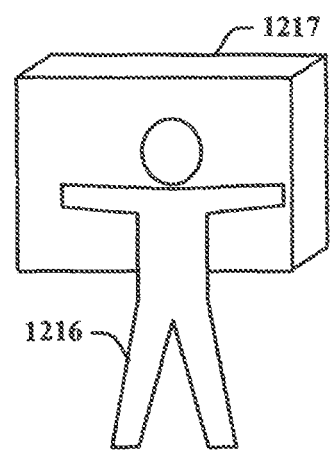
FIG. 12

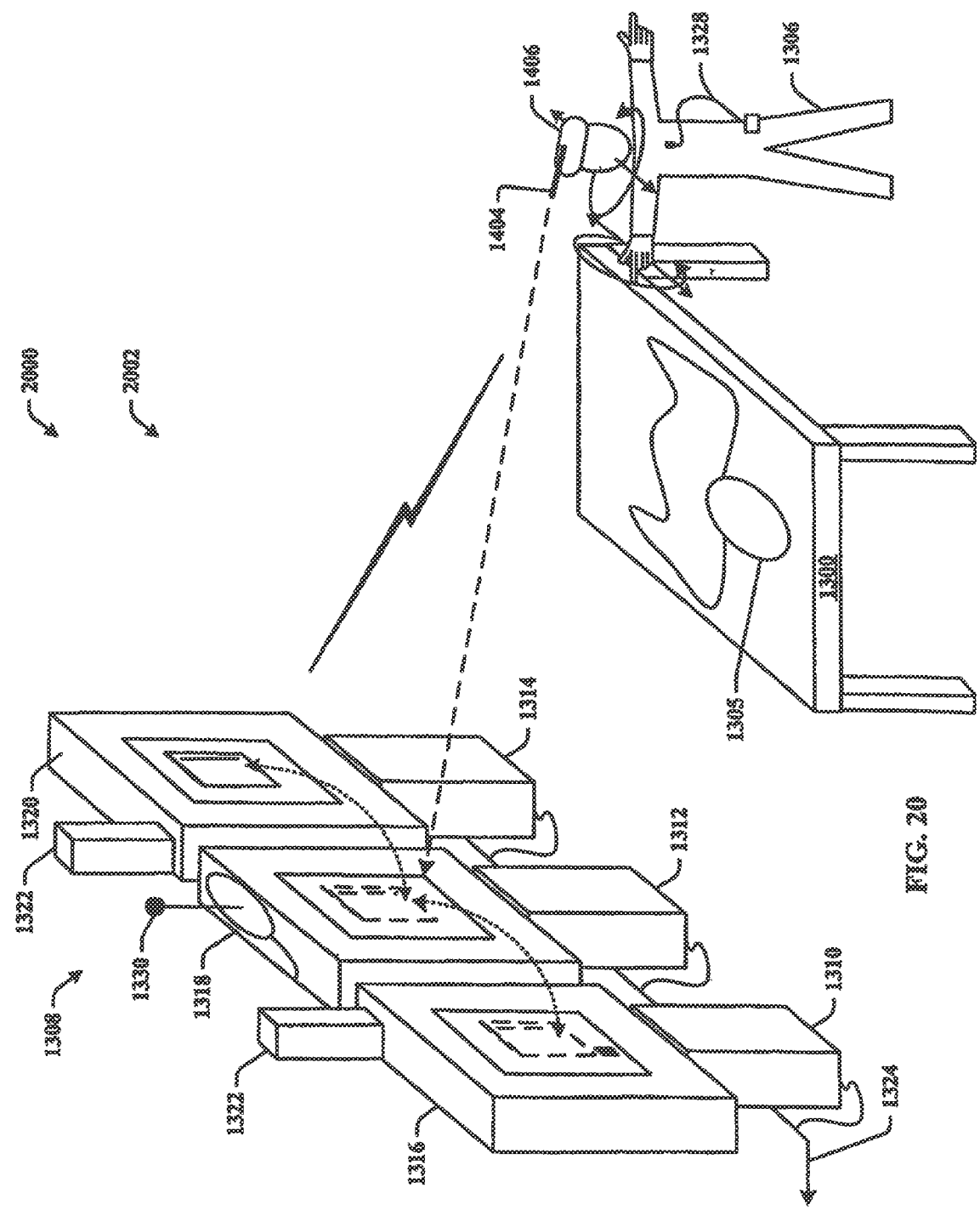

SAMPLE GESTURE(S) AND RELATED USER COMMAND (CONT'D)
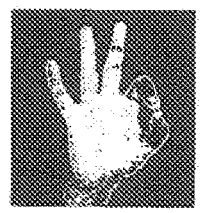
← 2120
IMPOSE IMAGE ONTO TRI-AXIAL GRID
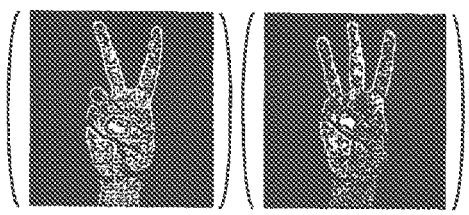
← 2122
SELECT X-AXIS (Y-AXIS) OR (Z-AXIS) OF ROTATION
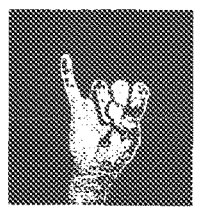
← 2124
STOPPING, STARTING, AND LOOPING VIDEOS
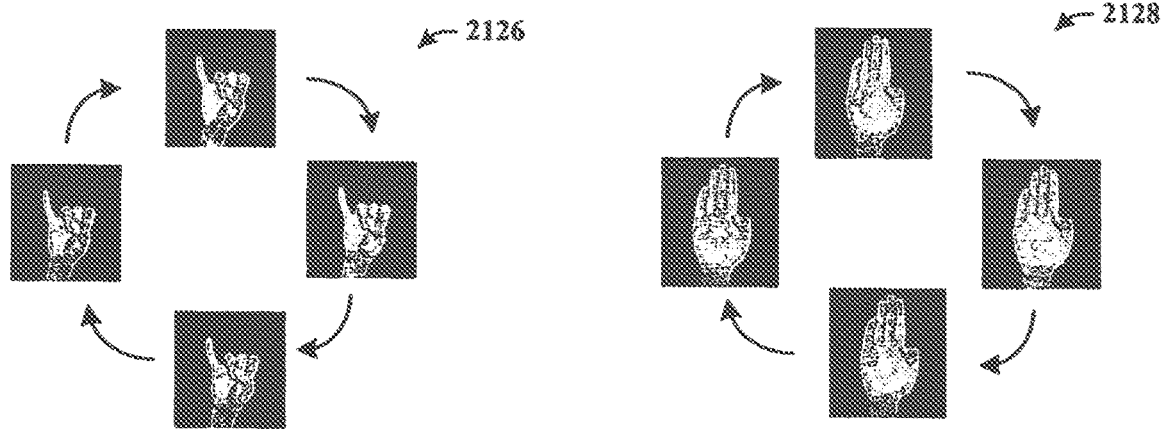
← 2126
INTENSITY CONTROLS; VOLUME ON/OFF AND AMPLITUDE
← 2128
ROTATE IMAGE ABOUT AN AXIS ACCORDING TO SPEED OF HAND MOVEMENT, STOP WHEN HAND STOPS
FIG. 21C SAMPLE GESTURE(S) + VOICE COMMANDS TO RELATED USER COMMAND
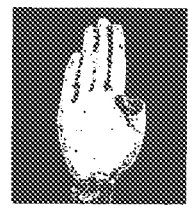  ZOOM IN UNTIL GESTURE CHANGED — 2130
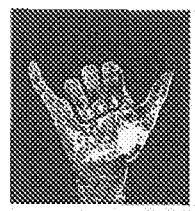 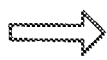 ZOOM OUT UNTIL GESTURE CHANGED — 2132
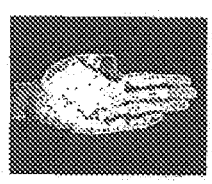 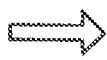 MOVE IMAGE TO THE RIGHT UNTIL GESTURE CHANGES, THEN STOP MOVEMENT — 2134
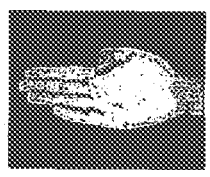  MOVE IMAGE TO THE LEFT UNTIL GESTURE CHANGES, THEN STOP MOVEMENT — 2136
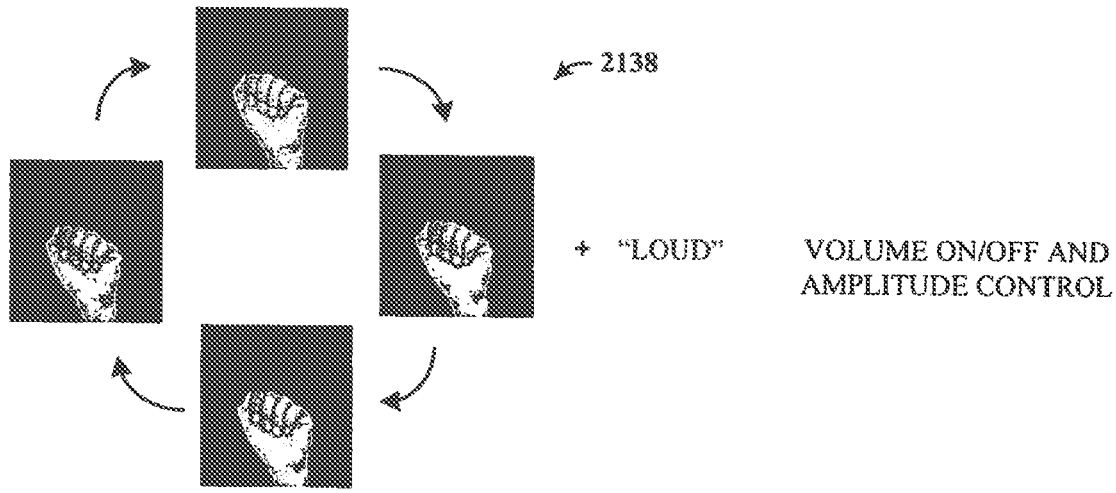
FIG. 21D

SAMPLE GESTURE(S) + VOICE COMMANDS + GAZE
SIGNALS TO RELATED USER COMMAND

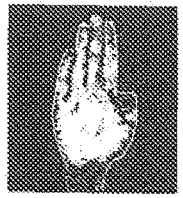 + "ZOOM" + (GAZE IN DIRECTION OF IMAGE ON FIRST DISPLAY) = ZOOM IN ON IMAGE OF FIRST DISPLAY UNTIL GESTURE CHANGED — 2140

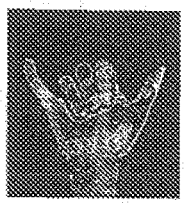 + "ZOOM" + (GAZE IN DIRECTION OF IMAGE ON SECOND DISPLAY) = ZOOM OUT ON IMAGE OF SECOND DISPLAY UNTIL GESTURE CHANGED — 2142

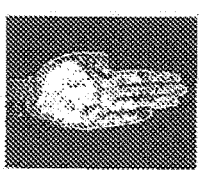 + "MOVE" + (GAZE IN DIRECTION OF IMAGE ON FIRST DISPLAY) = MOVE IMAGE OF FIRST DISPLAY TO THE RIGHT UNTIL GESTURE CHANGES, THEN STOP MOVEMENT — 2144

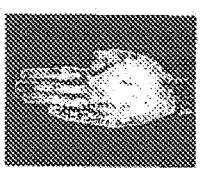 + "MOVE" + (GAZE IN DIRECTION OF IMAGE ON SECOND DISPLAY) = MOVE IMAGE OF SECOND DISPLAY TO THE RIGHT UNTIL GESTURE CHANGES, THEN STOP MOVEMENT — 2146

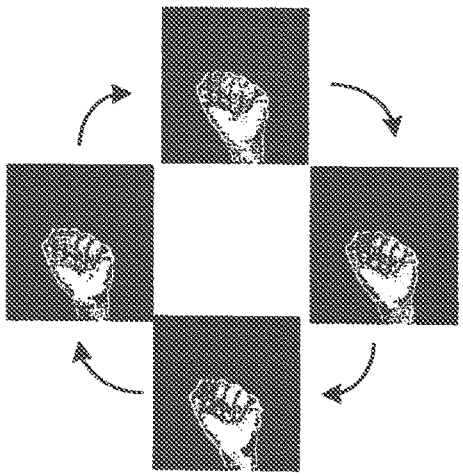 + "LOUD" + (GAZE IN DIRECTION OF GRAPHICAL INTERFACE OF AUDIO CONTROL DEVICE ON THIRD DISPLAY) = VOLUME ON/OFF AND AMPLITUDE CONTROL — 2148

FIG. 21E

SYSTEM AND METHOD FOR EXECUTING A PROCESS USING ACCELEROMETER SIGNALS

CROSS-REFERENCE TO RELATED APPLICATIONS

This application is a continuation of U.S. patent application Ser. No. 13/919,995, filed Jun. 17, 2013, entitled "System and Method for Executing a Game Process," which is pending and which is a continuation application of U.S. patent application Ser. No. 12/457,656, filed Jun. 17, 2009, entitled "System and Method for Executing a Game Process," which is abandoned and which is a continuation of U.S. patent application Ser. No. 12/289,099, filed Oct. 20, 2008, entitled "System and Method for Executing a Game Process," which is abandoned and which is a divisional of U.S. patent application Ser. No. 10/724,950, filed Dec. 1, 2003, entitled "Architecture for Controlling a Computer Using Hand Gestures," which has issued as U.S. Pat. No. 8,745,541 and which is a continuation-in-part of U.S. patent application Ser. No. 10/396,653, filed Mar. 25, 2003, entitled "Architecture for Controlling a Computer Using Hand Gestures," which has issued as U.S. Pat. No. 7,665,041, the contents of each application being expressly incorporated herein by reference.

TECHNICAL FIELD

The present invention relates generally to controlling a computer system, and more particularly to a system and method to implement alternative modalities for controlling computer programs and devices, and manipulating on-screen objects through the use of one or more body gestures, or a combination of gestures and supplementary signals.

BACKGROUND OF THE INVENTION

A user interface facilitates the interaction between a computer and computer user by enhancing the user's ability to utilize application programs. The traditional interface between a human user and a typical personal computer is implemented with graphical displays and is generally referred to as a graphical user interface (GUI). Input to the computer or particular application program is accomplished through the presentation of graphical information on the computer screen and through the use of a keyboard and/or mouse, trackball or other similar implements. Many systems employed for use in public areas utilize touch screen implementations whereby the user touches a designated area of a screen to effect the desired input. Airport electronic ticket check-in kiosks and rental car direction systems are examples of such systems. There are, however, many applications where the traditional user interface is less practical or efficient.

The traditional computer interface is not ideal for a number of applications. Providing stand-up presentations or other type of visual presentations to lame audiences, is but one example. In this example, a presenter generally stands in front of the audience and provides a verbal dialog in conjunction with the visual presentation that is projected on a large display or screen. Manipulation of the presentation by the presenter is generally controlled through use of awkward remote controls, which frequently suffer from inconsistent and less precise operation, or require the cooperation of another individual. Traditional user interfaces require the user either to provide input via the keyboard or to exhibit a degree of skill and precision more difficult to implement with a remote control than a traditional mouse and keyboard. Other examples include control of video, audio, and display components of a media room. Switching between sources, advancing fast fast-forward, rewinding, changing chapters, changing volume, etc., can be very cumbersome in a professional studio as well as in the home. Similarly, traditional interfaces are not well suited for smaller, specialized electronic gadgets.

Additionally, people with motion impairment conditions find it very challenging to cope with traditional user interfaces and computer access systems. Such conditions include Cerebral Palsy, Muscular Dystrophy, Friedrich's Ataxia, and spinal injuries or disorders. These conditions and disorders are often accompanied by tremors, spasms, loss of coordination, restricted range of movement, reduced muscle strength, and other motion impairing symptoms.

Similar symptoms exist in the growing elderly segment of the population. As people age, their motor skills decline and impact the ability to perform many tasks. It is known that as people age, their cognitive, perceptual and motor skills decline, with negative effects in their ability to perform many tasks. The requirement to position a cursor, particularly with smaller graphical presentations, can often be a significant barrier for elderly or afflicted computer users. Computers can play an increasingly important role in helping older adults function well in society.

Graphical interfaces contribute to the ease of use of computers. WIMP (Window, Icon, Menu, Pointing device (or Pull-down menu)) interfaces allow fairly non-trivial operations to be performed with a few mouse motions and clicks. However, at the same time, this shift in the user interaction from a primarily text-oriented experience to a point-and-click experience has erected new barriers between people with disabilities and the computer. For example, for older adults, there is evidence that using the mouse can be quite challenging. There is extensive literature demonstrating that the ability to make small movements decreases with age. This decreased ability can have a major effect on the ability of older adults to use a pointing device on a computer. It has been shown that even experienced older computer users move a cursor much more slowly and less accurately than their younger counterparts. In addition, older adults seem to have increased difficulty (as compared to younger users) when targets become smaller. For older computer users, positioning a cursor can be a severe limitation.

One solution to the problem of decreased ability to position the cursor with a mouse is to simply increase the size of the targets in computer displays, which can often be counter-productive since less information is being displayed, requiring more navigation. Another approach is to constrain the movement of the mouse to follow on-screen objects, as with sticky icons or solid borders that do not allow cursors to overshoot the target. The is evidence that performance with area cursors (possibly translucent) is better than performance with regular cursors for some target acquisition tasks.

One method to facilitate computer access for users with motion impairment conditions and for applications, in which the traditional user interfaces are cumbersome, is through use of perceptual user interfaces. Perceptual user interfaces utilize alternate sensing modalities, such as the capability of sensing physical gestures of the user, to replace or complement traditional input devices such as the mouse and keyboard. Perceptual user interfaces promise modes of fluid computer-human interaction that complement and/or replace the mouse and keyboard, particularly in non-desktop applications such as control for a media room.

One study indicates that adding a simple gesture-based navigation facility to web browsers can significantly reduce the time taken to carry out one of the most common actions in computer use, i.e., using the "back" button (or function) to return to previously visited pages. Subjective ratings by users in experiments showed a strong preference for a "flick" system, where the users would flick the mouse left or right to go back or forward in the web browser.

In the simplest view, gestures play a symbolic communication role similar to speech, suggesting that for simple tasks gestures can enhance or replace speech recognition. Small gestures near the keyboard or mouse do not induce fatigue as quickly as sustained whole arm postures. Previous studies indicate that users find gesture-based systems highly desirable, but that users are also dissatisfied with the recognition accuracy of gesture recognizers. Furthermore, experimental results indicate that a user's difficulty with gestures is in part due to a lack of understanding of how gesture recognition works. The studies highlight the ability of users to learn and remember gestures as an important design consideration.

Even when a mouse and keyboard are available, users may find it attractive to manipulate often-used applications while away from the keyboard, in what can be called a "casual interface" or "lean-back" posture. Browsing e-mail over morning coffee might be accomplished by mapping simple gestures to "next message" and "delete message".

Gestures can compensate for the limitations of the mouse when the display is several times larger than a typical display. In such a scenario, gestures can provide mechanisms to restore the ability to quickly reach any part of the display, where once a mouse was adequate with a small display. Similarly, in a multiple display scenario it is desirable to have a fast comfortable way to indicate a particular display. For example, the foreground object can be "bumped" to another display by gesturing in the direction of the target display.

However, examples of perceptual user interfaces to date are dependent on significant limiting assumptions. One type of perceptual user interface utilizes color models that make certain assumptions about the color of an object. Proper operation of the system is dependent on proper lighting conditions and can be negatively impacted when the system is moved from one location to another as a result of changes in lighting conditions, or simply when the lighting conditions change in the room. Factors that impact performance include sun light versus artificial light, florescent light versus incandescent light, direct illumination versus indirect illumination, and the like. Additionally, most attempts to develop perceptual user interfaces require the user to wear specialized devices such as gloves, headsets, or close-talk microphones. The use of such devices is generally found to be distracting and intrusive for the user.

Thus perceptual user interfaces have been slow to emerge. The reasons include heavy computational burdens, unreasonable calibration demands, required use of intrusive and distracting devices, and a general lack of robustness outside of specific laboratory conditions. For these and similar reasons, there has been little advancement in systems and methods for exploiting perceptual user interfaces. However, as the trend towards smaller, specialized electronic gadgets continues to grow, so does the need for alternate methods for interaction between the user and the electronic device. Many of these specialized devices are too small and the applications unsophisticated to utilize the traditional input keyboard and mouse devices. Examples of such devices include TabletPCs, Media center PCs, kiosks, hand held computers, home appliances, video games, and wall sized displays, along with many others. In these, and other applications, the perceptual user interface provides a significant advancement in computer control over traditional computer interaction modalities.

In light of these findings, what is needed is to standardize a small set of easily learned gestures, the semantics of which are determined by application context. A small set of very simple gestures can offer significant bits of functionality where they are needed most. For example, dismissing a notification window can be accomplished by a quick gesture to the one side or the other, as in shooing a fly. Another example is gestures for "next" and "back" functionality found in web browsers, presentation programs (e.g., PowerPoint™) and other applications. Note that in many cases the surface forms of these various gestures can remain the same throughout these examples, while the semantics of the gestures depends on the application at hand. Providing a small set of standard gestures eases problems users have in recalling how gestures are performed, and also allows for simpler and more robust signal processing and recognition processes.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention disclosed and claimed herein, in one aspect thereof; comprises a system for controlling a computer using gestures. The system includes a 3-D imaging system that performs gesture recognition and interpretation based on a previous mapping of a plurality of hand poses and orientations to user commands for a given user. When the user is identified to the system, the imaging system images gestures presented by the user, performs a lookup for the user command associated with the captured image(s), and executes the user command(s) to effect control of the computer, programs, and connected devices.

In another aspect of the present invention, the system includes a wireless device worn by the person. The wireless device includes one or more sensors that measure at least velocity, acceleration, and orientation of the device. The corresponding signals are transmitted to a computer system, processed, and interpreted to determine an object at which the device is pointed and the action to be taken on the object. Once the signals have been interpreted, the computer is controlled to interact with the object, which object can be a device and/or system connected to the computer, and software running on the computer. In one application, the wireless device is used in a medical environment and worn on the head of a medical person allowing free use of the hands. Head movements facilitate control of the computer. In another multimodal approach, the person can also wear a wireless microphone to communicate voice signals to the computer separately or in combination with head movements for control thereof.

In yet another aspect of the present invention, a multimodal approach can be employed such that a person uses the wireless device in combination with the imaging capabilities of the 3-D imaging system.

In still another aspect of the present invention, the multimodal approach includes any combination of the 3-D imaging system, the wireless device, and vocalization to control the computer system and, hardware and software associated therewith. This approach finds application in a medical environment such as an operating room, for example.

In another aspect of the present invention, an engagement volume is employed in a medical environment such that one or both hands of the medical person are free to engage the volume and control the computer system, during, for example, a patient operation. The volume is defined in space over the part of the patient undergoing the operation, and the hands of the medical person are used in the form of gestures to control the system for the presentation of medical information.

In accordance with another aspect thereof, the present invention facilitates adapting the system to the particular preferences of an individual user. The system and method allow the user to tailor the system to recognize specific hand gestures and verbal commands and to associate these hand gestures and verbal commands with particular actions to be taken. This capability allows different users, which may prefer to make different motions for a given command, the ability to tailor the system in a way most efficient for their personal use. Similarly, different users can choose to use different verbal commands to perform the same function.

In still another aspect of the present invention, the system employs a learning capability such that nuances of a user can be learned by the system and adapted to the user profile of gestures, vocalizations, etc.

The following description and the annexed drawings set forth in detail certain illustrative aspects of the invention. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 8 illustrates an alternative embodiment wherein a unique icon is displayed in association with a name of a specific recognized command, in accordance with an aspect of the present invention.

FIGS. 9A and 9B illustrate an engagement plane and volume of both single and multiple monitor implementations, in accordance with an aspect of the present invention.

FIG. 12 illustrates a network implementation of the present invention.

FIG. 20 illustrates a medical environment in which a 3-D imaging computer control system is employed with the remote control device to process hand (or body) gestures and control the system in accordance with the present invention.

FIG. 21C illustrates additional sample one-handed gestures that can be used to control the operation computing system in accordance with the present invention.

FIG. 21D illustrates additional sample one-handed gestures used in combination with voice commands that can be used to control the operation computing system in accordance with the present invention.

FIG. 21E illustrates additional sample one-handed gestures used in combination with voice commands and gaze signals that can be used to control the operation computing system in accordance with the present invention.

DETAILED DESCRIPTION OF THE INVENTION

Figure 24:
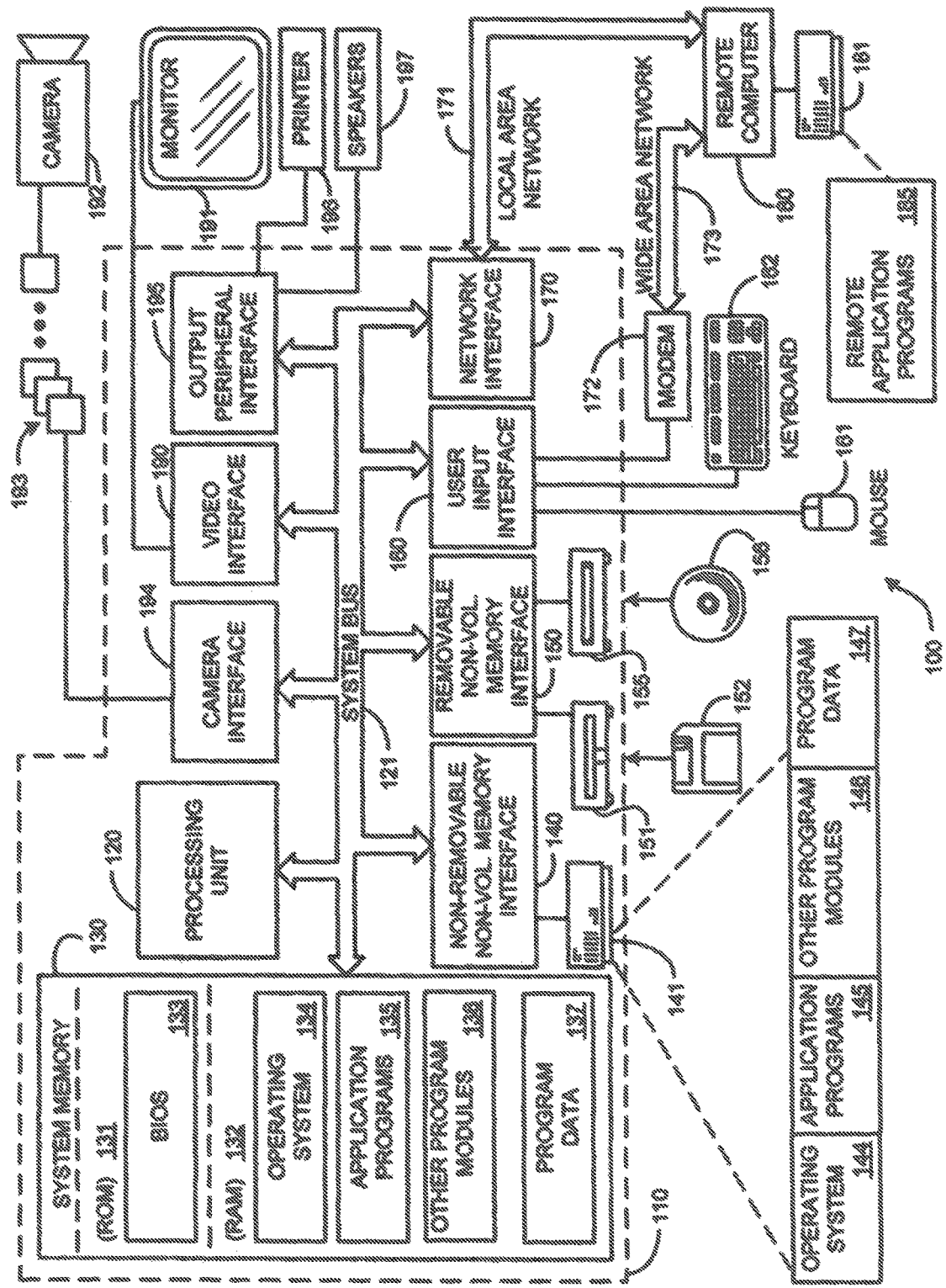
FIG. 24 is a diagram depicting a general purpose computing device constituting an exemplary system for implementing the host computer of the present invention.

Referring to FIG. 24, there is shown an exemplary computer/computing device for implementing the processes of the present invention. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention relates to a system and methodology for implementing a perceptual user interface comprising alternative modalities for controlling computer programs and manipulating on-screen objects through hand gestures or a combination of hand gestures and/or verbal commands. A perceptual user interface system is provided that tracks hand movements and provides for the control of computer programs and manipulation of on-screen objects in response to hand gestures performed by the user. Similarly, the system provides for the control of computer programs and manipulation of on-screen objects in response to verbal commands spoken by the user. Further, the gestures and/or verbal commands can be tailored by a particular user to suit that user's personal preferences. The system operates in real time and is robust, light-weight and responsive. The system provides a relatively inexpensive capability for the recognition of hand gestures and verbal commands.

Figure 22:
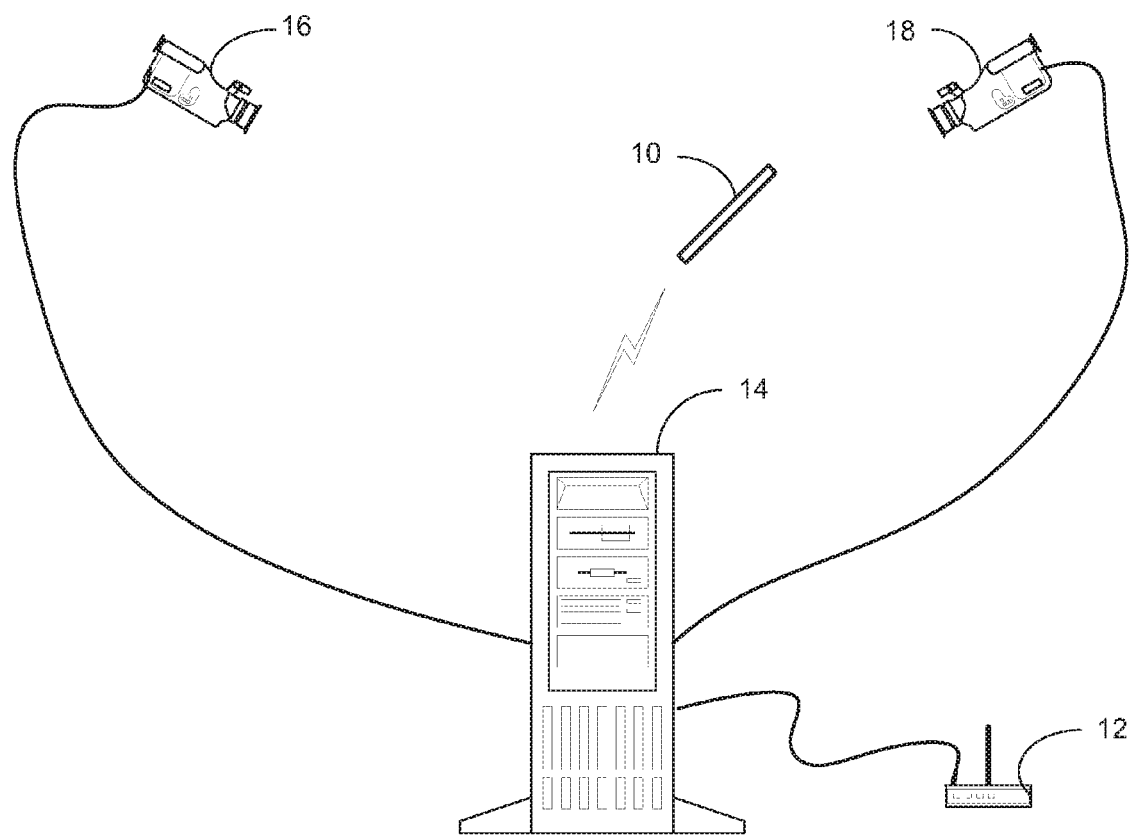
FIG. 22 is a diagram depicting an object selection system according to the present invention.

In general, the present multimodal interface control system requires an object selection system that is capable of allowing a user to point a pointing device (referred to as a pointer) at an object in the environment that is, or is associated with, an electronic component that is controllable by the control system, and by computing the orientation and location of the pointer in terms of the environment's predefined coordinate system, can determine that the user is pointing at the object. Any object selection system meeting the foregoing criteria can be used. One such system is the subject of a co-pending U.S. patent application entitled "A SYSTEM AND PROCESS FOR SELECTING OBJECTS IN A UBIQUITOUS COMPUTING ENVIRONMENT", having a Ser. No. of Ser. No. 10/160,692, and a filing date of May 31, 2002 (issued Jan. 3, 2006 as U.S. Pat. No. 6,982,697). Referring to FIG. 22 herein, the object selection system described in the co-pending application employs a wireless pointer 10, which is pointed by a user at an object in the surrounding environment (such as a room) that the user wishes to affect. For example, the user might point the device 10 at a lamp with the intention of turning the lamp on or off. The wireless pointer 10 transmits data messages to a RF transceiver base station 12, which is in communication with a host computer 14, such as a personal computer (PC). In tested versions of the object selection system, communications between the base station 12 and the host computer 14 were accomplished serially via a conventional RS232 communication interface. However, other communication interfaces can also be employed as desired. For example, the communications could be accomplished using a Universal System Bus (USB), or IEEE 1394 (Firewire) interface, or even a wireless interface. The base station 12 forwards data received from the pointer 10 to the host computer 14 when a data message is received. The host computer 14 then computes the current 3D orientation of the pointer 10 from the aforementioned received data. The process used for this computation will be described in detail later.

The object selection system also includes components for determining the 3D location of the pointer 10. Both the orientation and location of the pointer within the environment in which it is operating are needed to determine where the user is pointing the device. In tested embodiments of the system these components included a pair of video cameras 16, 18 with infrared-pass filters. These cameras 16, 18 are mounted at separate locations within the environment such that each images the portion of the environment where the user will be operating the pointer 10 from a different viewpoint. A wide angle lens can be used for this purpose if necessary. Each camera 16, 18 is also connected via any conventional wireless or wired pathway to the host computer 14, so as to provide image data to the host computer 14. In tested embodiments of the system, the communication interface between the each camera 16, 18 and the host computer 14 was accomplished using a wired IEEE 1394 (i.e., Firewire) interface. The process by which the 3D location of the pointer 10 is determined using the image data provided from the cameras 16, 18 will also be discussed in detail later.

Figure 23:
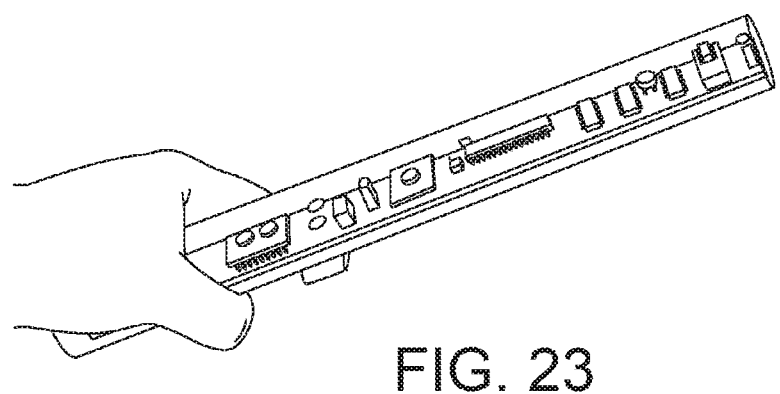
FIG. 23 is an image depicting one version of the wireless RF pointer employed in the object selection system of FIG. 22, where the case is transparent revealing the electronic component within.

The aforementioned wireless pointer is a small hand-held unit that in the tested versions of the object selection system resembled a cylindrical wand, as shown in FIG. 23. However, the pointer can take on many other forms as well. In fact the pointer can take on any shape that is capable of accommodating the internal electronics and external indicator lights and actuators associated with the device—although preferably the chosen shape should be amenable to being pointed with a readily discernable front or pointing end. Some examples of possible alternate shapes for the pointer would include one resembling a remote control unit for a stereo or television, or one resembling an automobile key fob, or one resembling a writing pen. The aforementioned wireless pointer is a small hand-held unit that in the tested versions of the object selection system resembled a cylindrical wand, as shown in FIG. 23. However, the pointer can take on many other forms as well. In fact the pointer can take on any shape that is capable of accommodating the internal electronics and external indicator lights and actuators associated with the device—although preferably the chosen shape should be amenable to being pointed with a readily discernable front or pointing end. Some examples of possible alternate shapes for the pointer would include one resembling a remote control unit for a stereo or television, or one resembling an automobile key fob, or one resembling a writing pen.

Figure 1:
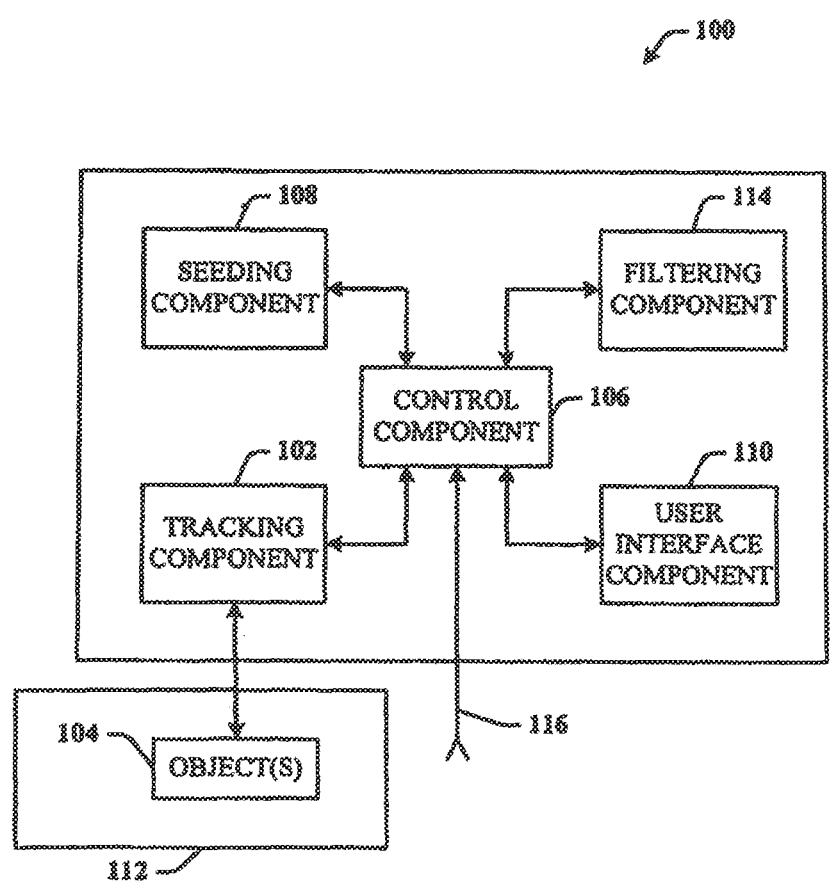
FIG. 1 illustrates a system block diagram of components of the present invention for controlling a computer and/or other hardware/software peripherals interfaced thereto.

Referring now to FIG. 1 and FIG. 22, there is illustrated a system block diagram of components of the present invention for controlling computer and/or other hardware/software peripherals interfaced thereto. The system 100 includes a tracking component 102 for detecting and tracking one or more objects 104 through image capture utilizing cameras (not shown) or other suitable conventional image-capture devices. The cameras operate to capture images of the object(s) 104 in a scene within the image capture capabilities of the cameras so that the images can be further processed to not only detect the presence of the object(s) 104, but also to detect and track object(s) movements. It is appreciated that in more robust implementations, object characteristics such as object features and object orientation can also be detected, tracked, and processed. The object(s) 104 of the present invention include basic hand movements created by one or more hands of a system user and/or other person selected for use with the disclosed system. However, in more robust system implementations, such objects can include many different types of objects with object characteristics, including hand gestures each of which have gesture characteristics including but not limited to, hand movement, finger count, finger orientation, hand rotation, hand orientation, and hand pose (e.g., opened, closed, and partially closed).

The tracking component 102 interfaces to a control component 106 of the system 100 that controls all onboard component processes. The control component 106 interfaces to a seeding component 108 that seeds object hypotheses to the tracking component based upon the object characteristics.

The object(s) 104 are detected and tracked in the scene such that object characteristic data is processed according to predetermined criteria to associate the object characteristic data with commands for interacting with a user interface component 110. The user interface component 110 interfaces to the control component 106 to receive control instructions that affect presentation of text, graphics, and other output (e.g., audio) provided to the user via the interface component 110. The control instructions are communicated to the user interface component 110 in response to the object characteristic data processed from detection and tracking of the object(s) within a predefined engagement volume space 112 of the scene.

A filtering component 114 interfaces to the control component 106 to receive filtering criteria in accordance with user filter configuration data, and to process the filtering criteria such that tracked object(s) of respective object hypotheses are selectively removed from the object hypotheses and/or at least one hypothesis from a set of hypotheses within the volume space 112 and the scene. Objects are detected and tracked either within the volume space 112 or outside the volume space 112. Those objects outside of the volume space 112 are detected, tracked, and ignored, until entering the volume space 112.

The system 100 also receives user input via input port(s) 116 such as input from pointing devices, keyboards, interactive input mechanisms such as touch screens, and audio input devices.

The subject invention (e.g., in connection with object detection, tracking, and filtering) can employ various artificial intelligence based schemes for carrying out various aspects of the subject invention. For example, a process for determining which object is to be selected for tracking can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier(s) is used to automatically determine according to a predetermined criteria which object(s) should be selected for tracking and which objects that were being tracked are now removed from tracking. The criteria can include, but is not limited to, object characteristics such as object size, object speed, direction of movement, distance from one or both cameras, object orientation, object features, and object rotation. For example, with respect to SVM's which are well understood—it is to be appreciated that other classifier models can also be utilized such as Naive Bayes, Bayes Net, decision tree and other learning models—SVM's are configured via a learning or training phase within a classifier constructor and feature selection module. A classifier is a function that maps an input attribute vector, $x=(x1, x2, x3, x4, \ldots, xn)$, to a confidence that the input belongs to a class—that is, $f(x)=\text{confidence}(\text{class})$. In the case of object identification and tracking, for example, attributes include various sizes of the object, various orientations of the object, object colors, and the classes are categories or areas of interest (e.g., object type, and object pose).

With reference to FIG. 24, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 24 illustrates operating system 134, application programs 135, other program modules 136, and program data 137.

The computer 110 may also include other removable/non-removable, volatile/nonvolatile computer storage media. By way of example only, FIG. 24 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 24, provide storage of computer readable instructions, data structures, program modules and other data for the computer 110. In FIG. 24, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointer 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Further, a camera 163 (such as a digital/electronic still or video camera, or film/photographic scanner) capable of capturing a sequence of images 164 can also be included as an input device to the personal computer 110. While just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 24. The logical connections depicted in FIG. 24 include a local area network (LAN) 171 and a wide area network (WAN) 173, but may also include other networks. Such networking environments are commonplace in offices, enterprise-wide computer networks, intranets and the Internet.

Figure 2:
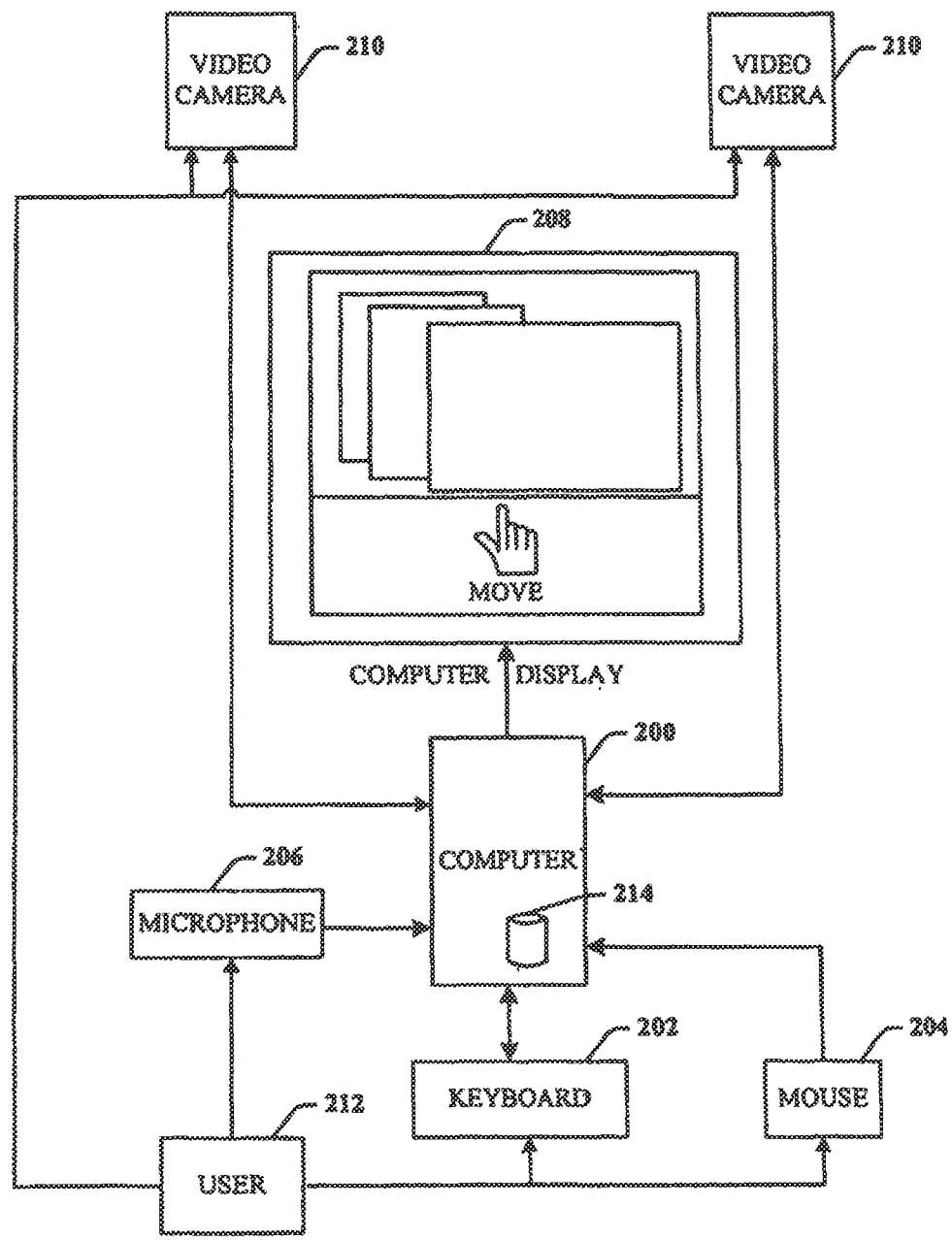
FIG. 2 illustrates a schematic block diagram of a perceptual user interface system, in accordance with an aspect of the present invention.

Referring now to FIG. 2, there is illustrated a schematic block diagram of a perceptual user interface system, in accordance with an aspect of the present invention. The system comprises a computer 200 with a traditional keyboard 202, input pointing device (e.g., a mouse) 204, microphone 206, and display 208. The system further comprises at least one video camera 210, at least one user 212, and software 214. The exemplary system of FIG. 2 is comprised of two video cameras 210 mounted substantially parallel to each other (that is, the rasters are parallel) and the user 212. The first camera is used to detect depth of the object from the camera and track the object, and the second camera is used for determining at least the depth (or distance) of the object from the camera(s). The computer 200 is operably connected to the keyboard 202, mouse 204 and display 208. Video cameras 210 and microphone 206 are also operably connected to computer 200. The video cameras 210 "look" towards the user 212 and may point downward to capture objects within the volume defined above the keyboard and in front of the user. User 212 is typically an individual that is capable of providing hand gestures, holding objects in a hand, verbal commands, and mouse and/or keyboard input. The hand gestures and/or object(s) appear in video images created by the video cameras 210 and are interpreted by the software 214 as commands to be executed by computer 200. Similarly, microphone 206 receives verbal commands provided by user 212, which are in turn, interpreted by software 214 and executed by computer 200. User 212 can control and operate various application programs on the computer 200 by providing a series of hand gestures or a combination of hand gestures, verbal commands, and mouse/keyboard input. The system can track any object presented in the scene in front or it. The depth information is used to "segment" the interacting object from the rest of the scene. The capability to exploit any sort of moving object in the scene is important at least with respect to accessibility scenarios.

Figure 3:
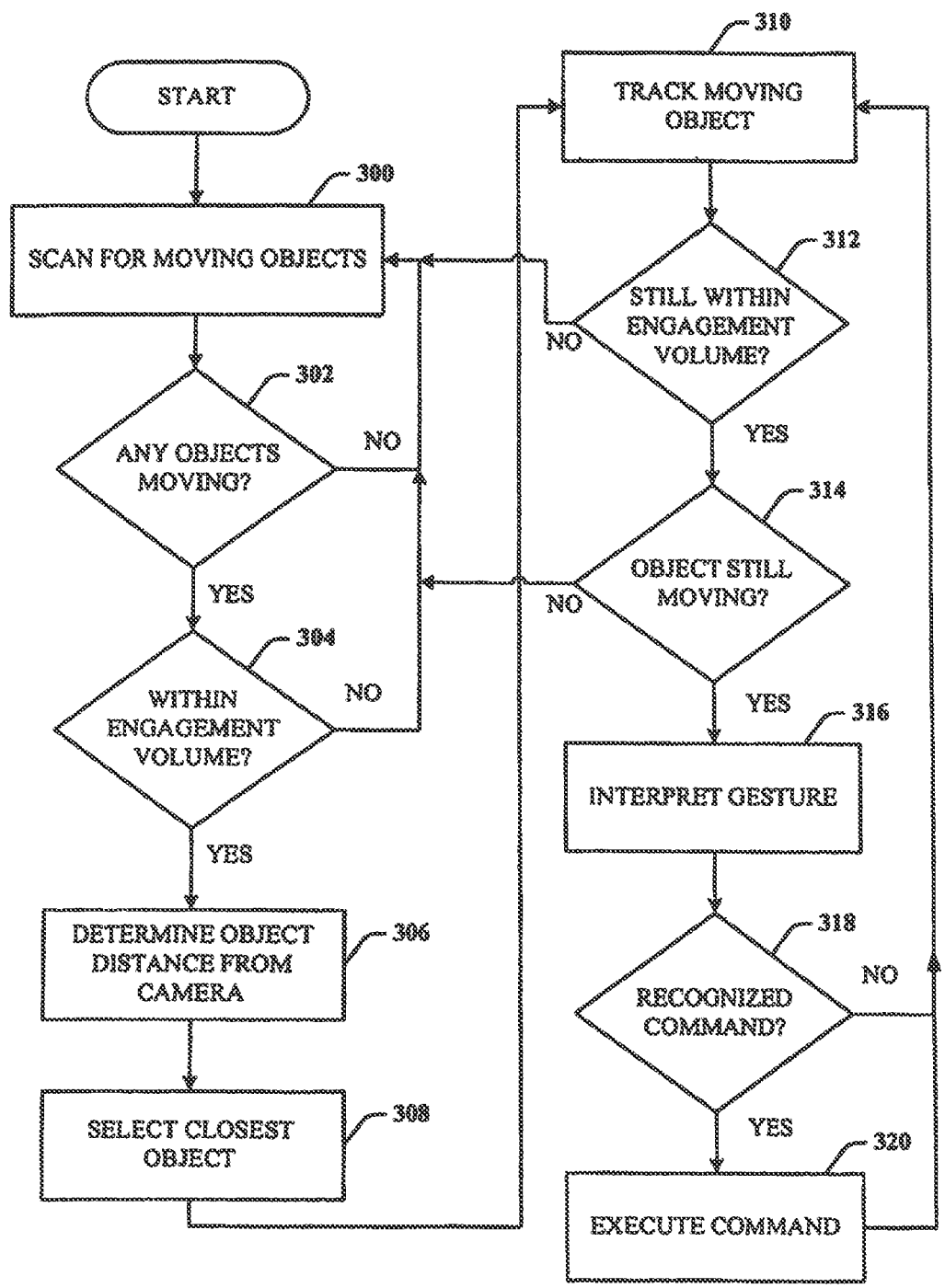
FIG. 3 illustrates a flow diagram of a methodology for implementing a perceptual user interface system, in accordance with an aspect of the present invention.
Figure 4:
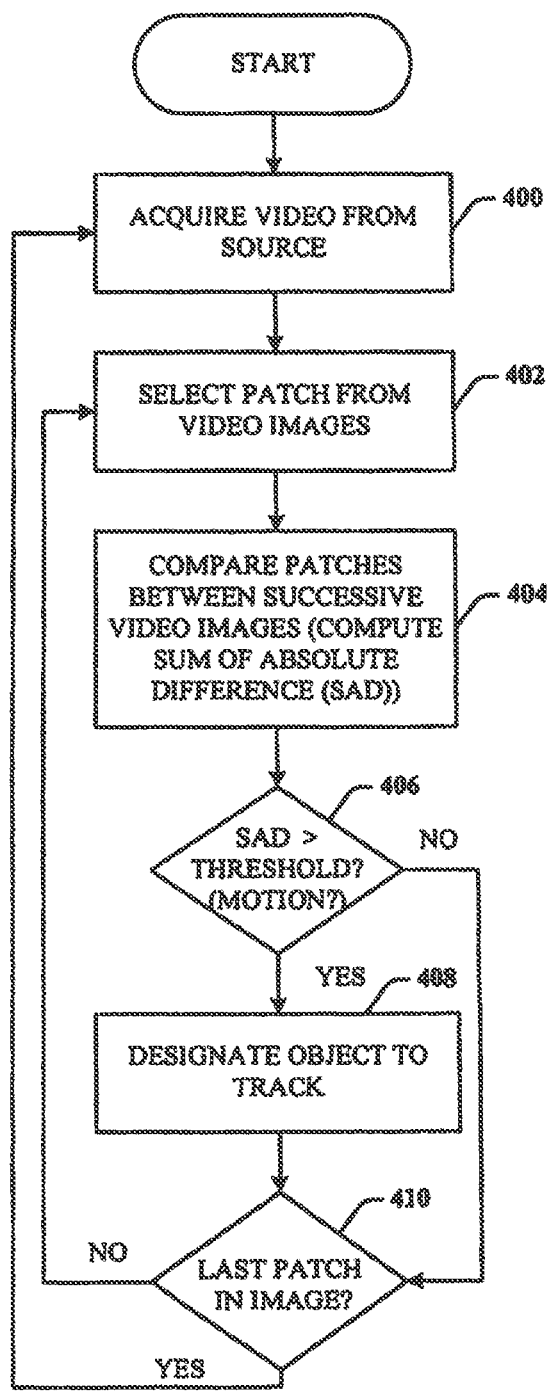
FIG. 4 illustrates a flow diagram of a methodology for determining the presence of moving objects within images, in accordance with an aspect of the present invention.
Figure 5:
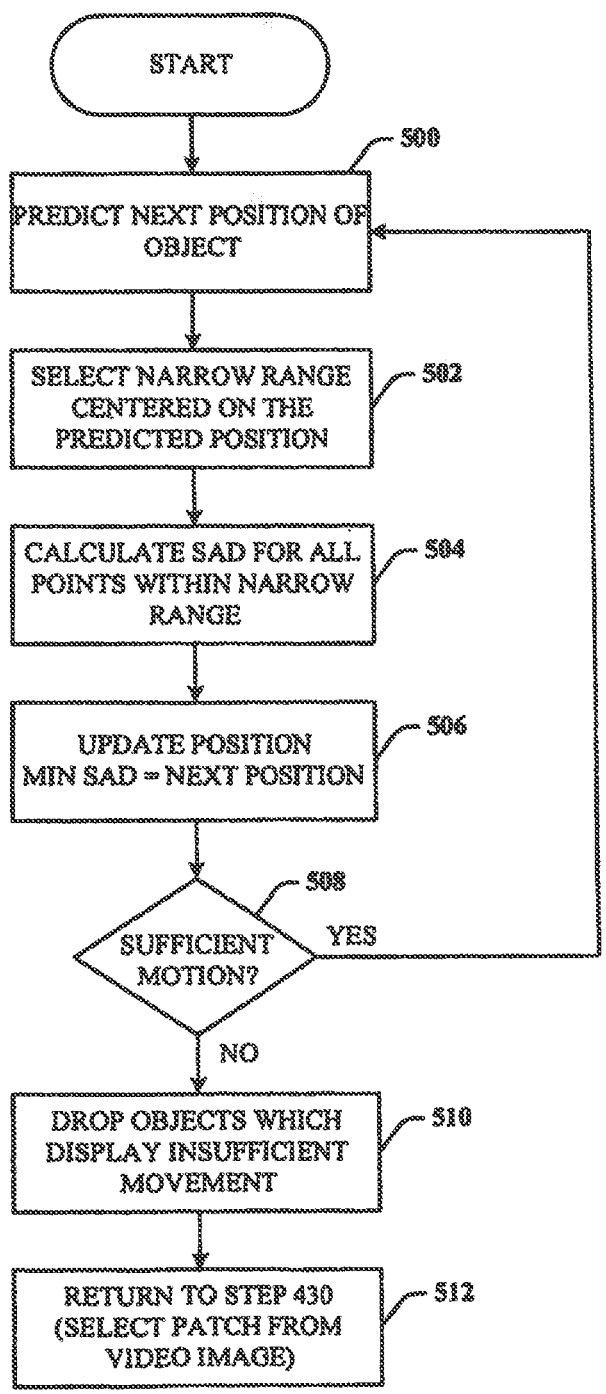
FIG. 5 illustrates a flow diagram of a methodology for tracking a moving object within an image, in accordance with an aspect of the present invention.

In view of the foregoing structural and functional features described above, methodologies in accordance with various aspects of the present invention will be better appreciated with reference to FIGS. 3-5. While, for purposes of simplicity of explanation, the methodologies of FIGS. 3-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Accordingly, FIG. 3 is a flow diagram that illustrates a high level methodology for detecting the user's hand, tracking movement of the hand and interpreting commands in accordance with an aspect of the invention. While, for purposes of simplicity of explanation, the methodologies shown here and below are described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The methodology begins at 300 where video images are scanned to determine whether any moving objects exist within the field of view (or scene) of the cameras. The system is capable of running one or more object hypothesis models to detect and track objects, whether moving or not moving. In one embodiment, the system runs up to and including six object hypotheses. If more than one object is detected as a result of the multiple hypotheses, the system drops one of the objects if the distance from any other object falls below a threshold distance, for example, five inches. It is assumed that the two hypotheses are redundantly tracking the same object, and one of the hypotheses is removed from consideration. At 302, if NO, no moving object(s) have been detected, and flow returns to 300 where the system continues to scan the current image for moving objects. Alternatively, if YES, object movement has been detected, and flow continues from 302 to 304 where it is determined whether or not one or more moving objects are within the engagement volume. It is appreciated that the depth of the object may be determined before determination of whether the object is within the engagement volume.

The engagement volume is defined as a volume of space in front of the video cameras and above the keyboard wherein the user is required to introduce the hand gestures (or object(s)) in order to utilize the system. A purpose of the engagement volume is to provide a means for ignoring all objects and/or gestures in motion except for those intended by the user to effect control of the computer. If a moving object is detected at 30Z but is determined not to be within the engagement volume, then the system dismisses the moving object as not being a desired object to track for providing commands. Flow then loops back to the input of 300 to scan for more objects. However, if the moving object is determined to be within the engagement volume, then the methodology proceeds to 306. However, new objects are seeded only when it is determined that the new object is a sufficient distance away from an existing object that is being tracked (in 3-D). At 306, the system determines the distance of each moving object from the video cameras. At 308, if more than one moving object is detected within the engagement volume, then the object closest to the video camera(s) is selected as the desired command object. If by the given application context the user is predisposed to use hand gestures towards the display, the nearest object hypotheses will apply to the hands. In other scenarios, more elaborate criteria for object selection may be used. For example, an application may select a particular object based upon its quality of movement over time. Additionally, a two-handed interaction application may select an object to the left of the dominant hand (for right handed users) as the non-dominant hand. The command object is the object that has been selected for tracking, the movements of which will be analyzed and interpreted for gesture commands. The command object is generally the user's dominant hand. Once the command object is selected, its movement is tracked, as indicated at 310.

At 312, the system determines whether the command object is still within the engagement volume. If NO, the object has moved outside the engagement volume, and the system dismisses the object hypothesis and returns to 300 where the current image is processed for moving objects. If NO, the object is still within the engagement volume, and flow proceeds to 314. At 314, the system determines whether the object is still moving. If no movement is detected, flow is along the NO path returning to 300 to process the current camera images for moving objects. If however, movement is detected, then flow proceeds from 314 to 316. At 316, the system analyzes the movements of the command object to interpret the gestures for specific commands. At 318, it is determined whether the interpreted gesture is a recognized command. If NO, the movement is not interpreted as a recognized command, and flow returns to 310 to continue tracking the object. However, if the object movement is interpreted as a recognized command, flow is to 320 where the system executes the corresponding command. After execution thereof, flow returns to 310 to continue tracking the object. This process may continually execute to detect and interpret gestures.

In accordance with an aspect of the invention, algorithms used to interpret gestures are kept to simple algorithms and are performed on sparse ("lightweight") images to limit the computational overhead required to properly interpret and execute desired commands in real time. In accordance with another aspect of the invention, the system is able to exploit the presence of motion and depth to minimize computational requirements involved in determining objects that provide gesture commands.

Referring now to FIG. 4, there is illustrated a flow diagram of a methodology for determining the presence of moving objects within video images created by one or more video sources, in accordance with an aspect of the present invention. The methodology exploits the notion that attention is often drawn to objects that move. At 400, video data is acquired from one or more video sources. Successive video images are selected from the same video source, and motion is detected by comparing a patch of a current video image, centered on a given location, to a patch from the previous video image centered on the same location. At 402, a video patch centered about a point located at $(u_1, v_1)$, and $(u_2, v_2)$ is selected from successive video images $I_1$ and $I_2$, respectively. A simple comparison function is utilized wherein the sum of the absolute differences (SAD) over square patches in two images is obtained. For a patch from image $I_1$ centered on pixel location $(u_1, v_1)$ and a patch in image $I_2$ centered on $(u_2, v_2)$, the image comparison function is defined as $SAD(I_1, u_1, v_1, I_2, u_2, v_2)$ as:

$$\sum_{-\frac{D}{2} \leq i,j \leq \frac{D}{2}} |I_1(u_1+i, v_1+j) - I_2(u_2+i, v_2+j)|$$

where I(u,v) refers to the pixel at (u,v), D is the patch width, and the absolute difference between two pixels is the sum of the absolute differences taken over all available color channels. Regions in the image that have movement can be found by determining points (u,v) such that function SAD $(I_{t-1}, u_{t-1}, v_{t-1}, I_t, u_t, v_t) > t$, where the subscript refers to the image at time t, and is a threshold level for motion. At 404, a comparison is made between patches from image $I_1$ and $I_2$ using the sum of the absolute difference algorithm. At 406, the result of the sum of the absolute difference algorithm is compared to a threshold value to determine whether a threshold level of motion exists within the image patch. If SAD=t, no sufficient motion exists, and flow proceeds to 410. If at 406, SAD>t, then sufficient motion exists within the patch, and flow is to 408 where the object is designated for continued tracking. At 410, the system determines whether the current image patch is the last patch to be examined within the current image. If NO, the methodology returns to 402 where a new patch is selected. If YES, then the system returns to 400 to acquire a new video image from the video source.

To reduce the computational load, the SAD algorithm is computed on a sparse regular grid within the image. In one embodiment, the sparse regular grid is based on sixteen pixel centers. When the motion detection methodology determines that an object has sufficient motion, then the system tracks the motion of the object. Again, in order to limit (or reduce) the computational load, a position prediction algorithm is used to predict the next position of the moving object. In one embodiment, the prediction algorithm is a Kalman filter. However, it is to be appreciated that any position prediction algorithm can be used.

Note that the image operations may use the same SAD function on image patches, which allows for easy SIMD (Single-Instruction Multiple-Data, which architectures are essential in the parallel world of computers) optimization of the algorithm's implementation, which in turn allows it to run with sufficiently many trackers while still leaving CPU time to the user.

The process of seeding process hypotheses based upon motion may place more than one hypothesis on a given moving object. One advantage of this multiple hypothesis approach is that a simple, fast, and imperfect tracking algorithm may be used. Thus if one tracker fails, another may be following the object of interest. Once a given tracker has been seeded, the algorithm updates the position of the object being followed using the same function over successive frames.

Referring now to FIG. 5, there is illustrated a flow diagram of a methodology for tracking a moving object within an image, in accordance with an aspect of the present invention. The methodology begins at 500 where, after the motion detection methodology has identified the location of a moving object to be tracked, the next position of the object is predicted. Once identified, the methodology utilizes a prediction algorithm to predict the position of the object in successive frames. The prediction algorithm limits the computational burden on the system. In the successive frames, the moving object should be at the predicted location, or within a narrow range centered on the predicted location. At 502, the methodology selects a small pixel window (e.g., ten pixels) centered on the predicted location. Within this small window, an algorithm executes to determine the actual location of the moving object. At 504, the new position is determined by examining the sum of the absolute difference algorithm over successive video frames acquired at time t and time t−1. The actual location is determined by finding the location $(u_t, v_t)$ that minimizes:

$$SAD(I_{t-1}, u_{t-1}, v_{t-1}, I_t, u_t, v_t),$$

where $I_t$ refers to the image at time t, $I_{t-1}$ refers to the image at time t−1, and where $(u_t, v_t)$ refers to the location at time t. Once determined, the actual position is updated, at 506. At 508, motion characteristics are evaluated to determine whether the motion is still greater that the threshold level required. What is evaluated is not only the SAD image-based computation, but also movement of the object over time. The movement parameter is the average movement over a window of time. Thus if the user pauses the object or hand for a short duration of time, it may not be dropped from consideration. However, if the duration of time for the pause is still longer such that it exceeds a predetermined average time parameter, the object will be dropped. If YES, the motion is sufficient, and flow returns to 500 where a new prediction for the next position is determined. If NO the object motion is insufficient, and the given object is dropped from being tracked, as indicated by flow to 510. At 512, flow is to 430 of FIG. 4 to select a new patch in the image from which to analyze motion.

When determining the depth information of an object (i.e., the distance from the object to the display or any other chosen reference point), a lightweight sparse stereo approach is utilized in accordance with an aspect of the invention. The sparse stereo approach is a region-based approach utilized to find the disparity at only locations in the image corresponding to the object hypothesis. Note that in the stereo matching process, it is assumed that both cameras are parallel (in rasters). Object hypotheses are supported by frame-to-frame tracking through time in one view and stereo matching across both views. A second calibration issue is the distance between the two cameras (i.e., the baseline), which must be considered to recover depth in real world coordinates. In practice, both calibration issues maybe dealt with automatically by fixing the cameras on a prefabricated mounting bracket or semi-automatically by the user presenting objects at a known depth in a calibration routine that requires a short period of time to complete. The accuracy of the transform to world coordinates is improved by accounting for lens distortion effects with a static, pre-computed calibration procedure for a given camera.

Binocular disparity is the primary means for recovering depth information from two or more images taken from different viewpoints. Given the two-dimensional position of an object in two views, it is possible to compute the depth of the object. Given that the two cameras are mounted parallel to each other in the same horizontal plane, and given that the two cameras have a focal lengthy f, the three-dimensional position (x,y,z) of an object is computed from the positions of the object in both images $(u_l, v_l)$ and $(u_r, v_r)$ by the following perspective projection equations:

$$u = u_r = f\frac{x}{z};$$

$$v = v_r = f\frac{y}{z};$$

-continued $$d = u_r - u_i = f\frac{b}{z};$$

where the disparity, d, is the shift in location of the object in one view with respect to the other, and is related to the baseline b, the distance between the two cameras.

The vision algorithm performs 3-dimensional (3-D) tracking and 3-D depth computations. In this process, each object hypothesis is supported only by consistency of the object movement in 3-D. Unlike many conventional computer vision algorithms, the present invention does not rely on fragile appearance models such as skin color models or hand image templates, which are likely invalidated when environmental conditions change or the system is confronted with a different user.

Figure 6:
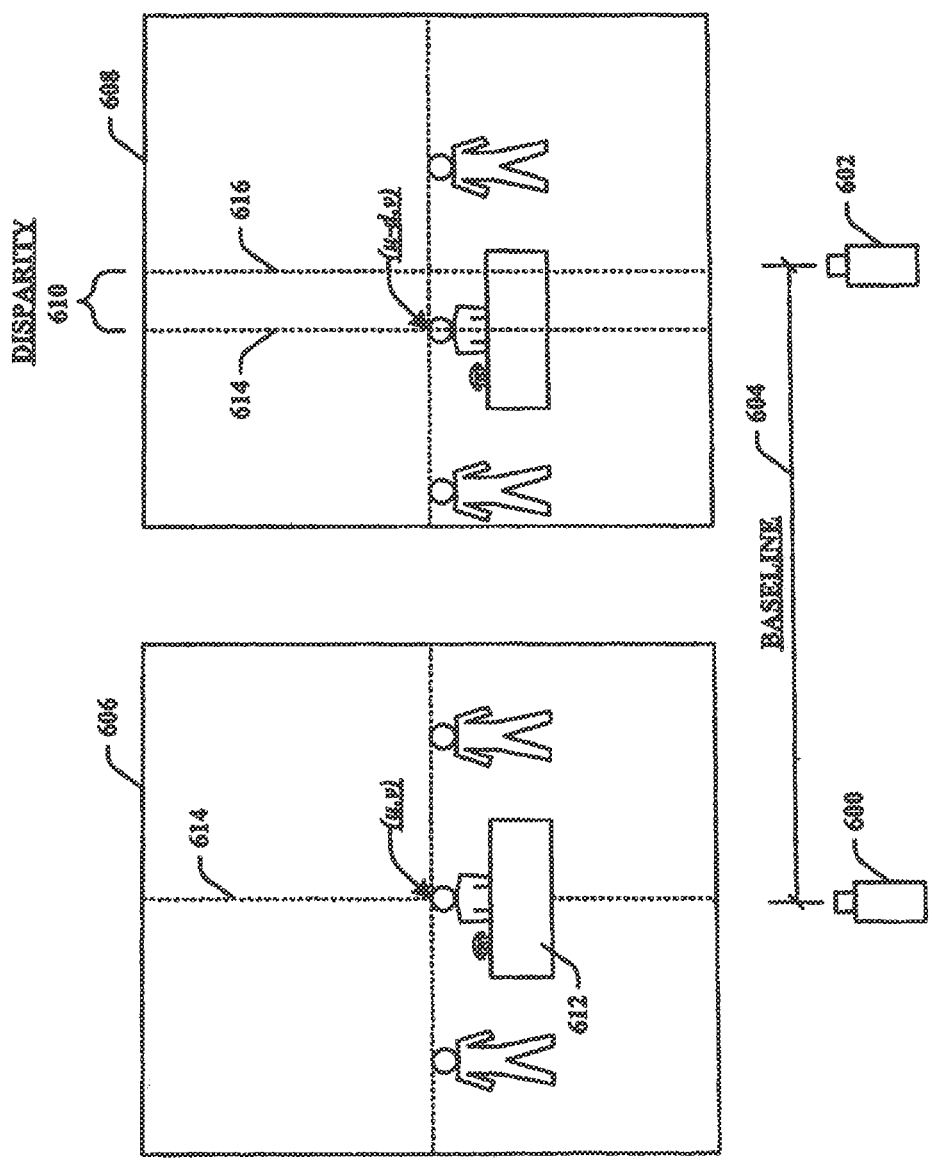
FIG. 6 illustrates a disparity between two video images captured by two video cameras mounted substantially parallel to each other for the purpose of determining the depth of objects, in accordance with an aspect of the present invention.

Referring now to FIG. 6, there is illustrated a disparity between two video images captured by two video cameras mounted substantially parallel to each other for the purpose of determining the depth of objects, in accordance with an aspect of the present invention. In FIG. 6, a first camera 600 and a second camera 602 (similar to cameras 210) are mounted substantially parallel to each other in the same horizontal plane and laterally aligned. The two cameras (600 and 602) are separated by a distance 604 defined between the longitudinal focal axis of each camera lens, also known as the baseline, b. A first video image 606 is the video image from the first camera 600 and a second video image 608 is the video image from the second camera 602. The disparity d (also item number 610), or shift in the two video images (606 and 608), can be seen by looking to an object 612 in the center of the first image 606, and comparing the location of that object 612 in the first image 606 to the location of that same object 612 in the second image 608. The disparity 610 is illustrated as the difference between a first vertical centerline 614 of the first image 606 that intersects the center of the object 612, and a second vertical centerline 616 of the second image 688. In the first image 606, the object 612 is centered about the vertical centerline 614 with the top of the object 612 located at point (u,v). In the second image 508, the same point (u,v) of the object 612 is located at point (u-d,v) in the second image 608, where d is the disparity 610, or shift in the object from the first image 606 with respect to the second image 610. Given disparity d, a depth z can be determined. As will be discussed, in accordance with one aspect of the invention, the depth component z is used in part to determine if an object is within the engagement volume, where the engagement volume is the volume within which objects will be selected by the system.

In accordance with another aspect of the present invention, a sparse stereo approach is utilized in order to limit computational requirements. The sparse stereo approach is that which determines disparity d only at the locations in the image that corresponds to a moving object. For a given point (u,v) in the image, the value of disparity d is found such that the sum of the absolute differences over a patch in the first image 606 (i.e., a left image $I_L$) centered on (u,v) and a corresponding patch in the second image 608 (i.e., a right image $I_R$) centered on (u-d,v), is minimized, i.e., the disparity value d that minimizes SAD($I_L$,u-d,v,$I_r$,u,v). If an estimate of depth z is available from a previous time, then in order to limit computational requirements, the search for the minimal disparity d is limited to a range consistent with the last known depth z.

In accordance with another aspect of the invention, the search range may be further narrowed by use of an algorithm to predict the objects new location. In one embodiment, the prediction is accomplished by utilization of a Kalman filter.

The depth z can also be computed using traditional triangulation techniques. The sparse stereo technique is used when the system operation involves detecting moving objects within a narrow range in front of the display, e.g., within twenty inches. In such cases, the two video cameras are mounted in parallel and can be separated by a distance equal to the approximate width of the display, or a even smaller distance that approximates a few inches. However, when the system is implemented in a larger configuration, the distance between the two video cameras may be much greater. In such cases, traditional triangulation algorithms are used to determine the depth.

The foregoing discussion has focused on some details of the methodologies associated with locating and tracking an object to effect execution of corresponding and specified commands. An overview follows as to how these capabilities are implemented in one exemplary system.

Figure 7:
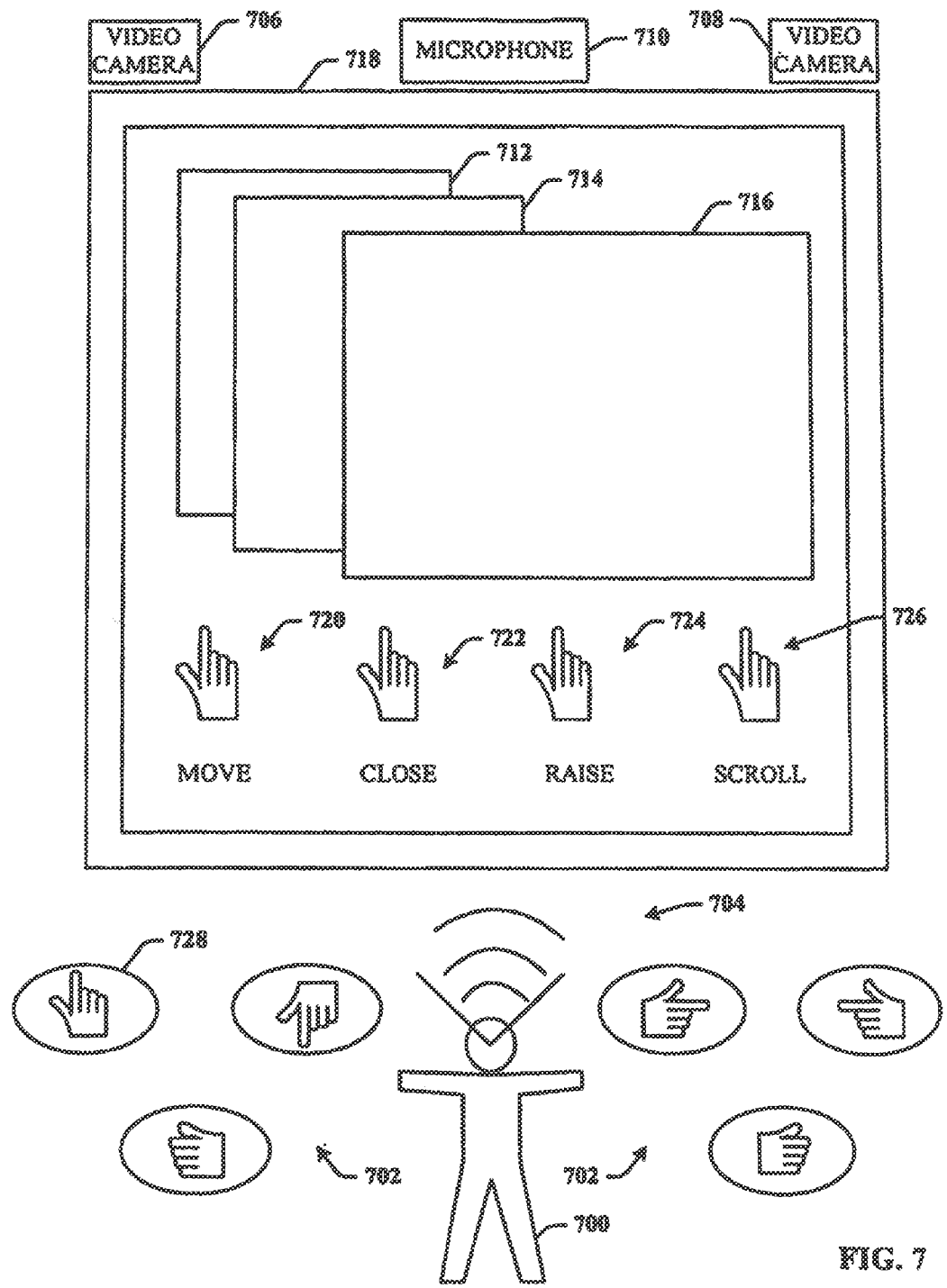
FIG. 7 illustrates an example of the hand gestures that the system can recognize and the visual feedback provided through the display, in accordance with an aspect of the present invention.

Referring now to FIG. 7, there is illustrated an example of gestures that the system recognizes, and further illustrates visual feedback provided to the system through the display. A user 700 gives commands by virtue of different hand gestures 702 and/or verbal commands 704. The gestures 702 are transmitted to a system computer (not shown) as part of the video images created by a pair of video cameras (706 and 708). Verbal and/or generally, audio commands, are input to the system computer through a microphone 710. Typical GUI windows 712, 714, and 716 are displayed in a layered presentation in an upper portion of display 718 while a lower portion of display 718 provides visual graphic feedback of in the form of icons 720, 722, 724, and 726 of some of the gestures 702 recognized by the system.

In one example, the hand icon 720 is displayed when a corresponding gesture 728 is recognized. The name of the recognized command (Move) is also then displayed below the icon 720 to provide additional textual feedback to the user 700. Move and Raise commands may be recognized by dwelling on the window for a period of time. There is also a "flick" or "bump" command to send a window from one monitor to another monitor, in a multiple monitor configuration. This is controlled by moving the hand (or object) to the left or right, and is described in greater detail hereinbelow with respect to FIG. 9B. There are at least two ways to effect a Move; by speech recognition when voicing the word "Move", or phrase "Move Window", or any other associated voice command(s); and, by using the dwelling technique. It is appreciated that where more robust image capture and imaging processing systems are implemented, the pose of the hand may be mapped to any functionality, as described in greater detail below. Moreover, the shape of the hand icon may be changed in association with the captured hand pose to provide visual feedback to the user that the correct hand pose is being processed. However, as a basic implementation, the hand icon is positioned for selecting the window for interaction, or to move the window, or effect scrolling.

A Scroll command may be initiated first by voicing a corresponding command that is processed by speech recognition, and then using the hand (or object) to commence scrolling of the window by moving the hand (or object) up and down for the desired scroll direction.

In another example, the single displayed hand icon 720 is presented for all recognized hand gestures 702, however, the corresponding specific command name is displayed below the icon 720. Here, the same hand icon 720 is displayed in accordance with four different hand gestures utilized to indicate four different commands: Move, Close, Raise, and Scroll.

In still another aspect of the present invention, a different hand shaped icon is used for each specific command and the name of the command is optionally displayed below the command. In yet another embodiment, audio confirmation is provided by the computer, in addition to the displayed icon and optional command name displayed below the icon.

As previously mentioned, FIG. 7 illustrates the embodiment where a single hand shaped icon 720 is used, and the corresponding command recognized by the system is displayed below the icon 720. For example, when the system recognizes, either by virtue of gestures (with hand and/or object) and or verbal commands, the command to move a window, the icon 720 and corresponding command word "MOVE" are displayed by the display 718. Similarly, when the system recognizes a command to close a window, the icon 720 and corresponding command word "CLOSE" may be displayed by the display 718. Additional examples include, but are not limited to, displaying the icon 720 and corresponding command word "RAISE" when the system recognizes a hand gesture to bring a GUI window forward. When the system recognizes a hand gesture corresponding to a scroll command for scrolling a GUI window, the icon 720 and command word "SCROLL" are displayed by the display 718.

It is to be appreciated that the disclosed system may be configured to display any number and type of graphical icons in response to one or more hand gestures presented by the system user. Additionally, audio feedback may be used such that a beep or tone may be presented in addition to or in lieu of the graphical feedback. Furthermore the graphical icon may be used to provide feedback in the form of a color, combination of colors, and/or flashing color or colors. Feedback may also be provided by flashing a border of the selected window, the border in the direction of movement. For example, if the window is to be moved to the right, the right window border could be flashed to indicate the selected direction of window movement. In addition to or separate from, a corresponding tone frequency or any other associated sound may be emitted to indicate direction of movement, e.g., an upward movement would have and associated high pitch and a downward movement would have a low pitch. Still further, rotational aspects may be provided such that movement to the left effects a counterclockwise rotation of a move icon, or perhaps a leftward tilt in the GUI window in the direction of movement.

Referring now to FIG. 8, there is illustrated an alternative embodiment wherein a unique icon is displayed in association with a name of a specific recognized command, in accordance with an aspect of the present invention. Here, each icon-word pair is unique for each recognized command. Icon-word pairs 800, 802, 804, and 806 for the respective commands "MOVE", "CLOSE", "RAISE", and "SCROLL", are examples of visual feedback capabilities that can be provided.

The system is capable of interpreting commands based on interpreting hand gestures, verbal commands, or both in combination. A hand is identified as a moving object by the motion detection algorithms and the hand movement is tracked and interpreted. In accordance with one aspect of the invention, hand gestures and verbal commands are used cooperatively. Speech recognition is performed using suitable voice recognition applications, for example, Microsoft SAPI 5.1, with a simple command and control grammar. However, it is understood that any similar speech recognition system can be used. An inexpensive microphone is placed near the display to receive audio input. However, the microphone can be placed at any location insofar as audio signals can be received thereinto and processed by the system.

Following is an example of functionality that is achieved by combining hand gesture and verbal modalities. Interaction with the system can be initiated by a user moving a hand across an engagement plane and into an engagement volume.

Figure 9A:
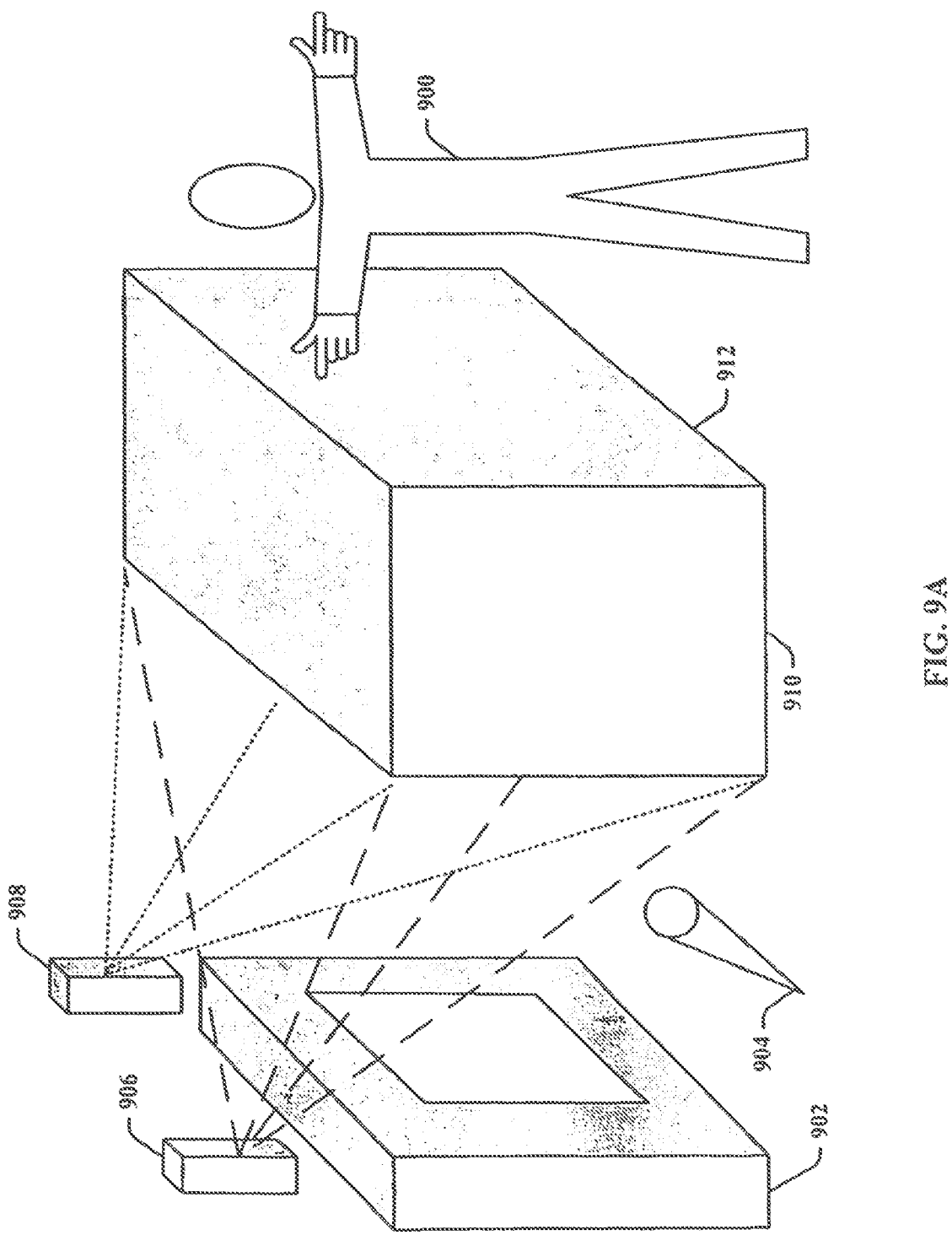

Referring now to FIG. 9A, there is illustrated the engagement plane and engagement volume for a single monitor system of the present invention. A user 900 is located generally in front of a display 902, which is also within the imaging capabilities of a pair of cameras (906 and 908). A microphone 904 (similar to microphones 206 and 710) is suitably located such that user voice signals are input for processing, e.g., in front of the display 902. The cameras (906 and 908, similar to cameras 200 and, 706 and 708) are mounted substantially parallel to each other and on a horizontal plane above the display 902. The two video cameras (906 and 908) are separated by a distance that provides optimum detection and tracking for the given cameras and the engagement volume. However, it is to be appreciated that cameras suitable for wider fields of view, higher resolution, may be placed further apart on a plane different from the top of the display 902, for example, lower and along the sides of the display facing upwards, to capture gesture images for processing in accordance with novel aspects of the present invention. In accordance therewith, more robust image processing capabilities and hypothesis engines can be employed in the system to process greater amounts of data.

Between the display 902 and the user 900 is a volume 910 defined as the engagement volume. The system detects and tracks objects inside and outside of the volume 910 to determine the depth of one or more objects with respect to the engagement volume 910. However, those objects determined to be of a depth that is outside of the volume 910 will be ignored. As mentioned hereinabove, the engagement volume 910 is typically defined to be located where the bands and/or objects in the hands of the user 900 are most typically situated, i.e., above a keyboard of the computer system and in front of the cameras (906 and 908) between the user 900 and the display 902 (provided the user 900 is seated in front of the display on which the cameras (906 and 908) are located). However, is it appreciated that the user 900 may be standing while controlling the computer, which requires that the volume 910 be located accordingly to facilitate interface interaction. Furthermore, the objects may include not only the hand(s) of the user, or objects in the hand(s), but other parts of the body, such as head, torso movement, arms, or any other detectable objects. This is described in greater detail hereinbelow.

A plane 912 defines a face of the volume 910 that is closest to the user 900, and is called the engagement plane. The user 900 may effect control of the system by moving a hand (or object) through the engagement plane 912 and into the engagement volume 910. However, as noted above, the hand of the user 900 is detected and tracked even when outside the engagement volume 910. However, it would be ignored when outside of the engagement volume 910 insofar as control of the computer is concerned. When the object is moved across the engagement plane 912, feedback is provided to the user in the form of displaying an alpha-blended icon on the display (e.g., an operating system desktop). The icon is designed to be perceived as distinct from other desktop icons and may be viewed as an area cursor. The engagement plane 912 is positioned such that the user's hands do not enter it during normal use of the keyboard and mouse. When the system engages the hand or object, the corresponding hand icon displayed on the desktop is moved to reflect the position of the tracked object (or hand).

The engagement and acquisition of the moving hand (or object) is implemented in the lightweight sparse stereo system by looking for the object with a depth that is less than a predetermined distance value. Any such object will be considered the command object until it is moved out of the engagement volume 910, for example, behind the engagement plane 912, or until the hand (or object) is otherwise removed from being a tracked object. In one example, the specified distance is twenty inches.

In operation, the user 900 moves a hand through the engagement plane 912 and into the engagement volume 910 established for the system. The system detects the hand, tracks the hand as the hand moves from outside of the volume 910 to the inside, and provides feedback by displaying a corresponding hand shaped icon on the display 902. The open microphone 904 placed near the display 902 provides means for the user 900 to invoke one or more verbal commands in order to act upon the selected window under the icon. The window directly underneath the hand shaped icon is the selected window. When a spoken and/or audio command is input to and understood by the system, the interpreted command is displayed along with the hand shaped icon. For example, in one embodiment, by speaking the word "Move", the user may initiate the continuous (or stepped) movement of the window under the hand shaped icon to follow the movement of the user's hand. The user 900 causes the selected window to move up or down within the display 902 by moving the hand up or down. Lateral motion is also similarly achieved. Movement of the window is terminated when the user hand is moved across the engagement plane 912 and out of the engagement volume 910. Other methods of termination include stopping movement of the hand (or object) for an extended period of time, which is processed by the system as a command to drop the associated hypothesis. Furthermore, as described hereinabove, the Move command may be invoked by dwelling the hand on the window for a period of time, followed by hand motion to initiate the direction of window movement.

Alternatively, the user may speak the word "Release" and the system will stop moving the selected window in response to the user's hand motion. Release may also be accomplished by dwelling a bit longer in time while in Move, and/or Scroll modes. The user 900 may also act upon a selected window with other actions. By speaking the words, "Close", "Minimize", or "Maximize" the selected window is respectively closed, minimized or maximized. By speaking the word "Raise", the selected window is brought to the foreground, and by speaking "Send to Back", the selected window is sent behind (to the background) all other open windows. By speaking "Scroll", the user initiates a scrolling mode on the selected window. The user may control the rate of the scroll by the position of the hand. The hand shaped icon tracks the user's hand position, and the rate of the scrolling of the selected window is proportional to the distance between the current hand icon position and the position of the hand icon at the time the scrolling is initiated. Scrolling can be terminated by the user speaking "Release" or by the user moving their hand behind the engagement plane and out of the engagement volume. These are just a few examples of the voice recognition perceptual computer control capabilities of the disclosed architecture. It is to be appreciated that these voiced commands may also be programmed for execution in response to one or more object movements in accordance with the present invention.

In accordance with another aspect of the invention, dwell time can be used as a modality to control windows in lieu of, or in addition to, verbal commands and other disclosed modalities. Dwell time is defined as the time, after having engaged the system, that the user holds their hand position stationary such that the system hand shaped icon remains over a particular window. For example, by dwelling on a selected window for a short period of time (e.g., two seconds), the system can bring the window to the foreground of all other open windows (i.e., a RAISE command). Similarly, by dwelling a short time longer (e.g., four seconds), the system will grab (or select for dragging) the window, and the user causes the selected window to move up or down within the display by moving a hand up or down (i.e., a MOVE command). Lateral motion is also similarly achieved. Additional control over GUI windows can be accomplished in a similar fashion by controlling the dwell time of the hand shaped icon over the open window.

In accordance with a more robust aspect of the invention, hand gestures are interpreted by hand motion or by pattern recognition. For example, the user can bring the window to the front (or foreground), on top of all other open windows by moving a hand from a position closer to the display to position farther from the display, the hand remaining in the engagement volume 910. The use of 3-D imaging is described in greater detail hereinbelow. Similarly, the user can cause the selected window to be grabbed and moved by bringing fingers together with their thumb, and subsequently moving the hand. The selected window will move in relation to the user hand movement until the hand is opened up to release the selected window. Additional control over the selected window can be defined in response to particular hand movements or hand gestures. In accordance with another aspect of the present invention, the selected window will move in response to the user pointing their hand, thumb, or finger in a particular direction. For example, if the user points their index finger to right, the window will move to the right within the display. Similarly, if the user points to the left, up, or down the selected window will move to the left, up or down within the display, respectively. Additional window controls can be achieved through the use of similar hand gestures or motions.

In accordance with another aspect of the invention, the system is configurable such that an individual user selects the particular hand gestures that they wish to associate with particular commands. The system provides default settings that map a given set of gestures to a given set of commands. This mapping, however, is configurable such that the specific command executed in response to each particular hand gesture is definable by each user. For example, one user may wish to point directly at the screen with their index finger to grab the selected window for movement while another user may wish to bring their fingers together with their thumb to grab the selected window. Similarly, one user may wish to point a group of fingers up or down in order to move a selected window up or down, while another user may wish to open the palm of their hand toward the cameras and then move their opened hand up or down to move a selected window up or down. All given gestures and commands are configurable by the individual users to best suit that particular user's individual personal preferences.

Similarly, in accordance with another aspect of the present invention, the system may include a "Record and Define Gesture" mode. In the "Record and Define Gesture" mode, the system records hand gestures performed by the user. The recorded gestures are then stored in the system memory to be recognized during normal operation. The given hand gestures are then associated with a particular command to be performed by the system in response to that particular hand gesture. With such capability, a user may further tailor the system to their personal preference or, similarly, may tailor system operation to respond to specific commands most appropriate for particular applications.

In a similar fashion, the user can choose the particular words, from a given set, they wish to use for a particular command. For example, one user may choose to say "Release" to stop moving a window while another may wish to say, "Quit". This capability allows different users, which may prefer to use different words for a given command, the ability to tailor the system in a way most efficient for their personal use.

The present invention can be utilized in an expansive list of applications. The following discussion is exemplary of only a few applications with which the present invention may be utilized. One such application is associated with user control of a presentation, or similar type of briefing application, wherein the user makes a presentation on a projection type screen to a group of listeners.

Referring now to FIG. 9B, there is illustrated a multiple monitor implementation. Here, the system includes three monitors (or displays) through which the user 900 exercises control of 001 features; a first display 912, a second display 914, and a third display 916. The cameras (906 and 908) are similarly situated as in FIG. 9A, to define the engagement volume 910. By utilizing the "flick" or "bump" motion(s) as performed by a hand 918 of the user 900, the user 900 can move a window 920 from the first display 912 to the second display 914, and further from the second display 914 to the third display 916. The flick motion of the user hand 918 can effect movement of the window 920 from the first display 912 to the third display 916 in a single window movement, or in multiple steps through the displays (914 and 916) using corresponding multiple band motions. Of course, control by the user 900 occurs only when the user hand 918 breaks the engagement plane 912, and is determined to be a control object (i.e., an object meeting parameters sufficient to effect control of the computer).

As mentioned hereinabove, the user 900 is located generally in front of the displays (912, 914, and 916), which is also within the imaging capabilities of the pair of cameras (906 and 908). The microphone 904 is suitably located to receive user voice signals. The cameras (906 and 908) are mounted substantially parallel to each other and on a horizontal plane above the displays (912, 914, and 916), and separated by a distance that provides optimum detection and tracking for the given cameras and the engagement volume 910.

In operation, the user 900 moves the hand 918 through the engagement plane 912 and into the engagement volume 910 established for the system. The system, which had detected and tracked the hand 918 before it entered the volume 912, begins providing feedback to the user 900 by displaying the band shaped icon 922 on one of the displays (912, 914, and 916). The microphone 904 provides additional means for the user 900 to invoke one or more verbal commands in order to act upon the selected window 920 under the corresponding icon 922. The window 920 directly underneath the hand shaped icon is the selected window. When the user hand 918 enters the volume 910, it is recognized as a control object. The corresponding icon 922 is presented by the system on the computer display 912. By dwelling a predetermined amount of time, the associated window is assigned for control. The user 900 causes the selected window to move up or down within the display by invoking the 'Move' command as explained above and then moving the hand up or down, or to move across one or more of the monitors (914 and 916) by invoking the 'Flick' command and then using the flick band motion. Of course, if the second display 914 was the initial point of control, the user 900 can cause the window 920 to be moved left to the first display 912, or right to the third display 916. Movement of the window is terminated (or "released") when the user hand dwells for a time longer than a predetermined dwell time, or out of the engagement volume 910.

Alternatively, the user may speak the word "Release" and the system will stop moving the selected window in response to the user's hand motion. Release may also be accomplished by dwelling a bit while in Move, and/or Scroll modes. The user may also act upon a selected window with other actions. By speaking the words, "Close", "Minimize", or "Maximize" the selected window is respectively closed, minimized or maximized. By speaking the word "Raise", the selected window is brought to the foreground, and by speaking "Send to Back", the selected window is sent behind (to the background) all other open windows. By speaking "Scroll", the user initiates a scrolling mode on the selected window. The user may control the rate of the scroll by the position of the hand. The hand shaped icon tracks the user's hand position, and the rate of the scrolling of the selected window is proportional to the distance between the current hand icon position and the position of the hand icon at the time the scrolling is initialed. Scrolling can be terminated by the user speaking "Release" or by the user moving their hand behind the engagement plane and out of the engagement volume. These are just a few examples of the voice recognition perceptual computer control capabilities of the disclosed architecture.

Figure 10:
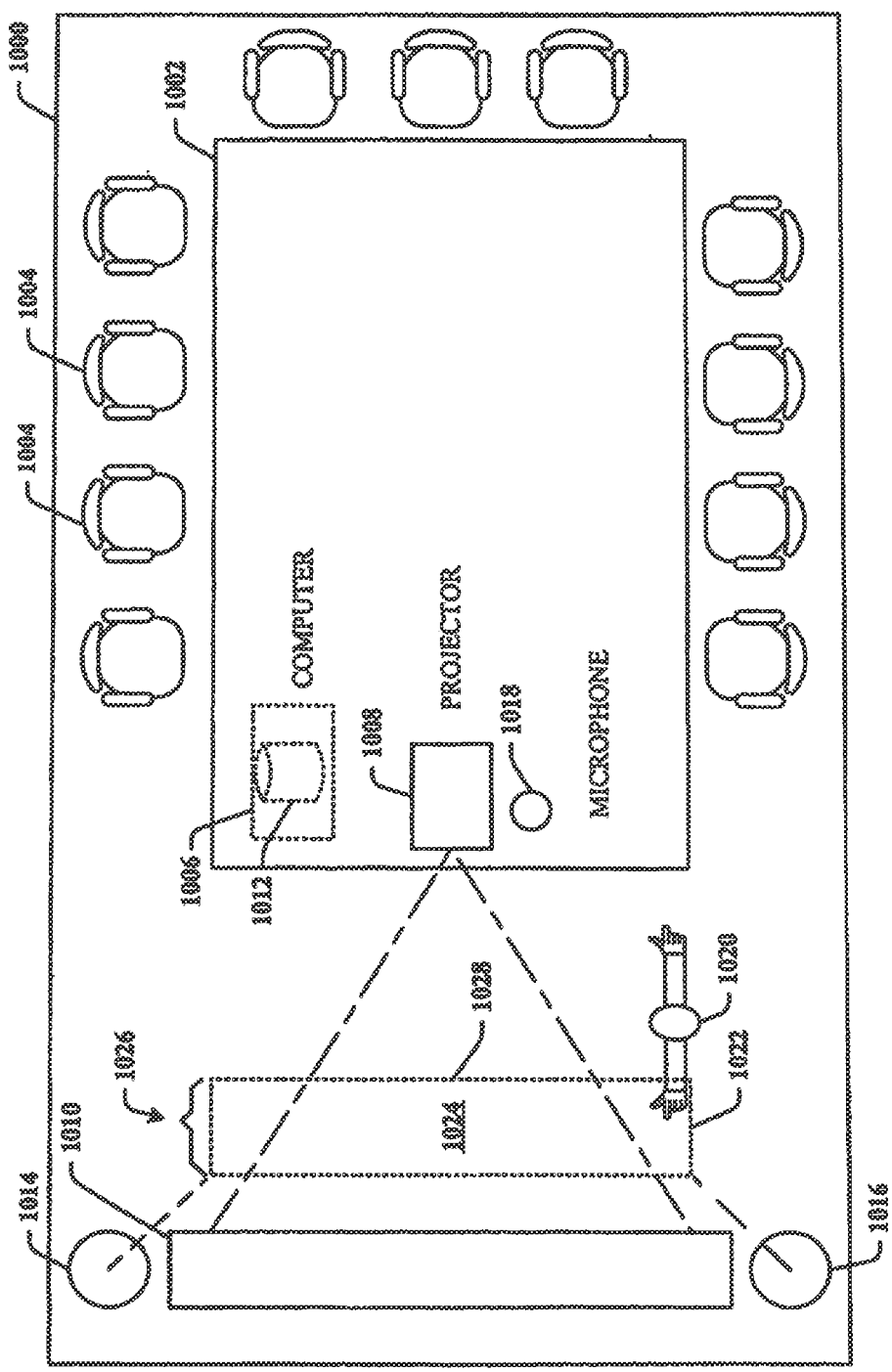
FIG. 10 illustrates a briefing room environment where gestures are utilized to control a screen projector via a computer system configured in accordance with an aspect of the present invention.

Referring now to FIG. 10, there is illustrated a briefing room environment where voice and/or gestures are utilized to control a screen projector via a computer system configured in accordance with an aspect of the present invention. The briefing room 1000 comprises a large briefing table 1002 surrounded on three sides by numerous chairs 1004, a computer 1006, a video projector 1008, and a projector screen 1010. Utilization of the present invention adds additional elements comprising the disclosed perceptual software 1012, two video cameras (1014 and 1016) and a microphone 1018. In this application, a user 1020 is positioned between the projector screen 1010 and briefing table 1002 at which the audience is seated. A top face 1022 of an engagement volume 1024 is defined by rectangular area 1026. Similarly, a front surface indicated at 1028 represents an engagement plane.

As the user gives the presentation, the user controls the content displayed on the projection screen 1010 and advancement of the slides (or presentation images) by moving their hand(s) through the engagement plane 1028 into the engagement volume 1024, and/or speaking commands recognizable by the system. Once inside the engagement volume 1024, a simple gesture is made to advance to the next slide, back-up to a previous slide, initiate an embedded video, or to effect one of a number of many other presentation capabilities.

A similar capability can be implemented for a home media center wherein the user can change selected video sources, change channels, control volume, advance chapter and other similar functions by moving their hand across an engagement plane into an engagement volume and subsequently performing the appropriate hand gesture. Additional applications include perceptual interfaces for TabletPCs, Media center PCs, kiosks, hand held computers, home appliances, video games, and wall sized displays, along with many others.

It is appreciated that in more robust implementations, instead of the engagement volume being fixed at a position associated with the location of the cameras that requires the presenter to operate according to the location of the engagement volume, the system can be configured such that the engagement volume travels with the user (in a "roaming" mode) as the user moves about the room. Thus, the cameras would be mounted on a platform that rotates such that the rotation maintains the cameras substantially equidistant from the presenter. The presenter may carry a sensor (e.g., an RFID tag) that allows the system to sense or track the general location of the presenter. The system would then affect rotation of the camera mount to "point" the cameras at the presenter. In response thereto, the engagement volume may be extended to the presenter allowing control of the computer system as the presenter moves about. The process of "extending" the engagement volume can include increasing the depth of the volume such that the engagement plane surface moves to the presenter, or by maintaining the volume dimensions, but moving the fixed volume to the presenter. This would require on-the-fly focal adjustment of the cameras to track quick movements in the depth of objects in the volume, but also the movement of the presenter.

Another method of triggering system attention in this mode would be to execute a predefined gesture that is not likely to be made unintentionally, e.g., raising a hand.

It is also appreciated that the system is configurable for individual preferences such that the engagement volume of a first user may be different from the volume of a second user. For example, in accordance with a user login, or other unique user information, the user preferences may be retrieved and implemented automatically by the system. This can include automatically elevating the mounted cameras for a taller person by using a telescoping camera stand so that the cameras are at the appropriate height of the particular user, whether sitting or standing. This also includes, but is not limited to, setting the system for "roaming" mode.

Figure 11:
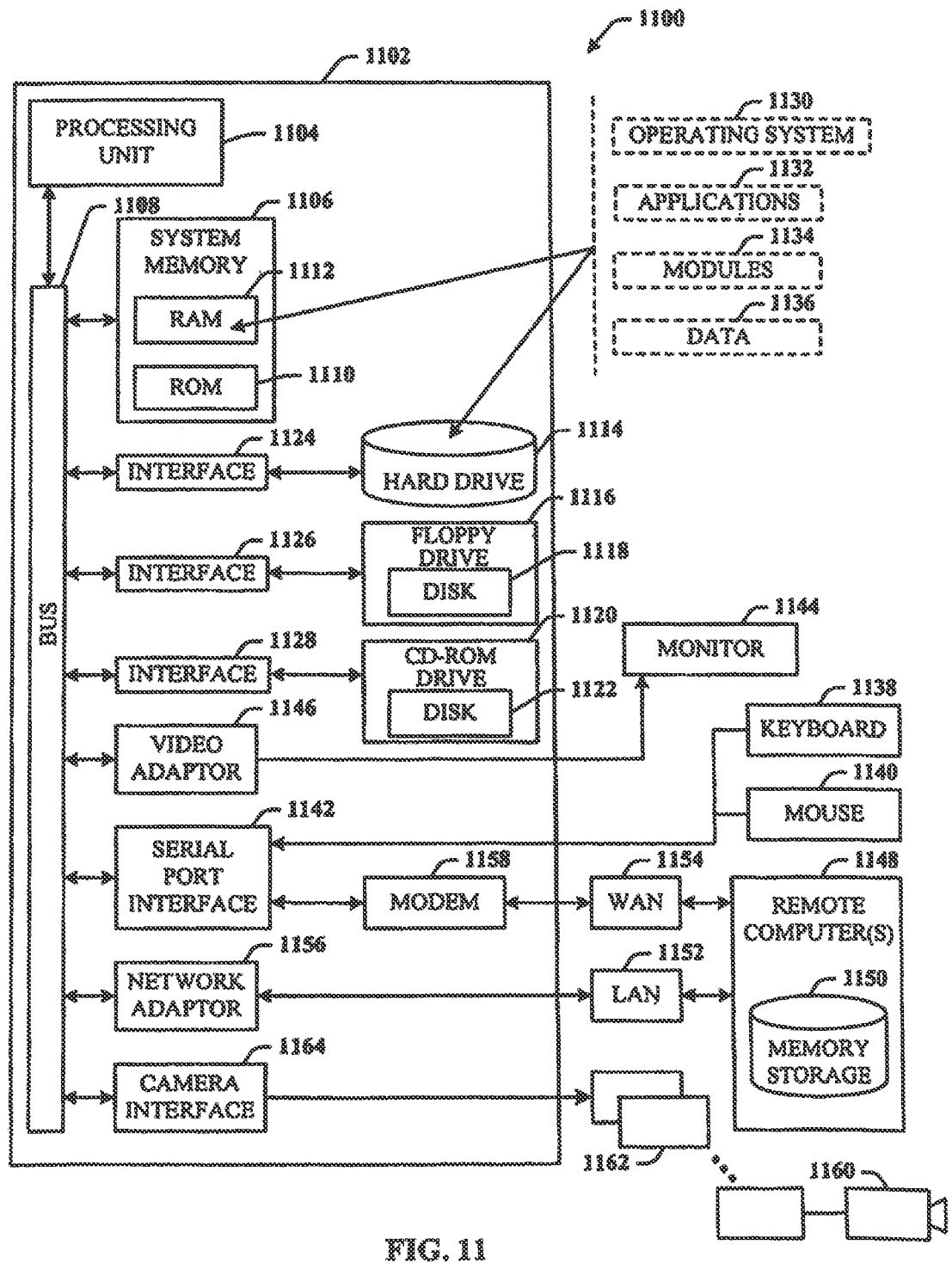
FIG. 11 illustrates a block diagram of a computer system operable to execute the present invention.

Referring now to FIG. 11, there is illustrated a block diagram of a computer operable to execute the present invention. In order to provide additional context for various aspects of the present invention, FIG. 11 and the following discussion are intended to provide a brief, general description of a suitable computing environment 1100 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

With reference again to FIG. 11, the exemplary environment 1100 for implementing various aspects of the invention includes a computer 1102, the computer 1102 including a processing unit 1104, a system memory 1106, and a system bus 1108. The system bus 1108 couples system components including, but not limited to the system memory 1106 to the processing unit 1104. The processing unit 1104 may be any of various commercially available processors. Dual microprocessors and other multi processor architectures also can be employed as the processing unit 1104.

The system bus 1108 can be any of several types of bus structure including a memory bus or memory controller, a peripheral bus, and a local bus using any of a variety of commercially available bus architectures. The system memory 1106 includes read only memory (ROM) 1110 and random access memory (RAM) 1112. A basic input/output system (BIOS), containing the basic routines that help to transfer information between elements within the computer 1102, such as during start-up, is stored in the ROM 1110.

The computer 1102 further includes a hard disk drive 1114, a magnetic disk drive 1116, (e.g., to read from or write to a removable disk 1118) and an optical disk drive 1120, (e.g., reading a CD-ROM disk 1122 or to read from or write to other optical media). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The drives and their associated computer-readable media provide nonvolatile storage of data, data structures, computer-executable instructions, and so forth. For the computer 1102, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1112, including an operating system 1130, one or more application programs 1132, other program modules 1134 and program data 1136. It is appreciated that the present invention can be implemented with various commercially available operating systems or combinations of operating systems.

A user can enter commands and information into the computer 1102 through a keyboard 1138 and a pointing device, such as a mouse 1140. Other input devices (not shown) may include one or more video cameras, one or microphones, an IR remote control, a joystick, a game pad, a satellite dish, a scanner, or the like. These and other input devices are often connected to the processing unit 1104 through a serial port interface 1142 that is coupled to the system bus 1108, but may be connected by other interfaces, such as a parallel port, a game port, an IEEE 1394 serial port, a universal serial bus ("USB"), an IR interface, etc. A monitor 1144 or other type of display device is also connected to the system bus 1108 via an interface, such as a video adapter 1146. In addition to the monitor 1144, a computer typically includes other peripheral output devices (not shown), such as speakers, printers etc.

The computer 1102 may operate in a networked environment using logical connections to one or more remote computers, such as a remote computer(s) 1148. The remote computer(s) 1148 may be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include a LAN 1152 and a WAN 1154. Such networking environments are commonplace in offices, enterprise-wide computer networks, intranets and the Internet.

When used in a LAN networking environment, the computer 1102 is connected to the local network 1152 through a network interface or adapter 1156. When used in a WAN networking environment, the computer 1102 typically includes a modem 1158, or is connected to a communications server on the LAN, or has other means for establishing communications over the WAN 1154, such as the Internet. The modem 1158, which may be internal or external, is connected to the system bus 1108 via the serial port interface 1142. In a networked environment, program modules depicted relative to the computer 1102, or portions thereof, may be stored in the remote memory storage device 1150. It will be appreciated that the network connections shown are exemplary and other means of establishing a communications link between the computers may be used.

Further, a camera 1160 (such as a digital/electronic still or video camera, or film/photographic scanner) capable of capturing a sequence of images 1162 can also be included as an input device to the computer 1102. While just one camera 1160 is depicted, multiple cameras 1160 could be included as input devices to the computer 1102. The images 1162 from the one or more cameras 1160 are input into the computer 1102 via an appropriate camera interface 1164. This interface 1164 is connected to the system bus 1108, thereby allowing the images 1162 to be routed to and stored in the RAM 1112, or one of the other data storage devices associated with the computer 1102. However, it is noted that image data can be input into the computer 1102 from any of the aforementioned computer-readable media as well, without requiring the use of the camera 1160.

Referring now to FIG. 12, there is illustrated a network implementation 1200 of the present invention. The implementation 1200 includes a first perceptual system 1202 and a second perceptual system 1204, both operational according to the disclosed invention. The first system 1202 includes cameras 1206 (also denoted C1 and C2) mounted on a rotational and telescoping camera mount 1208. A first user 1210 located generally in front of the first system 1202 effects control of a GUI Content A of the first system 1202 in accordance with the novel aspects of the present invention by introducing hand gestures into an engagement volume 1211 and/or voice signals via a microphone. The first user 1210 may roam about in front of the cameras 1206 in accordance with the "roaming" operational mode described previously, or may be seated in front of the cameras 1206. The second system 1204 includes cameras 1212 (also denoted C3 and C4) mounted on a rotational and telescoping camera mount 1214. A second user 1216 located generally in front of the second system 1204 effects control of a GUI Content B of the second system 1204 in accordance with the novel aspects of the present invention by introducing hand gestures into an engagement volume 1217 and/or voice signals using a microphone. The second user 1216 may roam about in front of the cameras 1212 in accordance with the "roaming" operational mode described previously, or may be seated in front of the cameras 1212.

The first and second systems (1202 and 1204) may be networked in a conventional wired or wireless network 1207 peer configuration (or bus configuration by using a hub 1215). This particular system 1200 is employed to present both Content A and Content B via a single large monitor or display 1218. Thus the monitor 1218 can be driven by either of the systems (1202 and 1204), as can be provided by conventional dual-output video graphics cards, or the separate video information may be transmitted to a third monitor control system 1220 to present the content. Such an implementation finds application where a side-by-side comparison of product features is being presented, or other similar applications where two or more users may desire to interact. Thus, Content A and Content B can be presented on a split screen layout of the monitor 1218. Either or both users (1210 and 1216) can also provide keyboard and/or mouse input to facilitate control according to the present invention.

3-D Imaging Implementations

Figure 13:
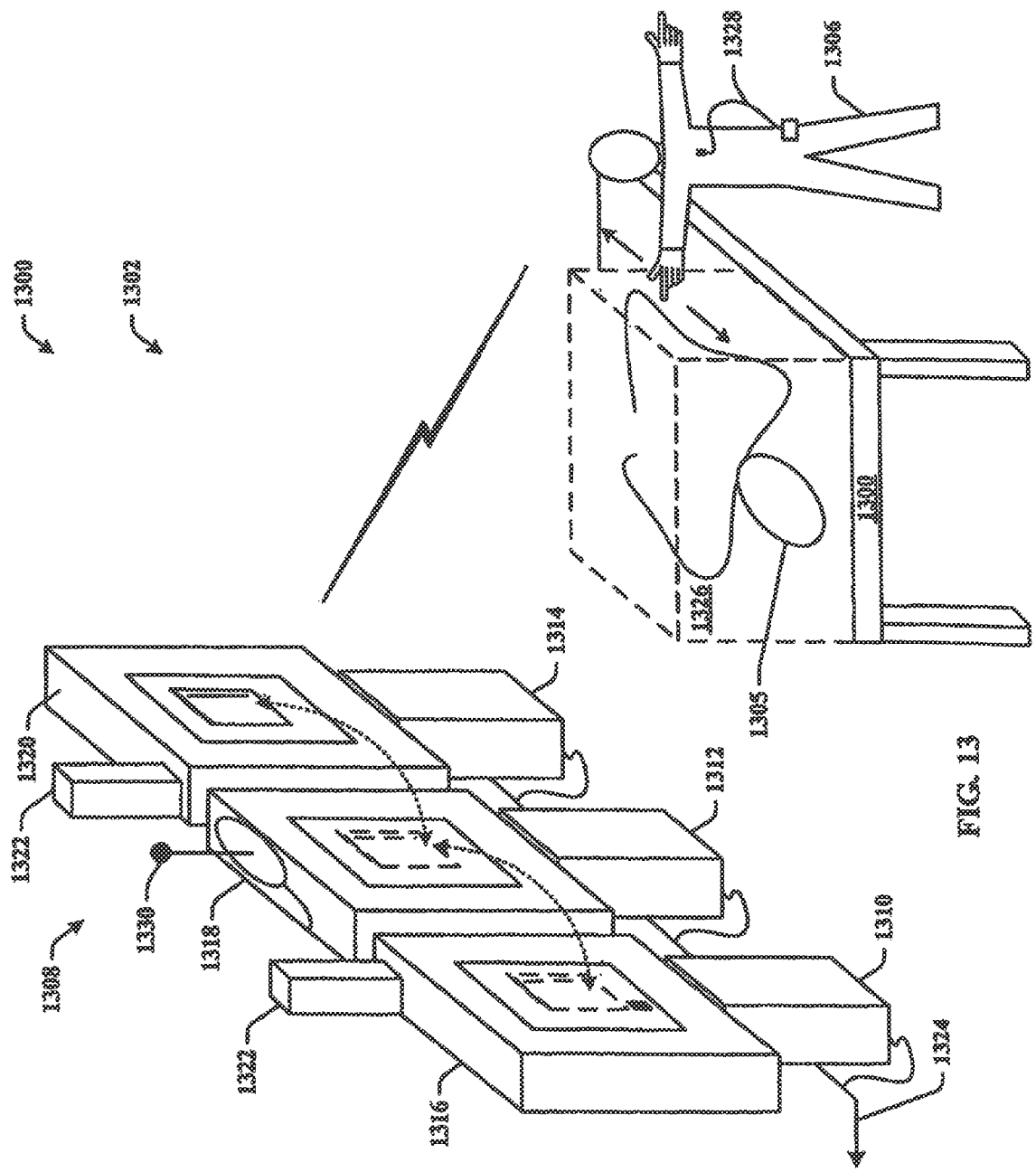
FIG. 13 illustrates a medical operating room system that uses the engagement volume in accordance with the present invention.

Referring now to FIG. 13, there is illustrated a medical operating room system 1300 that uses the engagement volume in accordance with the present invention. An operating room 1302 includes an operating table 1304 on which a patient 1305 is placed. A doctor (or medical person) 1306 is positioned to one side of the table 1304 in order to effectively operate on the patient 1305. However, it is to be appreciated that the medical person 1306 may be required to move around the table 1304 and operate from various positions and angles.

The operating room system 1300 also includes an operation computer system 1308 used by the medical person 1306 to facilitate the operation. In this particular embodiment, the operation computer system 1308 comprises three computer systems: a first computer system 1310, a second computer system 1312, and a third computer system 1314. The first system 1310 includes a first monitor (or display) 1316, the second system 1312 includes a second display 1318, and the third system 1314 includes a third display 1320. Medical information related to the patient 1305 can be displayed on the any one or more of the monitors (1316, 1318 and 1320) before, during, and/or after the operation. Note that the computer and displays can be oriented or positioned in any manner suitable for easy use and viewing by operating room personnel.

The operation computing system 1308 also includes at least a pair of cameras 1322 suitably designed for capturing images of at least the hands, arms, head, and general upper torso appendage positions, to the level of hand and finger positions of the medical person 1306. The cameras 1322 can be connected to a single computer system for the input of image data, and thereafter, the image data distributed among the computing systems (1310, 1312, and 1314) for processing. The three computer systems (1310, 1312, and 1314) are networked on a wired network 1324, which network 1324 can connect to a larger hospital or facility-wide network, for example. Note that it is not required to have three computer systems. Alternatively, in such environments where the network 1324 can present a bottleneck to such data transfers, a gigabit or faster network can be employed internally and locally for high-speed communication of the image data between the computer systems (1310, 1312, and 1314) or to a fourth computer system (not shown) on the local high-speed network that can more efficiently and quickly process and present the image data to any one or more of the displays (1316, 1318, and 1320). The disclosed invention is not restricted to more computers or fewer computers. This is to indicate that the system can employ a plurality of computers for presenting the same information from multiple perspectives (as could be beneficial in an operating room environment), and different information from each system, for example.

In one implementation, the operation computing system 1308 develops an engagement volume 1326 above the operating table 1304, which volume envelops part or all the operation area of patient 1305. Thus, the table 1304, patient 1305, and volume 1326 are all at a height suitable for operation such that the hands of the medical person 1306 can engage the volume 1326 at an appropriate height to be detected and tracked by the computing system 1308. Hand gestures of the medical person 1306 are then imaged, tracked, and processed, as described hereinabove, and more specifically, with respect to FIG. 9, to facilitate controlling the presentation of information on one or more of the displays (1316, 1318, and 1320) via associated computing systems, as this can also entail audio I/O. In support of voice commands, the medical person 1306 can be outfitted with a wireless portable microphone system 1328 that includes a power supply, microphone, and transmitter for communicating wirelessly with a computer wireless transceiver system 1330 of the operation computer system 1308. Thus, voice commands alone or in combination with hand gestures can be used to facilitate the operation.

Figure 14:
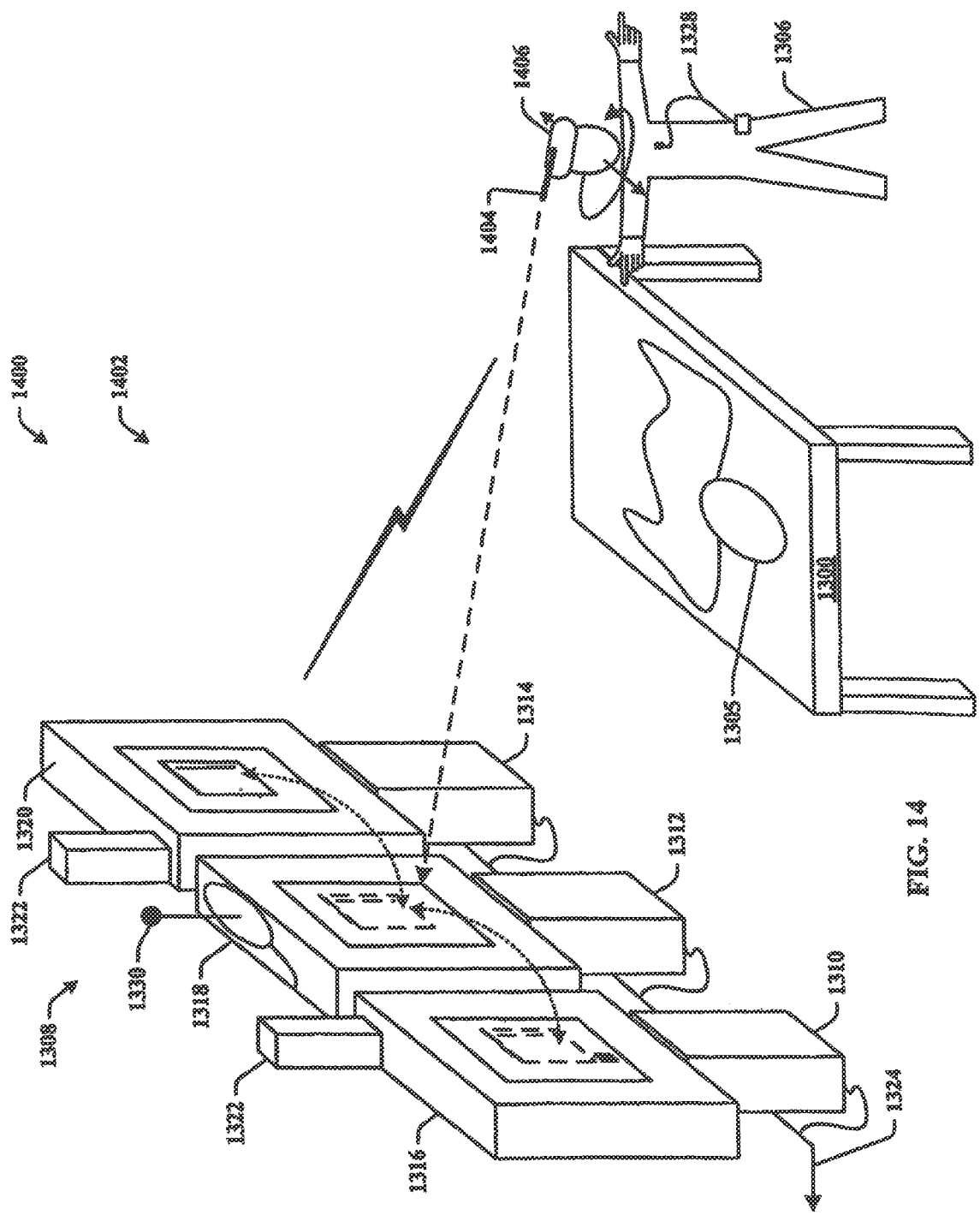
FIG. 14 illustrates a medical operating room environment in which a computer control system with wireless control device is employed in accordance with the present invention.

Referring now to FIG. 14 and FIG. 23, there is illustrated a medical operating room environment 1400 in which a computer control system 1404 with a wireless control device 1404 is employed. The system 1404 also includes the use of the wireless control device 1404 for control thereof. Here, the engagement volume of FIG. 13 is no longer required or used only marginally. Continuing with the operating room implementation, the medical person 1306 uses the wireless remote control user interface (UI) device 1404 (hereinafter referred to as a "wand") to facilitate control of the operation computer system 1308. The wand 1404 can be positioned on a headpiece 1406 worn by the medical person 1306 to provide the free use of hands during the procedure. The wand 1404 is oriented in parallel with the line of sight (or also called, "gaze") of the person 1306 such that when the person's line of sight is to the system 1308, this is detected as an interaction to be processes by the system 1308. All the person 1306 needs to do is perform head movements to facilitate control of the operation computing system 1308. The wand 1404 includes one or more sensors the outputs of which are transmitted to the transceiver system 1330 and forwarded to the operation computing system 1308 for processing. The wand 1404 and associated computing system and imaging capabilities are described in the following pending U.S. patent application Ser. No. 10/160,692, entitled "A SYSTEM AND PROCESS FOR SELECTING OBJECTS IN A UBIQUITOUS COMPUTING ENVIRONMENT," filed May 31, 2002 (issued Jan. 3, 2006 as U.S. Pat. No. 6,982,697), and Ser. No. 10/160,659, entitled "A SYSTEM AND PROCESS FOR CONTROLLING ELECTRONIC COMPONENTS IN A UBIQUITOUS COMPUTING ENVIRONMENT USING MULTIMODAL INTEGRATION," filed May 31, 2002 (issued Jan. 24, 2006 as U.S. Pat. No. 6,990,639), both of which are hereby incorporated by reference.

In general, the system 1402 includes the aforementioned wand 1404 in the form of the wireless radio frequency (RF) pointer, which includes an RF transceiver and various orientation sensors. The outputs of the sensors are periodically packaged as orientation signals and transmitted using the RF transceiver to the computer transceiver 1330, which also has a RF transceiver to receive the orientation messages transmitted by the wand 1404. The orientation signals of the wand 1404 are forwarded to the computer system 1308. The computer system 1308 is employed to compute the orientation and location of the wand 1404 using the orientation signals, as are images of the wand 1404 captured by the cameras 1322. The orientation and location of the wand 1404 is in turn used to determine if the wand 1404 is being pointed at an object in the operating room environment 1400 that is controllable by the computer system 1308 via the network 1324, such as one of the displays (1316, 1318, or 1320). If so, the object is selected.

The wand 1404 specifically includes a case having a shape with a defined pointing end, a microcontroller, the aforementioned RF transceiver and orientation sensors which are connected to the microcontroller, and a power supply (e.g., batteries) for powering these electronic components. The orientation sensors of the wand 1404 include at least, an accelerometer, which provides separate x-axis and y-axis orientation signals, and a magnetometer, which provides separate tri-axial measurements (x-axis, y-axis, and z-axis) orientation signals. These electronics are housed in a case that resembles a handheld wand. However, the packaging can be of any form factor such that the functionality of the wand 1404 can be used for the particular purpose.

As indicated previously, the orientation signals generated by the wand 1404 include the outputs of the sensors. To this end, the wand microcontroller periodically reads and stores the outputs of the orientation sensors. Whenever a request for an orientation signal is received (or it is time to generate such a signal if the pointer is programmed to do so without a request), the microcontroller includes the last-read outputs from the accelerometer and magnetometer in the orientation signal.

Figure 27:
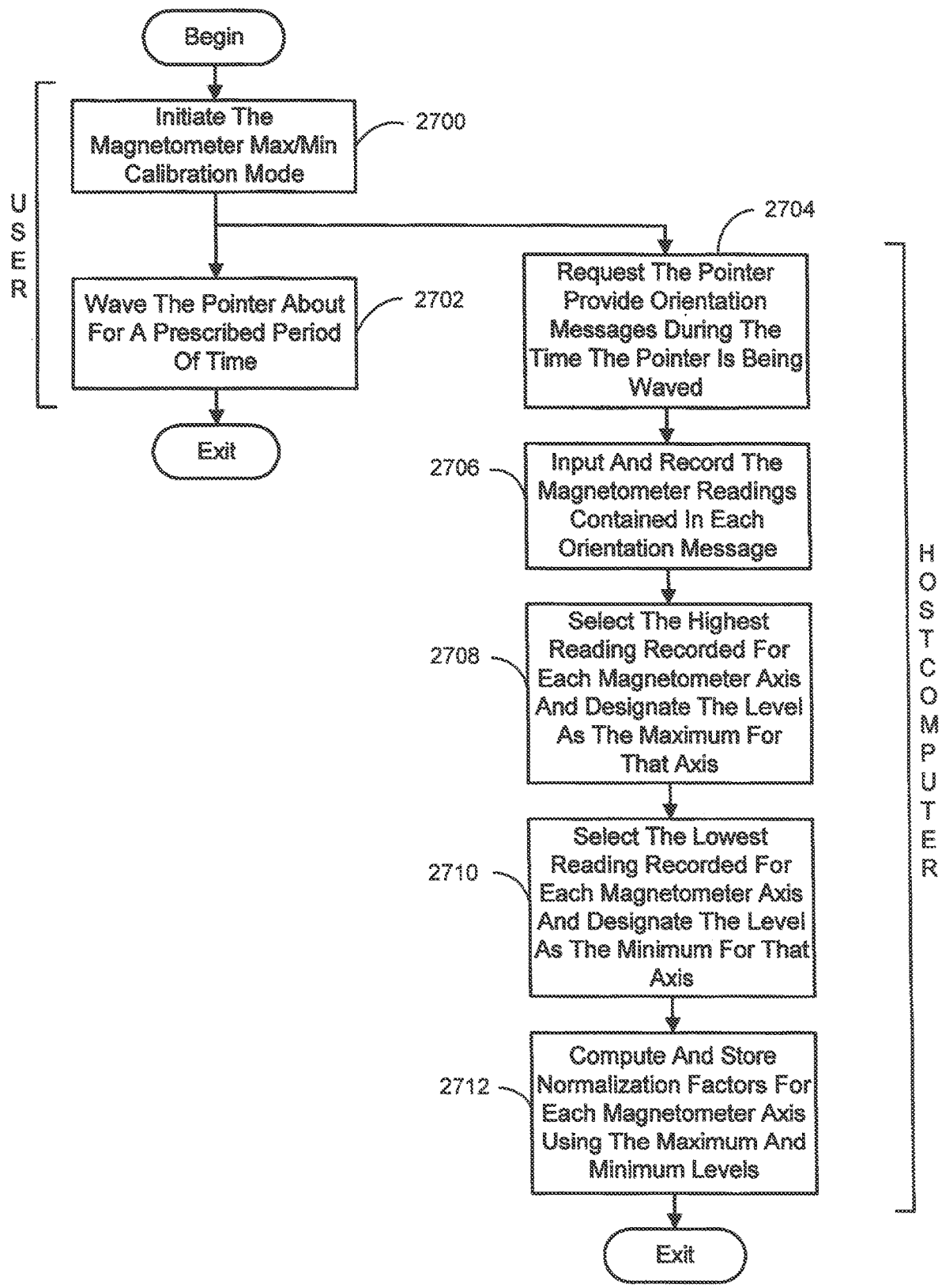
FIG. 27 is a flow chart diagramming a process for determining a set of magnetomer normalization factors for use in deriving the orientation of the pointer performed as part of the overall process for selecting an object.

Specifically, referring to FIG. 27, the user would put the object selection process running on the host computer in a magnetometer max/min calibration mode (process action 2700), and then wave the pointer about (process action 2702). Meanwhile, the object selection process requests the pointer to provide orientation messages in the normal manner (process action 2704). The object selection process then inputs and records the magnetometer readings contained in each orientation message transmitted by the pointer (process action 2706). This recording procedure (and presumably the pointer waving) continues for a prescribed period of time (e.g., about 1 minute) to ensure the likelihood that the highest and lowest possible readings for each axis are recorded. Once the recording procedure is complete, the object selection process selects the highest reading recorded for each axis of the magnetometer and designates these levels as the maximum for that axis (process action 2708). Similarly, the host computer selects the lowest reading recorded for each axis of the magnetometer and designates these levels as the minimum for that axis (process action 2710). Normalization factors are then computed via standard methods and stored for each magnetometer axis that convert the range represented by the maximum and minimum levels to a normalized range between 1.0 and −1.0 (process action 2712). These magnetometer normalization factors are used to normalize the actual readings from the magnetometer by converting the readings to normalized values between 1.0 and −1.0 during a normalization procedure to be discussed shortly. It is noted that the maximum and minimum values for an axis physically correspond to that axis of the magnetometer being directed along magnetic north and directly away from magnetic north, respectively. It is noted that while the foregoing waving procedure is very simple in nature, it worked well in tested embodiments of the object selection system and provided accurate results.

Factors for range-normalizing (in [−1,1]) the accelerometer readings are also computed in the calibration procedure. In this case, the normalization factors are determined using the accelerometer output normalization procedures applicable to the accelerometer used, such as the conventional static normalization procedure used in tested embodiments of the object selection process.

Once the calibration procedure is complete, the object selection process is ready to compute the orientation of the pointer each time an orientation data message is received by the host computer. The orientation of the pointer is defined in terms of its pitch, roll and yaw angle about the respective x, y and z axes of the environment's pre-defined coordinate system. These angles can be determined via various sensor fusion processing schemes that essentially compute the angle from the readings from the accelerometer and magnetometer of the pointer. Any of these existing methods could be used, however a simplified procedure was employed in tested versions of the object selection system. In this simplified procedure, the yaw angle is computed using the recorded values of the magnetometer output. Even though the magnetometer is a 3-axis device, the pitch, roll and yaw angles cannot be computed directly from the recorded magnetometer values contained in the orientation data message. The angles cannot be computed directly because the magnetometer outputs a value that is the dot-product of the direction of each magnetometer sensor axis against the direction of magnetic north. This information is not sufficient to calculate the pitch, roll, and yaw of the device. However, it is possible to use the accelerometer readings in conjunction with the magnetometer outputs to compute the orientation. Specifically, referring to FIGS. 25 and 26, the first action in the procedure is to normalize the magnetometer and accelerometer values received in the orientation message using the previously computed normalization factors to simplify the calculations (process action 1000A). The pitch and roll angles of the pointer are then computed from the normalized x-axis and y-axis accelerometer values, respectively (process action 1002A). Specifically, the pitch angle=−arcsin($a_1$), where $a_1$ is the normalized output of the accelerometer approximately corresponding to the rotation of the pointer about the x-axis of the environment's coordinate system, and the roll angle=−arcsin($a_2$) where $a_2$ is the normalized output of the accelerometer approximately corresponding to the rotation of the pointer about the y-axis of the environment's coordinate system. Next, these pitch and roll values are used to refine the magnetometer readings (process action 1004A). Then, in process action 1006A, the previously computed magnetometer correction factors are applied to the refined magnetometer values. Finally, the yaw angle is computed from the refined and corrected magnetometer values (process action 1008A).

Specifically, the range-normalized accelerometer values representing the pitch and roll are used to establish the rotation matrix $R_{\alpha 1, \alpha 2, 0}$, which represents a particular instance of the Euler angle rotation matrix $R_{\theta x, \theta y, \theta z}$ that defines the composition of rotations about the x, y and z axes of the prescribed environmental coordinate system. Next, a 3-value vector m is formed from the range-normalized values output by the magnetometer. The computed yaw angle, along with the pitch and roll angles derived from the accelerometer readings, are then tentatively designated as defining the orientation of the pointer at the time the orientation data message was transmitted by the device (process action 1010A).

It is noted that there are a number of caveats to the foregoing procedure. First, accelerometers only give true pitch and roll information when the pointer is motionless. This is typically not an issue except when the orientation computations are being used to determine if the pointer is being pointed directly at an object. In such cases, the problem can be avoided by relying on the orientation information only when the device is deemed to have been motionless when the accelerometer readings were captured. To this end, the orientation (i.e., pitch, roll and yaw) of the pointer is computed via the foregoing procedure for the last orientation message received. This is then compared to the orientation computed for the next to last orientation message received, to determine if the orientation of the pointer has changed significantly between the orientation messages. If the orientation of the pointer did not change significantly, then this indicates that the pointer was motionless prior to the transmission of the last orientation message. If the pointer was deemed to have been motionless, then the orientation information is used. However, if it is found that a significant change in the orientation occurred between the last two orientation messages received, it is deemed that the pointer was in motion and the orientation information computed from the last-received orientation message is ignored. Secondly, magnetic north can be distorted unpredictably in indoor environments and in close proximity to large metal objects. However, in practice, while it was found that for typical indoor office environments magnetic north did not always agree with magnetic north found outdoors, it was found to be fairly consistent throughout a single room. Thus, since the above-described magnetometer correction factors relate the perceived direction of magnetic north in the environment in which the pointer is operating to the prescribed coordinate system of that environment, when the environment is a room, it will not make any difference if the perceived direction of magnetic north within the room matches that in any other room or outdoors, as the orientation of the pointer is computed for that room only. Finally, it should be noted that the foregoing computations will not provide accurate results if the perceived magnetic north in the environment happens to be co-linear to the gravity vector—a situation not likely to occur.

Figure 26:
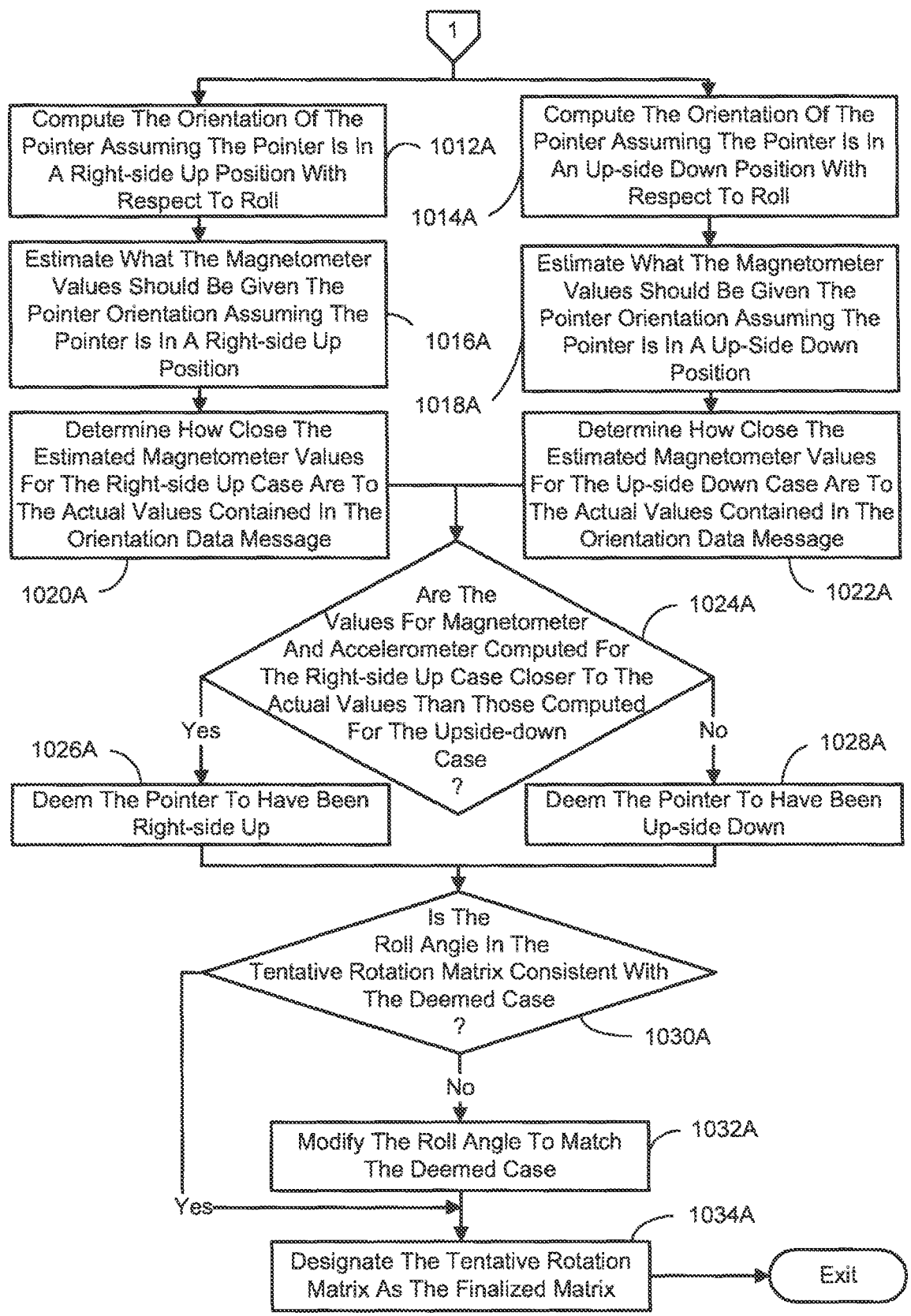

The foregoing designation of the pointer's orientation is tentative because it cannot be determined from the accelerometer reading used to compute the roll angle whether the device was in a right-side up, or upside-down position with respect to roll when the accelerometer outputs were captured for the orientation data message. Thus, the computed roll angle could be inaccurate as the computations assumed the pointer was right-side up. Referring now to FIG. 26, this uncertainty can be resolved by computing the orientation assuming the pointer is right-side up (process action 1012A) and then assuming the pointer is up-side down (process action 1014A). Each solution is then used to compute an estimate of what the magnetometer outputs should be given the computed orientation (process actions 1016A and 1018A). It is then determined for each case how close the estimated magnetometer values are to the actual values contained in the orientation message (process actions 1020A and 1022A). It is next ascertained whether the estimated magnetometer values for the right-side up case are closer to the actual values than the estimated value for the upside-down case (process action 1024A). If they are, then the pointer is deemed to have been right-side up (process action 1026A). If, however, it is determined that the estimated magnetometer values for the right-side up case are not closer to the actual values than the estimated value for the upside-down case, then the pointer is deemed to have been up-side down (process action 1028A). It is next determined if roll angle computed in the tentative rotation matrix is consistent with the deemed case (process action 1030A). If it is consistent, the tentative rotation matrix is designated as the finalized rotation matrix (process action 1034A). If, however, the tentative rotation matrix is inconsistent with the minimum error case, then the roll angle is modified (i.e., by 180 degrees) in process action 1032A, and the modified rotation matrix is designated as the finalized rotation matrix (process action 1034A).

The wand 1404 also includes other electronic components such as a user activated switch or button, and a series of light emitting diodes (LEDs). The user-activated switch, which is also connected to the microcontroller, is employed for the purpose of instructing the computer to implement a particular function, such as will be described later. To this end, the state of the switch in regard to whether it is activated or deactivated at the time an orientation message is packaged is included in that message for transmission to the computer. The series of LEDs includes a pair of differently colored, visible spectrum LEDs, which are connected to the microcontroller, and which are visible from the outside of the pointer's case when lit. These LEDs are used to provide status or feedback information to the user, and are controlled via instructions transmitted to the pointer by the computer.

However, as will be described in greater detail hereinbelow, since the wand 1404 includes at least one motion sensor, the user activated switch can be implemented in an alternative manner using hands-free control thereof via heed movements, for example, or a combination of voice activation, and/or head movement, just to name a few.

The foregoing system 1402 is utilized to select an object by having the user simply point to the object or feature with the wand 1404. This entails the computer system 1308 first receiving the orientation signals transmitted by the wand 1404. For each message received, the computer 1308 derives the orientation of the wand 1404 in relation to a predefined coordinate system of the environment in which the wand 1404 is operating using the orientation sensor readings contained in the message. In addition, the video output from the video cameras 1322 is used to ascertain the location of the wand 1404 at a time substantially contemporaneous with the generation of the orientation signals and in terms of the predefined coordinate system. Once the orientation and location of the wand 1404 are computed, they are used to determine whether the wand 1404 is being pointed at an object in the environment that is controllable by the computer system 1308. If so, then that object is selected for future control actions.

Figure 25:
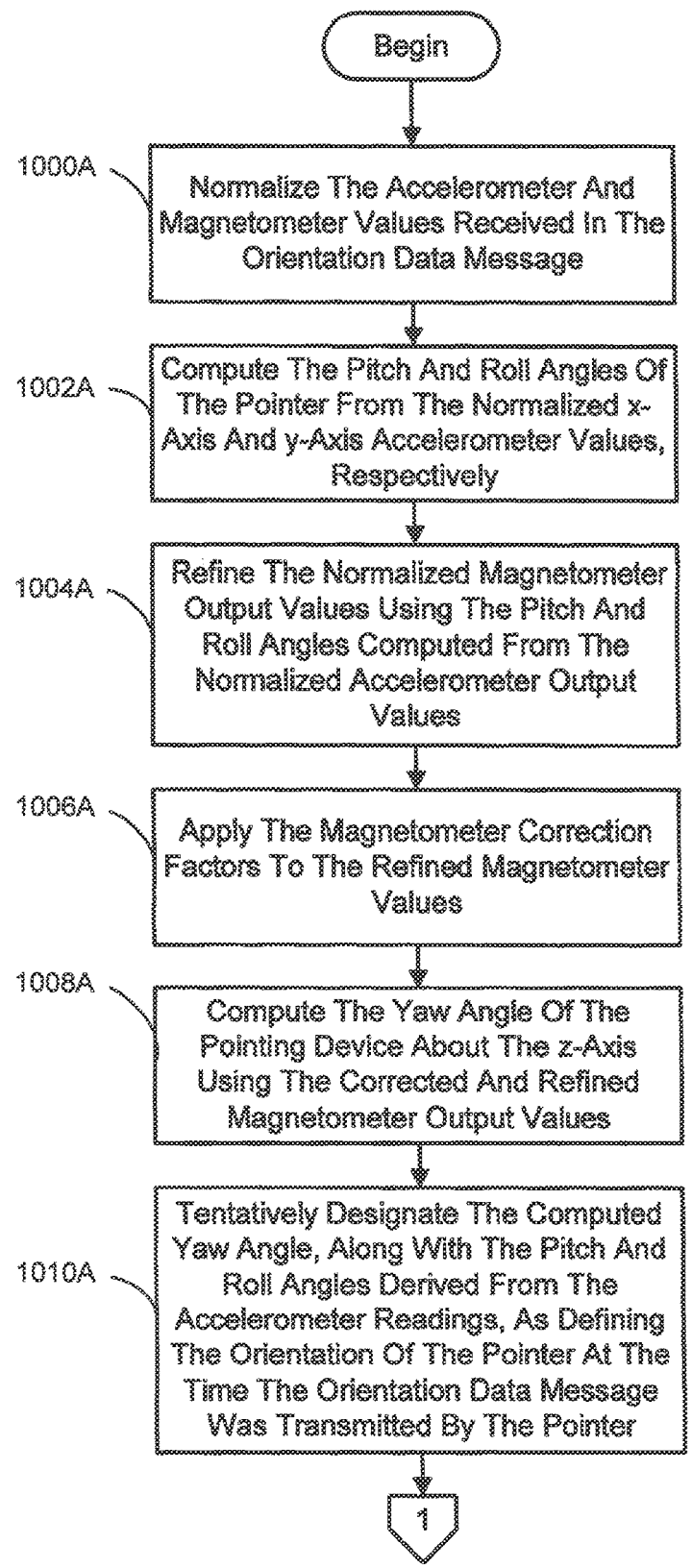
FIGS. 25-26 depict a flow chart diagramming the process for deriving the orientation of the pointer.

Referring also to FIGS. 25 and 26, the computer system 1308 derives the orientation of the wand 1404 from the orientation sensor readings contained in the orientation signals, as follows. First, the accelerometer and magnetometer output values contained in the orientation signals are normalized. 1000 Angles defining the pitch of the wand 1404 about the x-axis and the roll of the device about the y-axis are computed 1002 from the normalized outputs of the accelerometer. The normalized magnetometer output values are then refined 1004 using these pitch and roll angles. Next, previously established correction factors for each axis of the magnetometer, which relate the magnetometer outputs to the predefined coordinate system of the environment, are applied 1006 to the associated refined and system of the environment, are applied to the associated refined and normalized outputs of the magnetometer. The yaw angle of the wand 1404 about the z-axis is computed 1008 using the refined magnetometer output values. The computed pitch, roll and yaw angles are then tentatively designated 1010 as defining the orientation of the wand 1404 at the time the orientation signals are generated.

It is further noted that the 2-axis accelerometer used in the tested versions of the pointer could be replaced with a more complex 3-axis accelerometer, or an additional 1-axis accelerometer or mercury switch oriented in the appropriate direction could be employed, to eliminate the need for the foregoing error computation procedure. This would be possible because it can be determined directly from the "third"-axis readout whether the pointer was right-side up or upside-down with respect to roll.

It is next determined whether the wand 1404 is in a right-side up or up-side down position at the time the orientation signals were generated. If the wand 1404 was in the right-side up position, the previously computed pitch, roll and yaw, angles are designated as the defining the finalized orientation of the wand 1404. However, if it is determined that the wand 1404 was in the up-side down position at the time the orientation message was generated, the tentatively designated roll angle is corrected accordingly, and then the pitch, yaw and modified roll angle are designated as defining the finalized orientation of the wand 1404.

In the foregoing description, it is assumed that the accelerometer and magnetometer of the wand 1404 are oriented such that their respective first axis corresponds to the x-axis which is directed laterally to a pointing axis of the wand 1404, and their respective second axis corresponds to the y-axis, which is directed along the pointing axis of the wand 1404, and the third axis of the magnetometer corresponds to the z-axis, which is directed vertically upward when the wand 1404 is positioned right-side up with the x and y axes lying in a horizontal plane.

In regard to the use of simple and short duration gestures, such as for example a single upwards or downwards motion, an opportunity exists to employ a simplified approach to gesture recognition. For such gestures, a recognition strategy can be employed that looks for simple trends or peaks in one or more of the sensor values output by the pointer. For example, pitching the pointer up may be detected by simply thresholding the output of the accelerometer corresponding to pitch.

Once the object is selected, the electronic device can be controlled by the user informing the computer in some manner of what he or she wants the device to do. As described above, this may be as simple as instructing the computer to turn the device on or off by activating a switch or button on the pointer. However, it is also desirable to control device in more complex ways than merely turning them on or off. Thus, the user must have some way of relaying the desired command to the computer. One such way is by having the user perform certain gestures with the pointer that the computer will recognize as particular commands. This can be accomplished in a variety of ways.

A user is also able to control a media player. Specifically, the user points the pointer at the host computer's monitor where the media player's GUI is displayed, and depresses the pointer's button to start the player or to pause it. The user can also roll the pointer to the left or right to change the volume, and can gesture up or down to move the previous or next tracks in the play list. "Volume up", "volume down", "next" and "previous" utterances command the player accordingly.

A user can point at a computer display and click the pointer's button to give control of the cursor to the pointer. The cursor is then moved around the display's screen by pointing the pointer around the screen [7]. The pointer's button acts as the left mouse button. Clicking on a special icon in the corner of the display exits the cursor control mode.

The computer system 1308 derives the location of the wand 1404 from the video output of the video cameras 1322, as follows. In the wand 1404, there is an infrared (IR) LED connected to a microcontroller that is able to emit IR light outside the wand 1404 case when lit. The microcontroller causes the IR LEDs to flash. In addition, the aforementioned pair of digital video cameras 1322 each have an IR pass filter that results in the video image frames capturing only IR light emitted or reflected in the environment toward the cameras 1322, including the flashing from the wand 1404 IR LED which appears as a bright spot in the video image frames. The microcontroller causes the IR LED to flash at a prescribed rate that is approximately one-half the frame rate of the video cameras 1322. This results in only one of each pair of image frames produced by a camera having the IR LED flashes depicted in it. This allows each pair of frames produced by a camera to be subtracted to produce a difference image, which depicts for the most part only the IR emissions and reflections directed toward the camera which appear in one or the other of the pair of frames but not both (such as the flash from the IR LED of the pointing device). In this way, the background IR in the environment is attenuated and the IR flash becomes the predominant feature in the difference image.

The image coordinates of the pixel in the difference image that exhibits the highest intensity is then identified using a standard peak detection procedure. A conventional stereo image technique is employed to compute the 3-D coordinates of the flash for each set of approximately contemporaneous pairs of image frames generated by the pair of cameras 1322 using the image coordinates of the flash from the associated difference images and predetermined intrinsic and extrinsic camera parameters. These coordinates represent the location of the wand 1404 (as represented by the location of the IR LED) at the time the video image frames used to compute the coordinates were generated by the cameras 1322.

The orientation and location of the wand 1404 at any given time is used to determine whether the wand 1404 is being pointed at an object in the environment that is controllable by the computer system 1308. In order to do so, the computer system 1308 must know what objects are controllable and where they exist in the environment. This requires a model of the environment. In the present system and process, the location and extent of objects within the environment that are controllable by the computer system 1308 are modeled using 3-D Gaussian blobs defined by a location of the mean of the blob in terms of its environmental coordinates and a covariance.

At least two different methods have been developed to model objects in the environment. The first method involves the user inputting information identifying the object that is to be modeled. The user then activates the switch on the pointing device and traces the outline of the object. Meanwhile, the computer system 1308 is running a target training procedure that causes requests for orientation signals to be sent to the wand 1404 at a prescribed request rate. The orientation signals are input when received, and for each orientation signal, it is determined whether the switch state indicator included in the orientation signal indicates that the switch is activated. Whenever it is initially determined that the switch is not activated, the switch state determination action is repeated for each subsequent orientation signal received until an orientation signal is received that indicates the switch is activated. At that point, each time it is determined that the switch is activated, the location of the wand 1404 is ascertained, as described previously, using the digital video input from the pair of video cameras 1322. When the user is done tracing the outline of the object being modeled, he or she deactivates the switch. The target training (or calibration) process detects this as the switch having been deactivated after first having been activated in the immediately preceding orientation signal. Whenever such a condition occurs, the tracing procedure is deemed to be complete and a 3-D Gaussian blob representing the object is established using the previously ascertained wand locations stored during the tracing procedure.

The second method of modeling objects during a calibration process once again begins by the user inputting information identifying the object that is to be modeled. However, in this case the user repeatedly points the wand 1404 at the object and momentarily activates the switch on the wand 1404, each time pointing the wand 1404 from a different location within the environment. Meanwhile, the computer system 1308 is running a target training algorithm that causes requests for orientation signals to be sent to the wand 1404 at a prescribed request rate. Each orientation message received from the wand 1404 is input until the user indicates the target training inputs are complete.

For each orientation signal input, it is determined whether the switch state indicator contained therein indicates that the switch is activated. Whenever it is determined that the switch is activated, the orientation of the wand 1404 is computed, as described previously, using orientation sensor readings also included in the orientation message. In addition, the location of the wand 1404 is ascertained using the inputted digital video from the pair of video cameras 1322. The computed orientation and location values are stored.

Once the user indicates the target training inputs are complete, the location of the mean of a 3-D Gaussian blob that will be used to represent the object being modeled is computed from the stored orientation and location values of the wand 1404. The covariance of the Gaussian blob is then obtained in one of various ways. For example, it can be a prescribed covariance, a user input covariance, or the covariance can be computed by adding a minimum covariance to the spread of the intersection points of rays defined by the stored orientation and location values of the wand 1404.

With a Gaussian blob model of the environment in place, the orientation and location of the wand 1404 is used to determine whether the wand 1404 is being pointed at an object in the environment that is controllable by the computer system 1308. In one version of this procedure, for each Gaussian blob in the model, the blob is projected onto a plane that is normal to either a line extending from the location of the wand 1404 to the mean of the blob, or a ray originating at the location of the wand 1404 and extending in a direction defined by the orientation of the wand 1404. The value of the resulting projected Gaussian blob at a point where the ray intersects the plane, is computed. This value represents the probability that the wand 1404 is pointing at the object associated with the blob under consideration.

Next, the probability is computed that represents the largest value computed for the Gaussian blobs, if any. At this point, the object associated with the Gaussian blob from which the largest probability value was derived could be designated as being the object at which the wand 1404 is pointing. However, an alternative thresholding procedure could be employed instead. In this alternate version, it is first determined whether the largest probability value exceeds a prescribed minimum probability threshold. Only if the threshold is exceeded is the object associated with the projected Gaussian blob from which the largest probability value was derived designated as being the object at which the wand 1404 is pointing. The minimum probability threshold is chosen to ensure the user is actually pointing at the object and not just near the object without an intent to select it.

In an alternate procedure for determining whether the wand 1404 is being pointed at an object in the environment 1400 that is controllable by the computer system 1308, for each Gaussian blob, it is determined whether a ray originating at the location of the wand 1404 and extending in a direction defined by the orientation of the wand 1404 intersects the blob. Next, for each Gaussian blob intersected by the ray, it is determined what the value of the Gaussian blob is at a point along the ray nearest the location of the mean of the blob. This value represents the probability that the wand 1404 is pointing at the object associated with the Gaussian blob. The rest of the procedure is similar to the first method, in that, the object associated with the Gaussian blob from which the largest probability value was derived could be designated as being the object at which the wand 1404 is pointing. Alternatively, it is first determined whether the probability value identified as the largest exceeds the prescribed minimum probability threshold. If the threshold is exceeded, only then is the object associated with the projected Gaussian blob from which the largest probability value was derived designated as being the object at which the wand 1404 is pointing.

Hands-free control of the operation computing system 1308 using the head mounted wand 1404 involves generating at least a series of calibrated head movements. Moreover, since the person 1306 also uses the wireless microphone system 1328, voice commands can be employed alone or in combination with the head movements to enhance control of the computer system 1308. With the implementation of one or more motion sensors therein, e.g., accelerometers, velocity and/or acceleration data can be measured and resolved as the "switch" signal of the wand 1404 to initiate or terminate an action without physically having to move a switch with a finger, which would be extremely cumbersome and risky (insofar at least as sterilization and the transmission of germs is involved) in an operating room environment. For example, when the system 1308 determines that the gaze of the medical person 1306 is at the second display 1318, a simple left-right head movement can be interpreted to initiate a paging action such that displayed images are changed similar to a person thumbing through pages of a book. Thereafter, an up-down head nod could be used to stop the paging process. Alternatively, the paging process could be initiated by voice command after the system 1308 ascertains that the gaze is directed at the second display 1318.

If more than one wand 1404 was employed by operating room personnel, the wands can be uniquely identified by an RF tagging system, such that signals transmitted to the computer system 1308 are interpreted in association with different personnel. For example, the doctor in charge of the operation and his or her assisting nurse could each have a head mounted wand. The system 1308 can be suitably designed to discriminate the wand signals according to a unique tag ID that accompanies each signal transmitted to the computer system 1308. Such tagging system can also be used as a method of prioritizing signals for controlling the computer. For example, the system can be configured to prioritize signals received from the doctor over those signals received from the assisting nurse.

In a more sophisticated implementation, the computer system 1308 employs the classifier system described hereinabove to learn the movements of personnel over time. For example, body movements of one person typically differ from the way a body movement of another may be used to control the system 1308. Thus, instead of the user of the wand 1404 conforming to rigid criteria of signaling required by the computer system algorithm, the system 1308 can employ the classifier to learn the particular movements of a given user. Once the user "logs in" to the system 1308, these customized movement signals (and voice signals, for example) can then be activated for use by the system 1308 for that user.

It is to be appreciated that once the use of a remote wireless system 1404 is employed, other internal and external signals can be input thereto for transmission to and control of the system 1308. For example, the heart rate of the person 1306 can be monitored and input to the wand system 1404 or wireless voice system 1328 for wireless input to the system 1308 to monitor the state of the person 1306. If, during a lengthy operation, the system 1308 detects that the physical condition of the person 1306 is deteriorating, the classifier can be used to modify how the movement and voice signals are processed for controlling the system 1308. A faster heart rate can indicate faster speech and/or head movements that would then be compensated for in the system 1308 using the classifier. Of course, these parameters would be determined on a user-by-user basis.

In accordance with the orientation signals received from the wand 1404, the system 1308 can determine a number of factors about the person 1306. The system 1308 can determine when the person 1306 (or what person(s)) is looking at the system 1308. For example, if the orientation of the wand 1404 indicates that the head position (or gaze) of the person 1306 matches orientation associated with looking at any of the three monitors (1316, 1318, or 1320), here, the second monitor 1318, the system 1308 then responds according to signals received thereafter, until the viewing session associated with the second monitor 1318 is terminated by voice and/or head movements.

Where only one wand 1404 is provided, the system 1308 can re-associate the wand 1404 with a user profile of another person 1306 who will use the wand 1404. There exists a database of user profiles and tag associations such that invocation of the wand tag (or ID) with the user log-in name automatically executes the user profile for use with the wand 1404. This way, individualized user commands in the form of head movements, voice commands, etc., are automatically invoked at the user log-in process.

The system 1308 can also employ a bi-directional activation scheme wherein the user initiates a user command for starting a session, and the system 1308 responds with a signal that further requires a user response to confirm that a session is to begin. For example, the person 1306 can initiate a session by motioning an up-down head nod repeatedly for three cycles. The system 1308 receives the corresponding three cycles of up-down nod signals that are interpreted to start a session of that person 1306. In order to ensure that the head nod was not made inadvertently, the system 1308 responds by presenting an image on the first display 1316, and at which the person 1306 must point the wand 1404 to confirm the start of the session. Of course, other signals can be used to confirm session start. For example, the user can look to the ceiling, which orientation of the wand 1404 in a substantially vertical direction is interpreted to confirm the start of a session. Obviously, the number and combination of head movements and/or voice commands that can be employed in the present system are numerous, and can be used in accordance with user preferences.

In the system 1402, the transceiver system 1330 can be used for wireless communication for both the wand system 1404 and voice communications system 1328. Thus, the wand link can be of one frequency, and the voice communication link another frequency. The computer system 1308 is configured to accommodate both by proving frequency discrimination and processing so that signal streams can be filtered and processed to extract the corresponding wand and voice signals.

Figure 15:
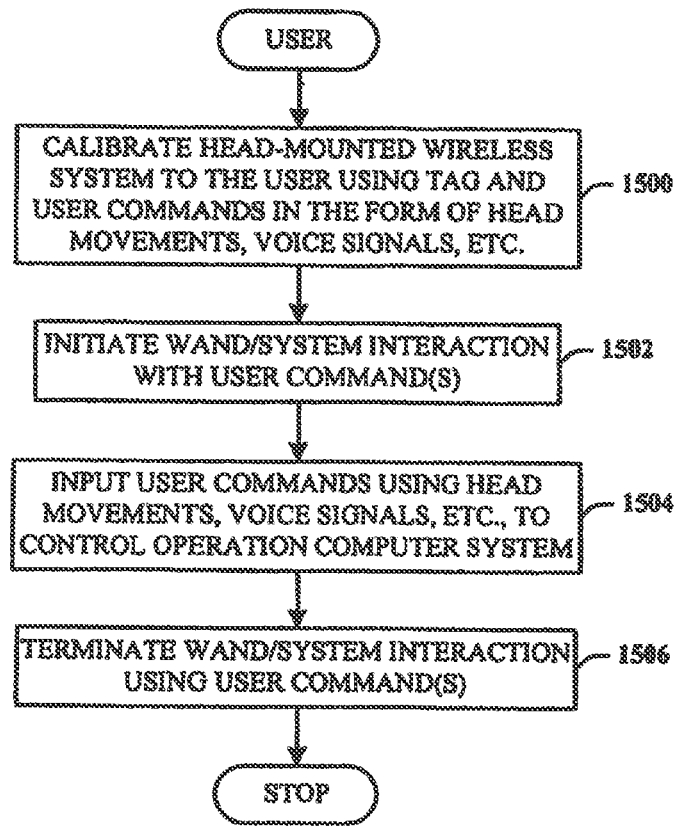
FIG. 15 illustrates a flowchart of a process from the perspective of the person for using the system of FIG. 14.

Referring now to FIG. 15, there is illustrated a flowchart of a process from the perspective of the person for using the system of FIG. 14. At 1500, the user performs a calibration process that comprises associating a number of head movements and/or voice commands with user commands. This also includes using voice commands singly to control the operation computer system or in combination with the head movements to do so. The calibration process can be performed well in advance of use in the operating room, and updated as the user chooses to change movements and/of voice signals with user commands. At 1502, the person initiates a session with the computer system using one or more user commands. At 1504, the person then inputs one or more of the user commands to control the computing system. At 1506, the person terminates the session using one or more of the user commands. The process then reaches a Stop block.

Figure 16:
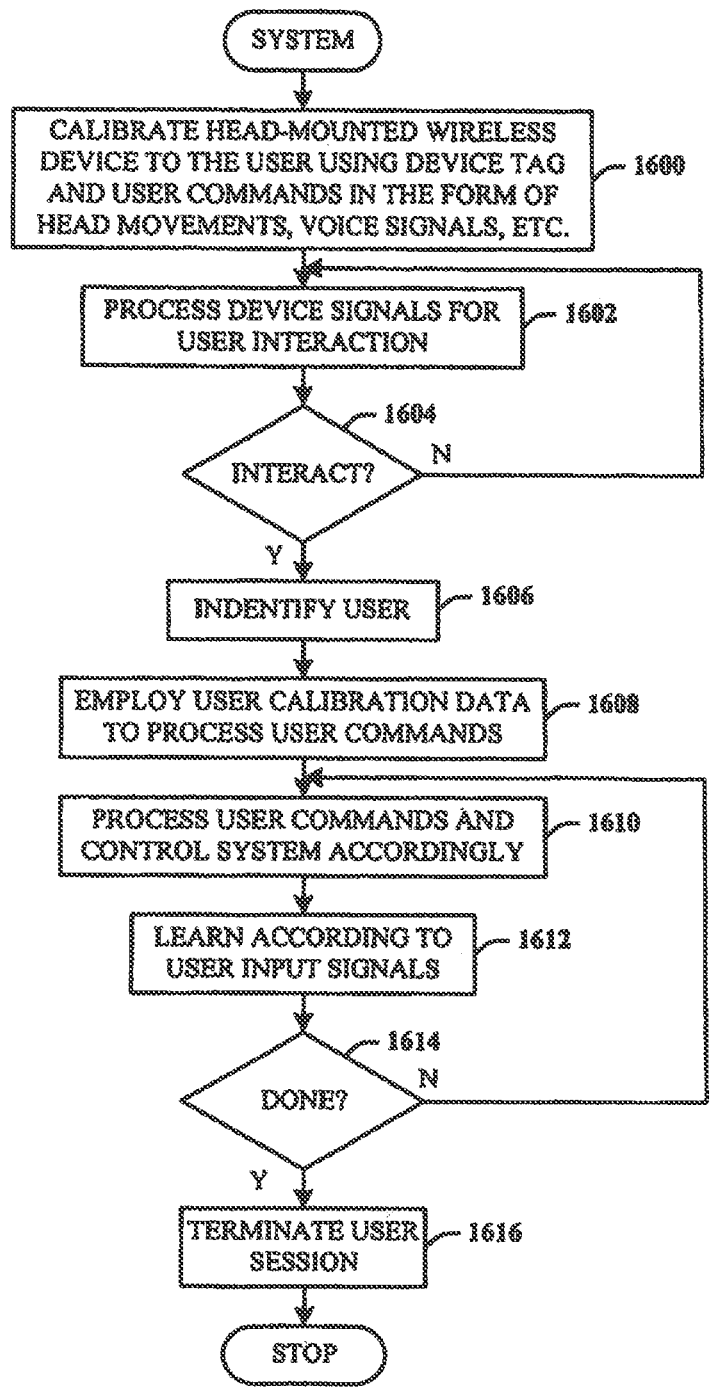
FIG. 16 illustrates a flowchart of a process from the perspective of the system of FIG. 14.

Referring now to FIG. 16, there is illustrated a flowchart of a process from the perspective of the system of FIG. 14. At 1600, the calibration process occurs where the system associates wand device signals and/or voice signals with user commands specified by the person. The calibration process ends. At 1602, the user wand signals are received and processed by the system. At 1604, the system determines if the processed user command(s) indicate that a session is to be started with that user. If NO, flow is back to the input of 1602 to continue to processing received device and voice signals. If YES, flow is to 1606 to identify the user. This can occur by the system processing the received signal and extracting the device tag ID. Prior to use, the tag ID of the wand is programmed for association with a given user. At 1608, the user profile of calibration data is activated for use. Of course, on any given operation, the operating staff are assigned such that the log-in names of the doctors and assistants can be entered prior to beginning the operation. Thus, the user profiles are already activated for processing.

At 1610, the device signals are received and processed to determine the tag ID of the device and to process the user command(s) against the associated profile information to enable the related command. At 1612, where a classifier is employed, the classifier tracks, processes, compares, and updates the user profile when wand movements associated with the particular user command are changed within certain criteria. At 1614, the computer system determines if the session has completed. If NO, flow is back to the input of 1610 to continue to process user commands. If YES, flow is to 1616 to terminate the user session. The process then reaches a Stop block. Of course, from 1616, flow can be brought back to the input of 1602 to continue to process signals from other devices or to prepare for another session, which could occur many times during the operating room event.

Figure 17:
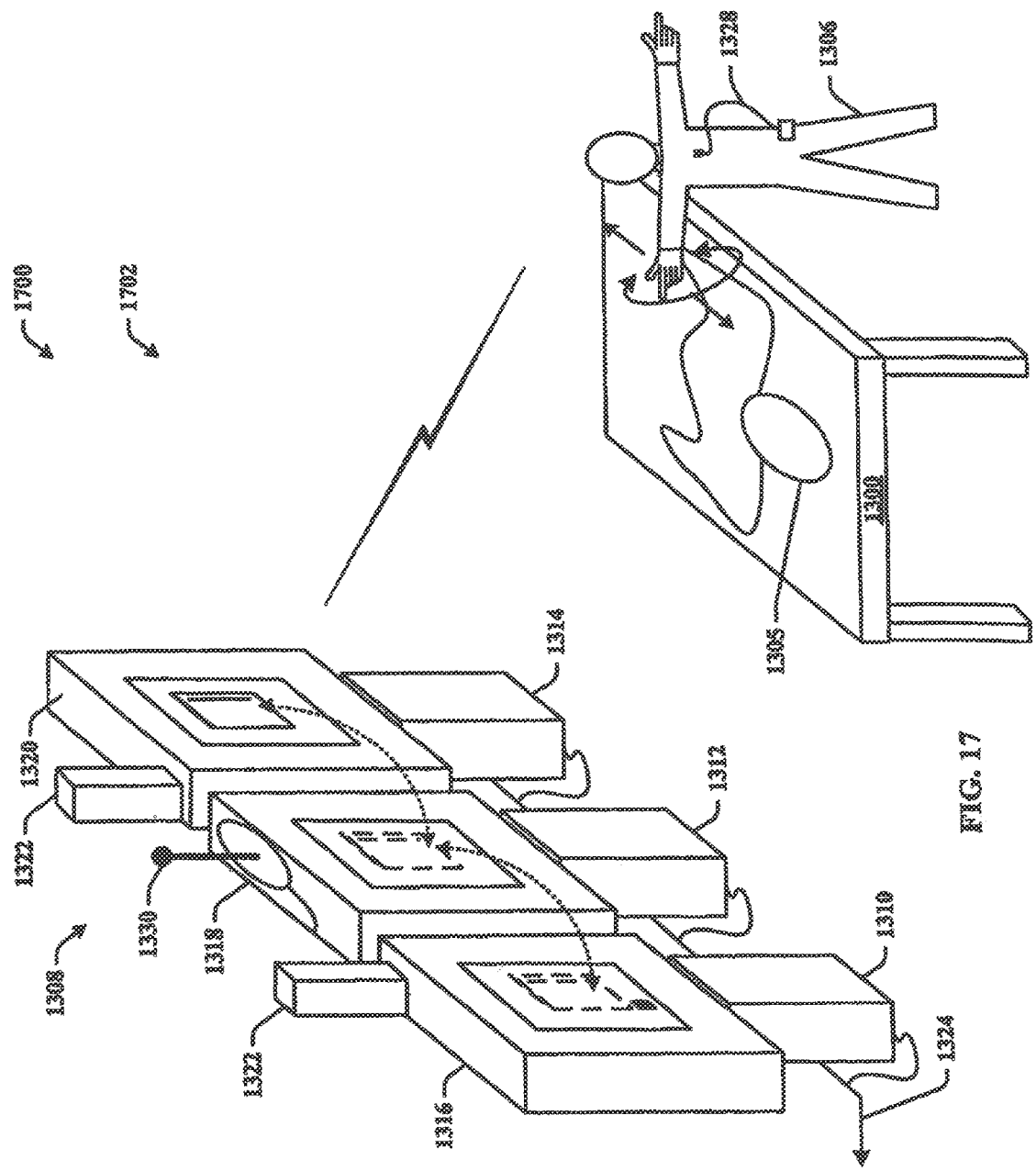
FIG. 17 illustrates a medical environment in which a 3-D imaging computer control system is employed to process hand (or body) gestures in accordance with the present invention.

Referring now to FIG. 17, there is illustrated a medical environment 1700 in which a 3-D imaging computer control system 1702 is employed to process hand (or body) gestures in accordance with the present invention. The operation computing system 1308 provides 3-D image recognition and processing capability such that the engagement volume of FIG. 13 and the wand 1404 of FIG. 14 are no longer required. The system 1702 can be augmented with voice commands in a manner similar to that described above; however, this is not needed. Audio-visual co-analysis can be used to improve continuous gesture recognition. Here, the transceiver system 1330 is used only for wireless voice communication, when vocalization is employed. For example, the medical person 1306 can simply use the system 1308 as a dictaphone to record voice signals during the operation.

The foregoing system 1702 is used to select an object under computer control in the environment by the computer system 1308 by having the user simply make one or more hand gestures. Of course, this can be done using both hands, which feature will be described in greater detail hereinbelow. This entails the computer system 1308 capturing imaging information about the hand gesture(s), and for each image or series of images received, the computer system 1308 derives the posture, orientation, and location of the hand, pair of hands, or any combination of one or more hands and any other body part (e.g., the head) (hereinafter grouped and denoted generally as "gesture characteristics", or where specifically related to a hand, as "hand gesture characteristics", or "hand characteristics") in relation to a predefined coordinate system of the environment in which the gesture is employed. Gesture analysis involves tracking the user's hand(s) in real-time. Hidden Markov Models (HMMs) can be employed for recognition of continuous gesture kinematics. In addition, the video output from the video cameras 1322 is used to ascertain the gesture characteristics at a time substantially contemporaneous with the generation of the gesture and in terms of the predefined coordinate system. Once the gesture characteristics are processed, they are used to determine whether an object in the environment should be controlled by the computer system 1308. If so, then that object is selected for future control actions. Moreover, stochastic tools such as Kalman filtering can be used to predict the position of the hand or hands in subsequent image frames.

Note that an object includes an object or device external to the computer system 1308 and controllable by a wireless and/or wired connection, as well as any internal device or feature that comprises software programs that are used to display images, manipulate data, and move data from one location to another, for example.

The process begins by generating a model of the environment. This process includes, but is not limited to, defining what aspects of the environment will be controlled by the computer system 1308, such as lights, lighting level, room temperature, operating room life support machines and other computer controlled machines in the room, and software controls that will be required or desired of the system 1308 before, during, and/or after the procedure. The software controls comprise the gestures required to initiate image paging, image rotation about a vertex, image rotation about an axis, zooming in and out on an image, providing supplementary data (e.g., video and audio) related to an image being presented or manipulated in a certain way, performing x,y translations of the image, stepped rotation, changing user interface coloring to improve visibility of an image, changing image contrast, changing resolution of an image, playing a series of images quickly or slowly (looping speed), freezing and unfreezing a looping image video (of, for example, echocardiography, transverse CT (Computed Tomography) and cryosection images, CT output, and a fly-through of MRI data), initiating repetitive image(s) playback (looping), jumping from the first monitor 1316 to another monitor (1318 or 1320), and adjusting audio controls when listening to audio data (e.g., EKG) during the procedure.

The next step is to calibrate the model according to the persons who will be working in the environment and interacting with the system 1308. Unique user profiles can be generated for each person interacting with the system 1308 by employing a tagging system that can discriminate the various users. This can be accomplished in several ways. One method provides a unique RF tag to each user. A triangulation system can be utilized to continually monitor the location of a given user, and associate the location data with the captured image data such that gestures are from that location will be processed against that user profile to properly execute the user command.

Another method is to employ several camera sets, where each set is dedicated to a specific user or location in which the user will work. The user could also be clothed in a colored uniform where the combination of color, gesture, and location uniquely identify the command issued by that user to the system 1308. As mentioned hereinabove, the system 1308 can be programmed to invoke a bi-directional confirmation system such that each user gesture is followed by a confirmation request to ensure that the proper user command is issued. Feedback can be provided by displaying the command in large text or outputting the anticipated command in audio to the user, after which the user responds by voice or with another gesture to accept or reject the command.

The imaging system 1308 detects gesture object (or hand) depth or distance from the system 1308 to facilitate discriminating between a plurality of gesture sources. The gesture sources can include a single hand, two hands, one hand of two people, etc. RF triangulation techniques can be used to accurately determine the gesture source(s). Thus, the gesture source includes an RF tag. If two hands are being used in gesticulation, then each hand can include a unique RF tag. Other depth determination systems can be employed to accurately discriminate the gesture sources, such as infrared.

As with other implementations mention above, the environment needs to be modeled for all objects to be controlled or interacted with, including both hardware and software. The gestures are then defined and associated with the objects. This can further include the use of voice commands, and where the wireless remote device is worn in alignment with the person's line-of-sight, the additional combination of "gaze" signals, where the gaze signals are defined as those wireless device (or wand) signals generated when the person looks in a direction to effect object interaction.

The system 1308 can also be configured to determine when the operator is generally facing the system 1308. A facial image can be captured and processed with facial features providing generally the data needed to make such an automatic determination. Another method includes wearing a multi-colored uniformed such that one color is associated with the person facing the system 1308, while another imaged color indicates the person is not facing the system 1308. Still another method employs a reflective surface on the front of the person such that the presence of reflective signals indicates the person is facing the system 1308.

The system 1308 is capable of determining when one person programmed to interact therewith has been replaced by another. This causes an automatic change of user profiles to enable the present user's gestures for corresponding user commands and control of the system 1308. Again, this can be facilitated by a color scheme whereby each medical person is uniquely identified in the system 1308 with a unique color. Any sort of tag-identification system could be used, as well. Of course, voice commands can also be used to facilitate personnel replacements in the medical environment.

Image processing demands, especially for 3-D imaging, can place an enormous burden on the operating computer system 1038. As mentioned hereinabove, the system 1308 can be distributed across two or more computers as a multi-computer system to supply the processing power for 3-D image processing. The disclosed imaging system software can then be distributed across the multi-computer system for the exchange of data needed for ultimately making decisions for human-machine interaction.

The system 1308 can also employ a bi-directional interaction scheme to confirm selection of all gesture, and gesture/voice actions. For example, if the user initiates a user command for starting a session, and the system 1308 responds with a signal that further requires a user response to confirm that a session is to begin. The confirmation respond can be in the form of a duplicate gesture and/or voice command. Obviously, the number and combination of gestures and voice commands that can be employed singly or in combination in accordance with the present system are numerous.

The system 1308 also includes audio input capabilities such that not only voice signals can be received and processed, but clicking sounds, pitch-related sounds, etc., and other distinctive audio signals can be employed to further extend the number of inputs for controlling the system 1308. Such alternative inputs can be input through the portable microphone system 1328 worn by at least one medical person in the operating room. Moreover, additional haptics inputs can be employed by providing a suit or vest with various touch or pressure points to augment the number of signals for controlling the system 1308. Thus, the wrist, forearm, and other appendage points can be used to initiate and send signals from the suit through a wireless remote pressure point transmission system, made part of the wireless voice communication system 1328, for example.

Figure 18:
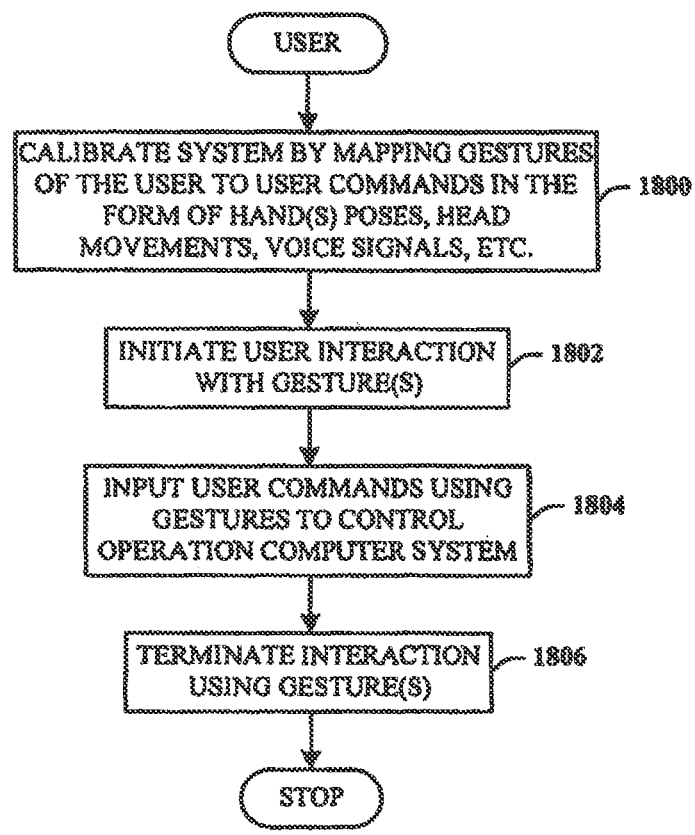
FIG. 18 illustrates a flowchart of a process from the perspective of the person for using the system of FIG. 17.

Referring now to FIG. 18, there is illustrated a flowchart of a process from the perspective of the person for using the system of FIG. 17. At 1800, the user performs a calibration process that comprises associating (or mapping) a number of gestures in the form of hand poses and movements, head movements, and/or voice commands with user commands. This also includes using voice commands singly to control the operation computer system or in combination with the gestures to do so. The calibration process can be performed well in advance of use in the operating room, and updated as the user chooses to change movements and/of voice signals with user commands. At 1802, the person initiates a session with the computer system using one or more gestures. At 1804, the person then inputs one or more of the user commands using gestures to control operation of the computing system. At 1806, the person terminates the session using one or more of the gestures. The process then reaches a Stop block.

Figure 19:
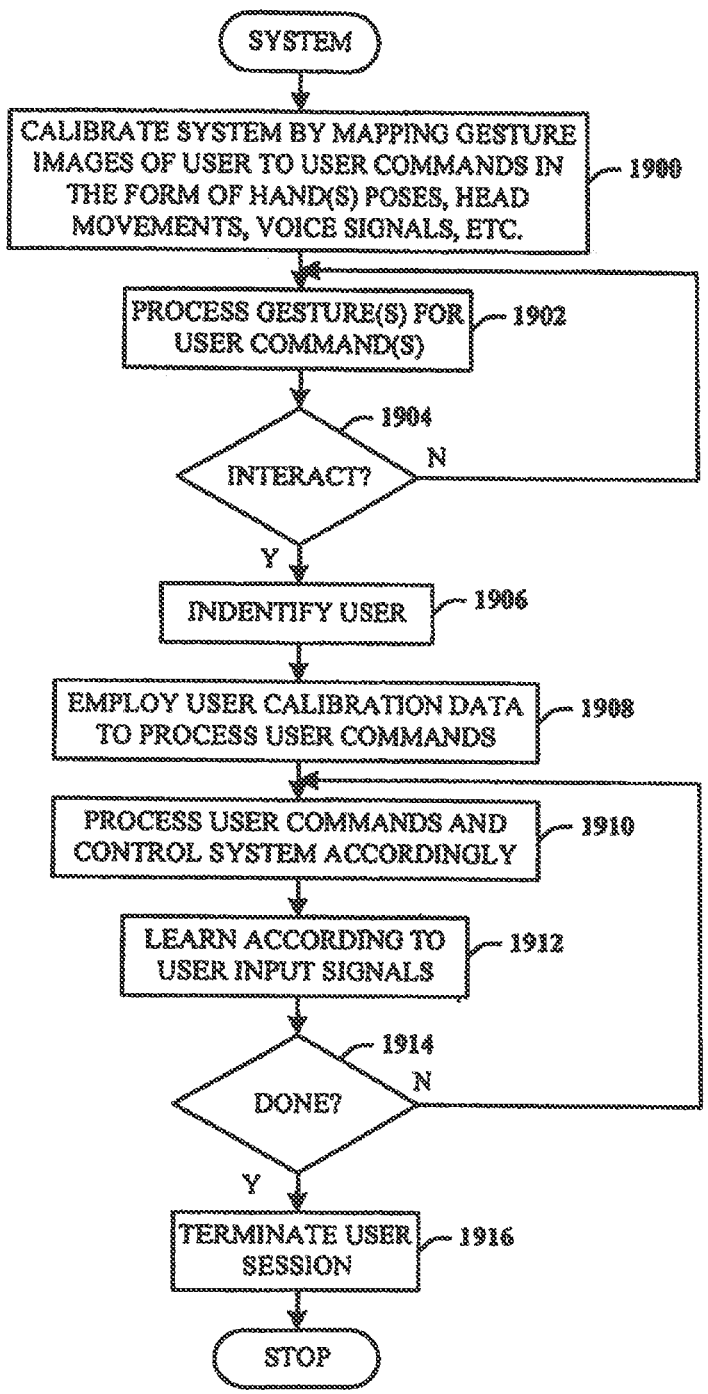
FIG. 19 illustrates a flowchart of a process from the perspective of the system of FIG. 17.

Referring now to FIG. 19, there is illustrated a flowchart of a process from the perspective of the system of FIG. 17. At 1900, the calibration process occurs for a user where the user presents one or more hands and, hand poses, and orientations to the imaging system for capture and association with a given user command. The system then maps the images to the user command. This occurs for a number of different commands, and completes the calibration phase for that user. At 1902, the user presents one or more gestures that are captured and processed by the system for user commands. At 1904, the system determines if the processed user command(s) indicate that a session is to be started with that user. If NO, flow is back to the input of 1902 to continue to process of receiving and interpreting gestures and/or voice signals. If YES, flow is to 1906 to identify the user. This can be via a triangulation system that determines the location of the source of the gestures. In one implementation, a glove of the medical person includes an RF device, or similar device that is detectable by the system for the purpose of determining the source of the gesture signals. At 1908, the user profile of calibration data is activated for use. Of course, on any given operation, the operating staff are assigned, such that the log-in names of the doctors and assistants can be entered prior to beginning the operation. Thus, the user profiles are already activated for processing.

At 1910, the gestures are imaged, received, and processed to execute the corresponding the user command(s). At 1912, where a classifier is employed, the classifier tracks, processes gesture images, compares the images, and updates user gestures characteristics associated with the particular user command. At 1914, the computer system determines if the session has completed. If NO, flow is back to the input of 1910 to continue to process gestures into user commands. If YES, flow is to 1916 to terminate the user session. The process then reaches a Stop block. Of course, from 1916, flow can be brought back to the input of 1902 to continue to process gestures or to prepare for another session, which could occur many times during the operating room event.

Referring now to FIG. 20, there is illustrated a medical environment 2000 in which a 3-D imaging computer control system 2002 is employed with the remote control device 1404 to process hand (or body) gestures and control the system 1308 in accordance with the present invention. The imaging and image processing capabilities of the 3-D imaging system 1308 and the head-mounted wand 1404 can be employed in combination to further enhance the hands-free capabilities of the present invention. Moreover, the wireless vocalization system 1328 can further be used to augment control of the system 1308. As indicated previously, the wand electronics can be repackaged for use in many different ways. For example, the packaging can be such that the wireless system is worn on the wrist, elbow, leg, or foot. The system 1308 can be used to image both the gestures of the person 1306 and the orientation of the wand 1404 to provide more accurate human-machine interaction and control. Each of the systems have been described herein, the details of which are not repeated here for the purpose of brevity. Sample gestures, voice commands and gaze signals used in the system 2002 are described hereinbelow.

Figure 21A:
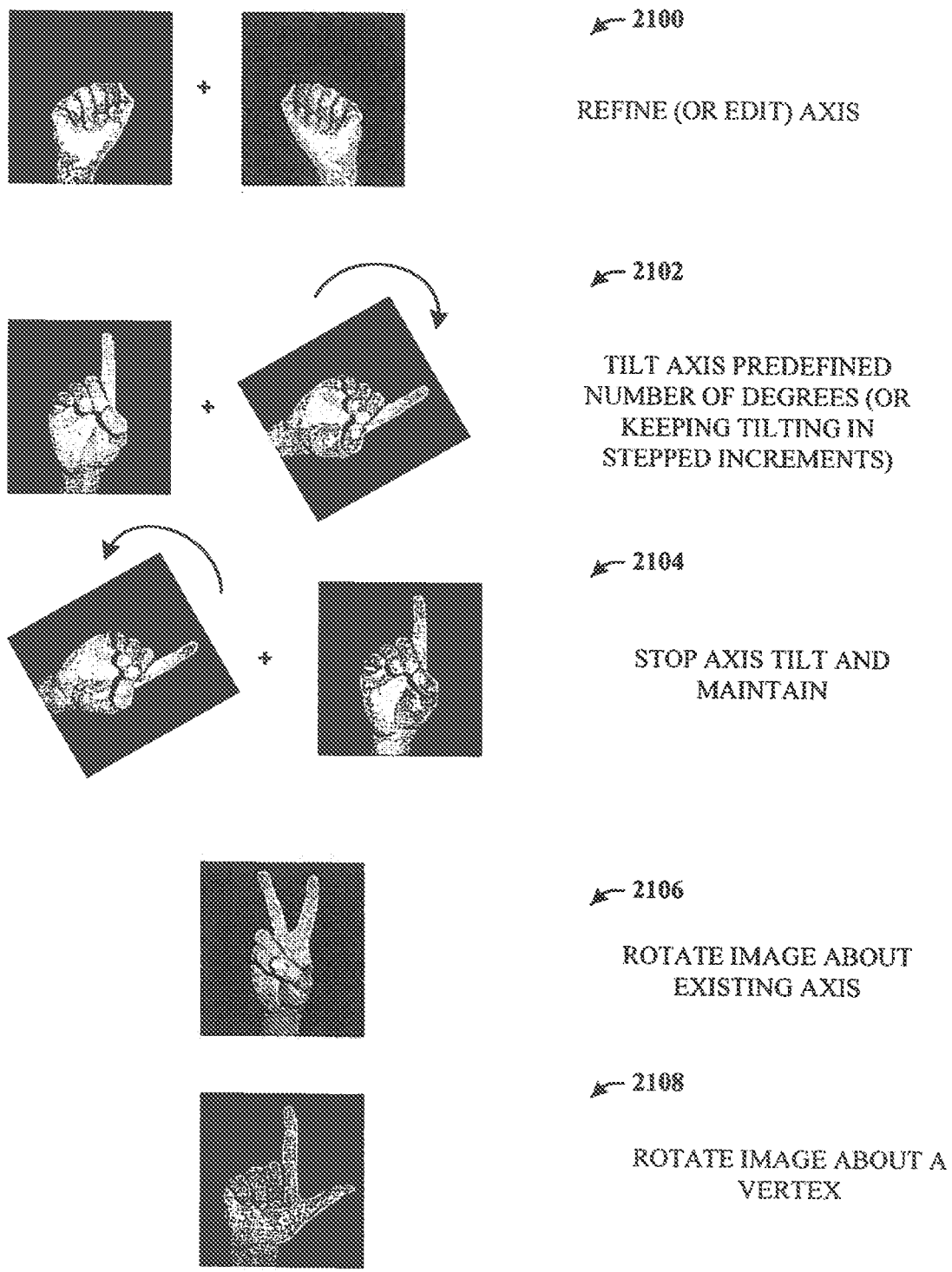
FIG. 21A illustrates a sample one-handed and two-handed gestures that can be used to control the operation computing system in accordance with the present invention.

Referring now to FIG. 21A, there is illustrated sample one-handed and two-handed gestures that can be used to control the operation computing system in accordance with the present invention. At 2100, two closed fists (left and right) can be programmed for imaging and interpretation to cause axis control. At 2102, the right hand in a pointing pose can be used in two orientations, a vertical orientation followed by a sideways clockwise rotation, the combination of which can be programmed for imaging and interpretation to tilt a selected axis a predetermined number of degrees, and keep tilting the axis in stepped increments. At 2104, a continuation of the gestures of 2102 in reverse where, the sideways clockwise rotation is reversed to a counterclockwise rotation followed by the vertical orientation, the combination of which can be programmed for imaging and interpretation stop axis tilting, and maintain at the current tilt angle. At 2106, a right-handed two-fingers-raised pose can be used to rotate an image about an existing axis. Note that the image can be x-rays of the patient, MRI (Magnetic Resonance Imaging) frames, etc. At 2108, the thumb and pointing finger pose of the right hand can be used to rotate an image about a vertex point.

Figure 21B:
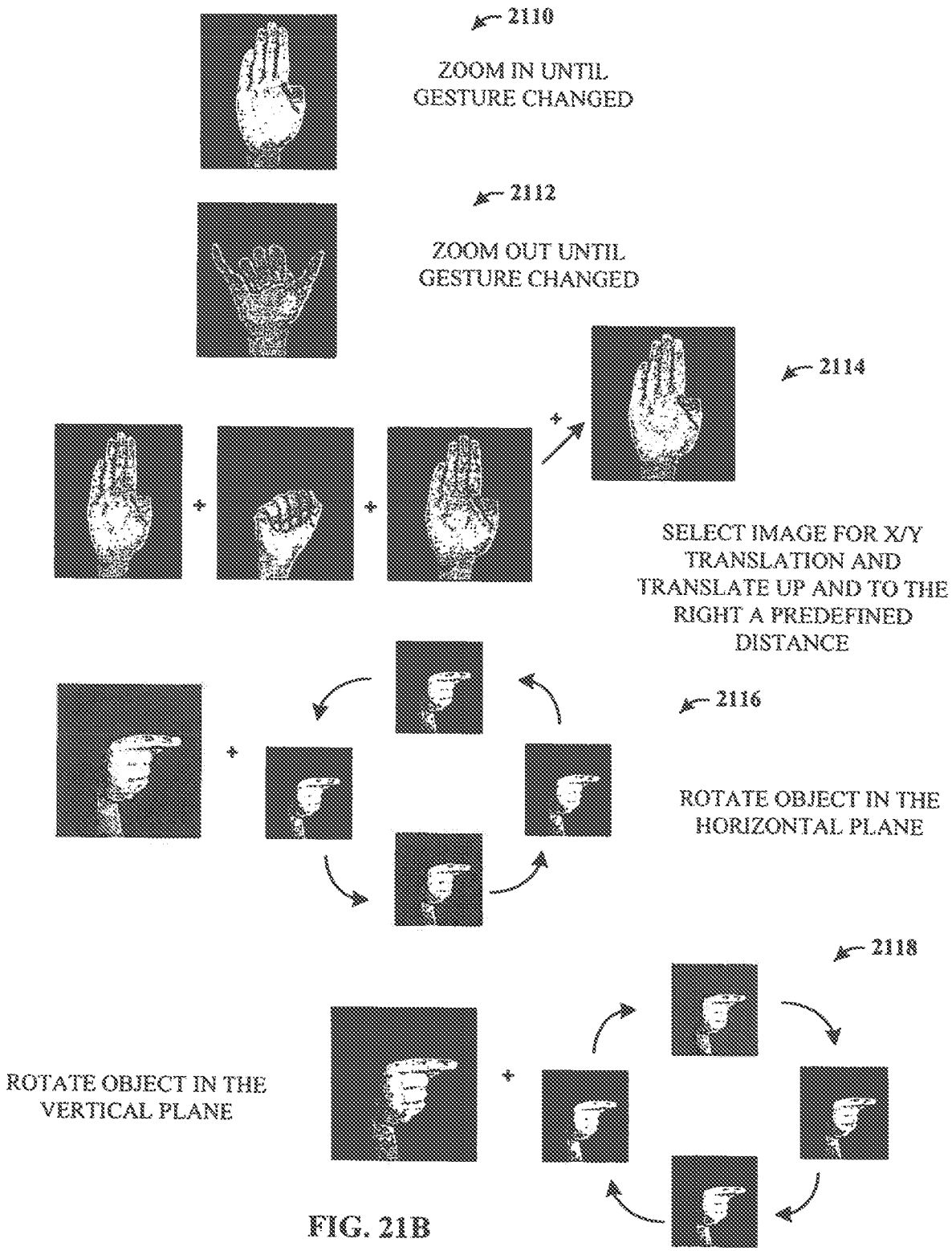
FIG. 21B illustrates an additional sample one-handed gestures and sequenced one-handed gestures that can be used to control the operation computing system in accordance with the present invention.

Referring now to FIG. 21B, there is illustrated additional sample one-handed gestures and sequenced one-handed gestures that can be used to control the operation computing system in accordance with the present invention. At 2110, an open right hand with fingers tightly aligned can be used to initiate a zoom-in feature such that the zoom-in operation continues until the gesture changes. At 2112, a right hand where the thumb and pinky finger are extended can be used to initiate a zoom-out feature such that the zoom-out operation continues until the gesture changes. At 2114, a sequence of right-hand gestures are used to select an image for x,y translation, and then to translate the image up and to the right by a predefined distance or percentage of available viewing space on the display. Here, the right hand is used to provide an open hand plus closed first plus open hand, and then move the open hand up and to the right a short distance. This can be recognized and interpreted to perform the stated function of axis translation in an associated direction. At 2116, a sideways pointing pose plus a counterclockwise motion is programmed for interpretation to rotate the object in the horizontal plane. At 2118, the same hand pose plus a circular motion in the opposite direction can be programmed to rotate the object in the vertical plane. Note, however, that the hand pose is arbitrary, in that it may be more intuitive to use a hand pose where one or more of the fingers point upward. Moreover, the gesture, itself is also arbitrary, and is programmable according to the particular desires of the user.

Referring now to FIG. 21C, there is illustrated additional sample one-handed gestures that can be used to control the operation computing system in accordance with the present invention. At 2120, a three-finger open with index and thumb touching of the right hand can be used to impose a triaxial grid on a 3-D image. At 2122, a right-handed single pointing-finger pose can be used to select the x-axis; a right-handed two-finger pose can be used to select the y-axis; and, a right-handed three-finger pose can be used to select the z-axis. At 2124, a pinky-finger pose can be used to stop, start and loop videos on the system 1308. It is also possible using various "structure-from-motion" techniques to track arbitrary points on the hand, and over time, deduce the change in 3-D orientation of the object in such a way that the user need not adopt some predefined pose. In this case, however, the user can enter the 3-D rotation mode by another method.

At 2126, rotation of the pinky-finger pose in a clockwise direction while facing the system 1308 can be used to control intensity of the monitor, and volume on/off control and amplitude. These are being grouped of brevity, since, for example, the pinky-finger pose and/or rotation can be mapped to any one of the functions described. At 2128, an open hand gesture in a clockwise rotation can be used to rotate an image about an axis according to the speed of movement of the open hand, such that when the hand stops, the axis rotation also stops, and starts when band movement starts.

Referring now to FIG. 21D, there is illustrated additional sample one-handed gestures used in combination with voice commands that can be used to control the operation computing system in accordance with the present invention. At 2130, the open hand pose plus a voiced "ZOOM" command can be used to zoom in on a displayed image until the gesture changes or a different command is voiced. At 2132, the thumb and pinky finger extended pose plus a voiced "ZOOM" command can be used to zoom out on a displayed image until the gesture changes, or a different command is voiced. Depth information can also be used e.g., moving closer would trigger a zoom-in function, Alternatively, when zoom is invoked, movement in depth can control the zoom value continuously.

At 2134, a left-handed open hand pose in a sideways orientation plus a voiced "MOVE" command can be used to move a selected image to the right until the gesture changes and stops movement. At 2136, a right-handed open hand pose in a sideways orientation plus a voiced "MOVE" command can be used to move a selected image to the left until the gesture changes and stops movement. At 2138, a closed first in a circular motion in combination with a "LOUD" voice command can be used to turn audio volume on/off, and control the amplitude during the procedure to listen to the patient's EKG, for example.

Referring now to FIG. 21E, there is illustrated additional sample one-handed gestures used in combination with voice commands and gaze signals that can be used to control the operation computing system in accordance with the present invention. At 2140, the right-hand open-hand pose in combination with a voiced "ZOOM" command while gazing at an image on a first display of the operation computer system will invoke a zoom-in process on the image of the first display until the gesture is changed. At 2142, the thumb and pinky finger extended of the pose of the right hand is used in combination with a voiced "ZOOM" command while gazing in the direction of an image presented on a second display to control the computer system to zoom out on the image of the second display until the gesture changes. At 2144, a left-handed open hand pose in a sideways orientation in combination with a voiced "MOVE" command while gazing at an image on a first display of the operation computer system will invoke a rightward move operation on the image of the first display until the gesture is changed. At 2146, a right-handed open hand pose in a sideways orientation in combination with a voiced "MOVE" command while gazing at an image on a second display of the operation computer system will invoke a leftward move operation on the image of the second display until the gesture is changed. At 2148, a closer right first in a circular clockwise motion in combination with a voiced "LOUD" command and a gaze in the direction of a graphical interface of an audio control device on a third display of the computer control system results in volume on/off control and amplitude control.

It is to be appreciated that numerous other combinations of hand poses, body gestures, voice commands and gaze orientations can be employed to effect control of the medical operation environment. Only a few samples of the individual and combinatory capabilities are provided herein.

The complementary nature of speech and gesture is well established. It has been shown that when naturally gesturing during speech, people will convey different sorts of information than is conveyed by the speech. In more designed settings such as interactive systems, it may also be easier for the user to convey some information with either speech or gesture or a combination of both. For example, suppose the user has selected an object as described previously and that this object is a stereo amplifier controlled via a network connection by the host computer. Existing speech recognition systems would allow a user to control the volume by, for example, saying "up volume" a number of times until the desired volume is reached. However, while such a procedure is possible, it is likely to be more efficient and precise for the user to turn a volume knob on the amplifier. This is where the previously described gesture recognition system can come into play. Rather than having to turn a physical knob on the amplifier, the user would employ the pointer to control the volume by, for example, pointing at the stereo and rolling the pointer clockwise or counterclockwise to respectively turn the volume up or down. The latter procedure can provide the efficiency and accuracy of a physical volume knob, while at the same time providing the convenience of being able to control the volume remotely as in the case of the voice recognition control scheme. This is just one example of a situation where gesturing control is the best choice, there are others. In addition, there are many situations where using voice control would be the best choice. Still further, there are situations where a combination of speech and gesture control would be the most efficient and convenient method. Thus, a combined system that incorporates the previously described gesturing control system and a conventional speech control system would have distinct advantages over either system alone.

To this end, as indicated hereinabove, the present invention includes the integration of a conventional speech control system into the gesture control and pointer systems which results in a simple framework for combining the outputs of various modalities such as pointing to target objects and pushing the button on the pointer, pointer gestures, and speech, to arrive at a unified interpretation that instructs a combined environmental control system on an appropriate course of action. This framework decomposes the desired action (e.g., "turn up the volume on the amplifier") into a command (i.e., "turn up the volume") and a referent (i.e., "the amplifier") pair. The referent can be identified using the pointer to select an object in the environment as described previously or using a conventional speech recognition scheme, or both. The command may be specified by pressing the button on the pointer, or by a pointer gesture, or by a speech recognition event, or any combination thereof. Interfaces that allow multiple modes of input are called multimodal interfaces. With this multimodal command/referent representation, it is possible to effect the same action in multiple ways. For example, all the following pointing, speech and gesture actions on the part of the user can be employed in the present control system to turn on a light that is under the control of the host computer:

1. Say "turn on the desk lamp";
2. Point at the lamp with the pointer and say "turn on";
3. Point at the lamp with the pointer and perform a "turn on" gesture using the pointer;
4. Say "desk lamp" and perform the "turn on" gesture with the pointer;
5. Say "lamp", point toward the desk lamp with the pointer rather than other lamps in the environment such as a floor lamp, and perform the "turn on" gesture with the pointer; and
6. Point at the lamp with the pointer and press the pointer's button (assuming the default behavior when the lamp is off and the button is clicked, is to turn the lamp on).

By unifying the results of pointing, gesture recognition and speech recognition, the overall system is made more robust. For example, a spurious speech recognition event of "volume up" while pointing at the light is ignored, rather than resulting in the volume of an amplifier being increased, as would happen if a speech control scheme were being used alone. Also, consider the example given above where the user says "lamp" while pointing toward the desk lamp with the pointer rather than other lamps in the environment, and performing the "turn on" gesture with the pointer. In that example, just saying lamp is ambiguous, but pointing at the desired lamp clears up the uncertainty. Thus, by including the strong contextualization provided by the pointer, the speech recognition may be made more robust.

The speech recognition system can employ a very simple command and control (CFG) style grammar, with preset utterances for the various electronic components and simple command phrases that apply to the components. The user wears a wireless lapel microphone to relay voice commands to a receiver which is connected to the host computer and which relays the received speech commands to the speech recognition system running on the host computer.

While various computational frameworks could be employed, the multimodal integration process employed in the present control system uses a dynamic Bayes network that encodes the various ways that sensor outputs may be combined to identify the intended referent and command, and initiate the proper action.

The identity of the referent, the desired command and the appropriate action are all determined by combining the outputs of the speech recognition system, gesture recognition system and pointing analysis processes using a dynamic Bayes network architecture. Bayes networks have a number of advantages that make them appropriate to this task. First, it is easy to break apart and treat separately dependencies that otherwise would be embedded in a very large table over all the variables of interest. Secondly, Bayes networks are adept at handling probabilistic (noisy) inputs. Further, the network represents ambiguity and incomplete information that may be used appropriately by the system. In essence, the Bayes network preserves ambiguities from one time step to the next while waiting for enough information to become available to make a decision as to what referent, command or action is intended. It is even possible for the network to act proactively when not enough information is available to make a decision. For example, if the user doesn't point at the lamp, the system might ask which lamp is meant after the utterance "lamp".

However, the Bayes network architecture is chosen primarily to exploit the redundancy of the user's interaction to increase confidence that the proper action is being implemented. The user may specify commands in a variety of ways, even though the designer specified only objects to be pointed to, utterances to recognize and gestures to recognize (as well as how referents and commands combine to result in action). For example, it is natural for a person to employ deictic (pointing) gestures in conjunction with speech to relay information where the speech is consistent with and reinforces the meaning of the gesture. Thus, the user will often naturally indicate the referent and command applicable to a desired resulting action via both speech and gesturing. This includes most frequently pointing at an object the user wants to affect.

The Bayes network architecture also allows the state of various devices to be incorporated to make the interpretation more robust. For example, if the light is already on, the system may be less disposed to interpret a gesture or utterance as a "turn on" gesture or utterance. In terms of the network, the associated probability distribution over the nodes representing the light and its parents, the Action and Referent nodes, are configured so that the only admissible action when the light is on is to turn it off, and likewise when it is off the only action available is to turn it on.

Still further, the "dynamic" nature of the dynamic Bayes network can be exploited advantageously. The network is dynamic because it has a mechanism by which it maintains a short-term memory of certain values in its network. It is natural that the referent will not be determined at the exact moment in time as the command. In other words a user will not typically specify the referent by whatever mode (e.g., pointing and/or speech) at the same time he or she relays the desired command using one of the various methods available (e.g., pointer button push, pointer gesture and/or speech). If the referent is identified only to be forgotten in the next instant of time, the association with a command that comes after it will be lost. The dynamic Bayes network models the likelihood of a referent or a command applying to future time steps as a dynamic process. Specifically, this is done via a temporal integration process in which probabilities assigned to referents and commands in the last time step are brought forward to the current time step and are input along with new speech, pointing and gesture inputs to influence the probability distribution computed for the referents and commands in the current time step. In this way, the network tends to hold a memory of a command and referent that decays over time, and it is thus unnecessary to specify the command and referent at exactly the same moment in time. In one example, this propagation occurred four times a second.

Note that although a previous description was centered on an operating room environment, the present invention has application in many other environments where data access and presentation is beneficial or even necessary to facilitate a man-machine interface.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of controlling an object, the method comprising:
   receiving orientation signals from one or more accelerometers based on use of a three-dimensional pointing device by a user, wherein the one or more accelerometers are contained in the three-dimensional pointing device;
   normalizing the received orientation signals based in part on previously determined calibration factors, the previously determined calibration factors being associated with a profile of the user of the three-dimensional pointing device;
   computing a three dimensional location of the three-dimensional pointing device based on the received orientation signals and the normalized signals;
   determining an object at which the three-dimensional pointing device is being pointed; and
   controlling an action of the object based on signals received from the three-dimensional pointing device and based on the profile associated with the user of the three-dimensional pointing device, the profile including at least one user command associated with a respective at least one three-dimensional movement of the three-dimensional pointing device.

2. The method according to claim 1, further comprising:
   detecting movement of the three-dimensional pointing device;
   recognizing a gesture associated with the detected movement of the three-dimensional pointing device three-dimensional pointing device; and
   performing the action based on the recognized gesture.

3. The method according to claim 2, wherein the action comprises issuing one or more commands, wherein the issued one or more commands are based on the recognized gesture.

4. The method according to claim 2, wherein performing the action comprises issuing one or more commands controlling one or more application programs running on one or more computers.

5. The method according to claim 4, wherein controlling one or more application programs includes controlling connected devices of the one or more computers on which the one or more applications are running.

6. The method according to claim 4, wherein the recognized gesture comprises one of a set of gestures based on the one or more application programs running on the one or more computers.

7. The method according to claim 1, wherein the object is an icon displayed on a computer screen; and
   controlling the object consists of activating the icon to perform one or more functions.

8. The method according to claim 1, wherein the object is a cursor displayed on a computer screen; and
   controlling the object comprises moving the cursor on the computer screen.

9. The method according to claim 8, further comprising:
   detecting activation of a button on the three-dimensional pointing device;
   wherein the action controlled is further based on the location of the cursor on the computer screen and the button activated.

10. The method according to claim 1, further comprising:
    detecting activation of a button on the three-dimensional pointing device,
    wherein the action is initiated upon detecting activation of the button.

11. The method according to claim 1, wherein controlling the action comprises controlling one or more home appliances.

12. The method according to claim 1, wherein controlling one or more appliances is initiated by one or more of:
    activating a button or switch on the three-dimensional pointing device;
    pointing the three-dimensional pointing device at the one or more appliances;
    performing a certain gesture with the three-dimensional pointing device; and
    rolling the three-dimensional pointing device around the object.

13. The method according to claim 1, wherein controlling the action comprises controlling a video game.

14. The method according to claim 1, wherein the three dimensional location comprises a volume space; and
    wherein the method further comprises:
       tracking the object as being either within the volume space or outside the volume space; and
       controlling the action only if the object is within the volume space.

15. The method according to claim 14, wherein the three-dimensional pointing device is configured to control any device within the volume space.

16. The method according to claim 1, further comprising:
    selecting one or more referent to be controlled by the action; and
    initiating control actions on the one or more referent based on movement of the three-dimensional pointing device, wherein the particular referent being controlled is based on the movement of the three-dimensional pointing device.

17. A system comprising:
    a processor and a memory communicatively coupled to the process, the memory storing thereon computer-executable instructions that, when executed by the processor, cause the system to perform operations comprising:
       receiving orientation signals from one or more accelerometers based on use of a three-dimensional pointing device by a user, wherein the one or more accelerometers are contained in the three-dimensional pointing device;
       normalizing the received orientation signals based in part on previously determined calibration factors, the previously determined calibration factors being associated with a profile of the user of the three-dimensional pointing device;

computing a three dimensional location of the three-dimensional pointing device based on the received orientation signals and the normalized signals;

determining an object at which the three-dimensional pointing device is being pointed; and controlling an action of the object based on signals received from the three-dimensional pointing device and based on the profile associated with the user of the three-dimensional pointing device, the profile including at least one user command associated with a respective at least one three-dimensional movement of the three-dimensional pointing device.

18. A computer-readable storage device storing thereon computer-executable instructions that, when executed by a processor of a computing device, cause the computing device to perform operations comprising:

receiving orientation signals from one or more accelerometers based on use of a three-dimensional pointing device by a user, wherein the one or more accelerometers are contained in the three-dimensional pointing device;

normalizing the received orientation signals based in part on previously determined calibration factors, the previously determined calibration factors being associated with a profile of the user of the three-dimensional pointing device;

computing a three dimensional location of the three-dimensional pointing device based on the received orientation signals and the normalized signals;

determining an object at which the three-dimensional pointing device is being pointed; and controlling an action of the object based on signals received from the three-dimensional pointing device and based on the profile associated with the user of the three-dimensional pointing device, the profile including at least one user command associated with a respective at least one three-dimensional movement of the three-dimensional pointing device.

* * * * *